US006916492B2

(12) United States Patent
Goswami et al.

(10) Patent No.: US 6,916,492 B2
(45) Date of Patent: Jul. 12, 2005

(54) NATURAL NONTOXIC MULTICOLOR FLUORESCENT PROTEIN DYE FROM A MARINE INVERTEBRATE, COMPOSITIONS CONTAINING THE SAID DYE AND ITS USES

(75) Inventors: Usha Goswami, Goa (IN); Anutosh Ganguly, Goa (IN)

(73) Assignee: Council of Scientific & Industrial Research, New Delhi (IN)

( * ) Notice: Subject to any disclaimer, the term of this patent is extended or adjusted under 35 U.S.C. 154(b) by 91 days.

(21) Appl. No.: 10/107,335

(22) Filed: Mar. 28, 2002

(65) Prior Publication Data

US 2002/0187202 A1 Dec. 12, 2002

Related U.S. Application Data

(63) Continuation-in-part of application No. 09/820,654, filed on Mar. 30, 2001, now Pat. No. 6,582,730.

(51) Int. Cl.$^7$ .................. A61K 35/48; A61K 35/32; A61K 35/56; C09B 1/00
(52) U.S. Cl. .................. 424/559; 424/520; 424/547
(58) Field of Search ................ 424/520, 547, 424/559; 435/41, 968, 810; 8/648

(56) References Cited

U.S. PATENT DOCUMENTS

| | | |
|---|---|---|
| 4,452,822 A | 6/1984 | Shrikhande |
| 4,774,339 A | 9/1988 | Haugland et al. |
| 5,187,288 A | 2/1993 | Kang et al. |
| 5,248,782 A | 9/1993 | Haugland et al. |
| 5,274,113 A | 12/1993 | Kang et al. |
| 5,321,268 A | 6/1994 | Crosby et al. |
| 5,405,416 A | 4/1995 | Swinton |
| 5,433,896 A | 7/1995 | Kang et al. |
| 5,451,663 A | 9/1995 | Kang et al. |
| 5,519,010 A | 5/1996 | Fan et al. |
| 5,770,205 A | 6/1998 | Collin |
| 5,858,761 A | 1/1999 | Tsubokura et al. |
| 5,876,762 A | 3/1999 | Collin |
| 5,888,514 A | 3/1999 | Weisman |
| 5,902,749 A | 5/1999 | Lichtwardt et al. |
| 5,908,650 A | 6/1999 | Lenoble et al. |
| 5,920,429 A | 7/1999 | Burns et al. |
| 5,935,808 A | 8/1999 | Hirschberg et al. |
| 5,985,330 A | 11/1999 | Collin |
| 5,989,135 A | 11/1999 | Welch |
| 5,993,797 A | 11/1999 | Kitazato et al. |
| 6,055,936 A | 5/2000 | Collin |
| 6,056,162 A | 5/2000 | Leighley |
| 6,103,006 A | 8/2000 | DiPietro |
| 6,110,566 A | 8/2000 | White et al. |
| 6,140,041 A | 10/2000 | LaClair |
| 6,165,384 A | 12/2000 | Cooper et al. |
| 6,180,154 B1 | 1/2001 | Wrolstad et al. |
| 6,203,827 B1 | 3/2001 | Katsukura |
| 6,255,295 B1 | 7/2001 | Henderson et al. |
| 6,428,823 B1 | 8/2002 | Goswami et al. |

FOREIGN PATENT DOCUMENTS

| | | |
|---|---|---|
| AU | 199669095 B2 | 4/1997 |
| CN | 1142365 | 2/1997 |
| CN | 1173290 | 2/1998 |
| CN | 1179261 | 4/1998 |
| CN | 1223131 | 7/1999 |
| CN | 1286926 | 3/2001 |
| CN | 1312031 | 9/2001 |
| DE | 19755642 A1 | 6/1999 |
| EP | 0206718 A2 | 12/1986 |
| EP | 0410002 A1 | 1/1991 |
| EP | 0495116 A1 | 7/1992 |
| IE | 901379 | 4/1990 |
| RU | 2147239 | 4/2000 |
| WO | WO9010044 | 9/1990 |
| WO | WO9920688 | 4/1999 |
| WO | WO9937314 | 7/1999 |
| WO | WO9938916 | 8/1999 |
| WO | WO9938919 | 8/1999 |
| WO | WO0001399 | 1/2000 |
| WO | WO0058406 | 10/2000 |

OTHER PUBLICATIONS

Indap et al. Environ. Ecol. 1996. vol. 14, No. 4, pp. 917–919, LIFESCI Abstract.*
Anjaneyulu et al. Indian J. Chem. 1995. vol. 34, No. 7, pp. 666–668, SCISEARCH Abstract.*
Villela, G. Rev. Brasil. Biol. 1951. The fluorescent pigment of *Holothuria grisea*. vol. 11, pp. 33–36.*
Hobson, D.K., et al., "'Green' Dyes", JSDC, vol. 114, 42–4, (1998).
Bandaranayake, W.M., et al., "Role of Secondary Metabolites and Pigments in the Epidermal Tissues, Ripe Ovaries, Viscera, Gut Contents and Diet of the Sea Cucumber *Holothuria atra*", Marine Biology, 133, 163–169 (1999).
Shimomura, O., et al., "Extraction, Purification and Properties of Aequorin, a Bioluminescent Protein from the Luminous Hydromedusan, Aequorea", Luminescence of Aequorin, 223–239.
Chalfie, M., "Green Fluorescent Protein", Photochemistry and Photobiology, vol. 62, No. 4, 651–656 (1995).
Youvan, D.C., et al., "Structure and Fluorescence Mechanism of GFP", Nature Biotechnology, vol. 14, (1995).
Chalfie, M., et al., "Green Fluorescent Protein as a Marker for Gene Expression", Science, vol. 263, 802–5 (1994).
Gurskaya, N.G., et al., "GFP–Like Chromoproteins as a Source of Far–Red Fluorescent Proteins", FEBS Letters, 507, 16–20 (2001).

(Continued)

*Primary Examiner*—Christopher R. Tate
(74) *Attorney, Agent, or Firm*—Piper Rudnick LLP; Steven B. Kelber

(57) ABSTRACT

The present invention discloses the process of extraction, purification and characterization of a natural eco-friendly nontoxic cell permeant multiple fluorescent protein dye from a non bioluminescent marine echinoderm *Holothuria scabra*, compositions containing the dye and various applications of the dye.

43 Claims, 36 Drawing Sheets

(13 of 36 Drawing Sheet(s) Filed in Color)

OTHER PUBLICATIONS

Wachter, R. M., et al., "Structural Basis of Spectral Shifts in the Yellow–Emission Variants of Green Fluorescent Protein", Structure, vol. 6, No. 10, 1267–77 (1998).

Fradkov, A.F., et al., "Novel Fluorescent Protein from Discosoma coral and its Mutants Possesses a Unique Far–Red Fluorescence", FEBS Letters 479, 127–130 (2000).

Matz, M. V., et al., "Fluorescent Proteins from Nonbioluminescent *anthozoa* Species", Nature Biotechnology, vol. 17, 969–973 (1999).

Mercier, A., et al., "Settlement Preferences and Early Migration of the Tropical Sea Cucumber *Holothuria scabra*", J. Exp. Mar. Biol. and Ecol., 249, 89–110 (2000).

Johnson, I.D., "Introduction to Fluorescence Techniques", Handbook of Fluorescent Probes and Research Chemicals, $6^{th}$ Ed., 1–6 (1996).

Haugland, R.P., "A Wide Variety of Protein Conjugates", Handbook of Fluorescent Probes and Research Chemicals, $6^{th}$ Ed., 126–128 (1996).

Jones, R. N., "Fluorescence", Encyclopedia of Chemistry, $2^{nd}$ Ed. 435–6 (1966).

Linz, A., "Pigments", Encyclopedia of Chemistry, $2^{nd}$ Ed. 833–5 (1966).

* cited by examiner

NATURAL NONTOXIC MULTICOLOR FLUORESCENT PROTEIN DYE FROM A MARINE INVERTEBRATE, COMPOSITIONS CONTAINING THE SAID DYE AND ITS USES

The present application is a continuation-in-part application of U.S. patent application Ser. No. 09/820,654, filed on Mar. 30, 2001 now U.S. Pat. No. 6,582,730.

FIELD OF THE INVENTION

The present invention relates to a natural nontoxic multiple fluorescent protein dye extracted from ovarian tissue of a marine invertebrate, *Holothuria scabra*. The invention also provides a process for the extraction, partial purification and characterization of this new natural dye. The nontoxic, cell membrane permeant, lectin like agglutinating, facilitating insemination and fertilization in marine animals properties are also reported. The marine invertebrate mentioned is especially the sea cucumber. Sea cucumbers are echinoderms, members of the group of spiny skinned animals that also includes starfishes and sea urchins. Scientifically called Holothurians, they have elongated tubular bodies which are rubbery and without bony skeletons. They have the following taxonomic position.

BACKGROUND OF THE INVENTION

Sea cucumbers have following taxonomic position.
Subkingdom: Metazoa
Phylum: Echinodermata
  Sub-Phylum: Eleutherozoa
    Class: Holothuroidea
Subclasses: Aspidochirotacea, Dendrochirotacea, Apodacea
  Orders: Dendrochirota, Aspidochirota, Elasipoda, Molpadonia and Apoda Amongst these orders sea cucumber *Holothuria scabra* belongs to:
Order: Aspidochirota
  Family: Holothuriidae
    Genus: *Holothuria*
      Species: *scabra*

Echinoderms are coelomate invertebrates which are exclusively marine, never colonial, are unsegmented with a basic pentameric radial, symmetry in the adult form, no head or brain, and distinguished from all other animals by structural peculiarities of skeleton and coelom. Class Holothuroidea has animals with body bilaterally symmetrical, usually elongated in the oral-aboral axis having mouth at or near one end and anus at or near the other end. The body surface is coarse, endoskeleton reduced to microscopic spicules or plates embedded in the body wall, mouth surrounded by a set of tentacles attached to water vascular system; podia or tube feet are usually present and locomotory; alimentary canal is long and coiled and cloaca usually with respiratory trees; sexes are usually separate and gonad single or paired tuft of tubules. They are sedentary forms either attached to hard substrate or burrow into soft sediments with anterior and posterior ends projected. There are more than 1000 species of holothuroids. They vary from 2 cm to 2 meter in length. They are among a few of the animals whose habitat is not restricted by ocean depths. Some of the species are reported to be making 50% of life forms at 4000 m and 90% at 8000 m depths. The species *Holothuria scabra* also called by some as *Metriatyla scabra* Jaegea is widely distributed in East Africa, Red Sea, Bay of Bengal, East India, Australia, Japan, South Pacific, Philippines, Indian Ocean and other Indo-Pacific regions. It is used for human/animal consumption in Sabah, Malaysia and Indonesia and other Indo-Pacific countries.

PRIOR ART REFERENCES

Pigments belong to the categories of inorganic and organic types. The former are the inorganic chemistry compounds which are used for various decorative and painting purposes etc. Organic pigments like organic dyes date back to the ancient times. The use of dyes from plants like Brazil wood, log-wood, Persian berry indigo and madder are reported from near east and far eastern countries even before Biblical times (George L. Clark, 1966 "Encyclopaedia of chemistry, 2nd ed. Pages 833–835). Debra K. Hobson and David S. Wales describe "Green dyes" which are produced as secondary metabolites from some groups of living organisms like fungi, blue green algae, sea urchins, star fishes arthropods and coral reef coelenterates (Journal of the Society of Dyers and Colourists (JSDC), 114, 42–44, 1998). These are anthraquinone compounds, historically of crucial importance in the dyestuffs industry. Stainsfile-Dyes A gives Dye Index of 264 dyes, out of which only six are natural dyes from all types of living organisms. (http://members.pgonline.com/~bryand/dyes/dyes.htm).

Cell permeant fluorescent dyes are greatly in demand for their applications in the study of live cell functions, drug delivery and study of various cell organelle. A eukaryotic cell may have several compartments each bounded by a membrane whereas a bacterial cell may consist of a single compartment. The permeability specificity is a characteristic of the cell membranes. A good dye is the one, which can show the different parts of the cell at one emission and at different emissions. The fluorophore attached to various, proteins have been synthesized and described in Handbook of fluorescent probes and Research chemicals by Richard P. Haughland 1996. Page 126–128. The range from the blue fluorescent Cascade blue and new AMCA-S dyes to the red fluorescent Texas Red dye and phycobiliproteins is embodied. The company has high lighted Oregon green conjugates, Rhodol Green conjugates; Bodipy conjugates;Eosin labelled secondary reagents; Red fluorescent Rhodamine Rd-X and Texas Red-X conjugates; Phycobiliprotein conjugates; Cascade blue and AMCA-S conjugates.

All these dyes are synthetic and single one of them emits in one particular spectral range. The combinations of 2–3 dyes are then made for multiple colored experiments.

The same company also offers Jasplakinolide, a macrocyclic peptide isolated from the marine sponge Jaspis johnstoni as a cell permeant F-actin probe. But it is toxic and exhibits fungicidal, insecticidal, and antiproliferative activity.

Most of the currently available dyes in the market are synthetic. Stainfile-Dyes A has given a Dye index of 264 dyes. Out of which 258 are synthetic and only six are natural dyes (http://members.pgonline.com/~bryand/dyes/dyes.htm). Production of synthetic dyes often require use of strong acids, alkalies and heavy metals as catalysts at high temperatures. This makes the processes and the effluents to be discharged an issue of environment degradation. The dyestuff industry is continuously looking for cheaper and more environmentally friendly routes to existing dyes. (Hobson and Wales,1998. Green Dyes, Journal of the Society of Dyers and colourists (JSDC), 1998,114,42–44).

All of the available dyes are not fluorescent. Bitplane products have displayed list of the 123 fluorochromes in the market and their excitation and emission spectrum (http://www.bitplane.ch/public/support/standard/fluorochrome.htm).

Fluorescent dyes are widely used in labeling of molecular probes for localizing biological structures by fluorescence microscopy e.g in immunoassays, labeling nucleotides and oligonucleotides for in situ hybridization studies, binding to polymeric microspheres and staining of cells for use in imaging studies. Dyes are also used for selective destruction of cells such as in the technique of photodynamic therapy. (Haughland, R. P and Kang, H. C. U.S. Pat. No. 4,774,339; Sep. 27, 1988 Haughland, R. P and Kang, H. C. U.S. Pat. No. 5,248,782, Sep. 28, 1993).

Fluorescence is a phenomenon in which an atom or molecule emits radiation in the course of its transition from a higher to a lower electronic state. It follows stoke's law according to which the wavelength of the fluorescent radiation is always longer than that of the excitation radiation. The process of fluorescence is quite different from the phosphorescence and bioluminescence. The term fluorescence is used when the interval between the act of excitation and emission of radiation is very small ($10^{-8}$–$10^{-3}$ second). In phosphorescence the time interval between absorption and emission may vary from $10^{-3}$ second to several hours (R. Norman Jones, 1966 in: The encyclopaedia of chemistry, $2^{nd}$ edition, 1966, Pages 435–436). Bioluminescence is the term used for the light produced as a result of a chemical reaction occurred at a particular time in a particular cell within the body of a living organism.

A large number of fluorescent dyes are reported in the Handbook of Fluorescent probes and Research Chemicals by Richard P. Haughland, $6^{th}$ edition Printed in the United States of America, 1996. In the same book on pages 1–6, Ian D. Johnson (1996) described in details the process of fluorescence & its methods of detection in certain molecules called fluorophores or fluorescent dyes by him (generally polyaromatic hydrocarbons or heterocycles). The most versatile currently in use fluorescent dyes are Fluorescein and fluorescein based and BODIPY dyes and their derivatives. The authors have dealt in with the shortcomings of all these dyes and described their preferences of characteristics of dyes. Many derivatives of the fluorescent dyes and their synthesis are disclosed in US patents (Haughland, R. P and Kang, H. C. U.S. Pat. No. 4,774,339, published on Sep. 27, 1988; Haughland, R. P and Kang, H. C. U.S. Pat. No. 5,248,782 of Sep. 28, 1993; Kang, H. C. and Haughland, R. P, U.S. Pat. No. 5,187,288 published on Feb. 16, 1993;; Kang, H. C. and Haughland, R. P in U.S. Pat. No. 5,274,113 of Dec. 28, 1993 and; Kang, H. C. and Haughland, R. P, U.S. Pat. No. 5,433,896 Jul. 18, 1995; Kang, H. C. and Haughland, R. P. U.S. Pat. No. 5,451,663 published on Sep. 19, 1995).

Rosenblum Barnett B, Spurgeon S, Lee Linda G, Benson Scott C and Graham Ronald J in international patent No. W00058406, publication date Oct. $5^{th}$ 2000 reported 4,7-Dichlororhodamine dyes useful as molecular probes. Collin, P. D. in his U.S. Pat. Nos. of Jun. 23, 1998, Mar. 2, 1999 and Nov. 16, 1999 respective as U.S. Pat. Nos. 5,770,205, 5,876,762 & 5,985,330 have described therapeutic properties of various body parts of sea cucumber.

R. Norman Jones in The encycopaedia of chemistry, $2^{nd}$ edition, 1966, Pages 435–436 has described speciality of a good fluorophore. According to him A fluorescent molecule must have a good chromophoric system for absorption of excitation energy and a shielding mechanism to save too rapid dissipation of the excitation energy into vibrational motion before the fluorescence retardation act can occur. He also commented that though the relationship of the molecular structure and the fluorescence of compounds is not well understood there are certain groups, presence of which is associated with fluorescence. For example, in the organic molecules presence of phthalein and aromatic structures such as anthracene and naphthacene are particularly associated with bright fluorescence. Few inorganic compounds fluoresce strongly in the liquid state and in solids, fluorescence is often modified by the presence of trace impurities.

Variety of carotenoid pigments are reported from the carotenoid-producing bacterial species (U.S. Pat. No. 5,935,808 published on Aug. 10, 1999, inventors Hirschberg, et al. and U.S. Pat. No. 5,858,761, Jan. 12, 1999 inventors Tsubokura, et al.). Collin; Peter Donald in his U.S. Pat. No. 6,055,936 published on May 2, 2000 disclosed sea cucumber carotenoid lipid fractions and process. Bandaranayake, W. M. and Des Rocher, A 1999 (Marine biology 133;163–169) described carotenoid pigments from the body wall, ovaries and viscera of *Holothuiria atra* from Australia.

There are reports on few fluorescent natural dyes available. A green fluorescent protein GFP has been described from the pacific jellyfish, *Aequora aequora* by Shimomura, O, Johnson, F. H. and Saiga, Y in Journal of cellular and comparative physiology, 59, 223–239, 1962, Chalfie M in 1: Photochem Photobiol October 1995 62 (4): 651–6 "Green fluorescent protein"; Youvan D C, Michel-Beyerie M E "Structure and fluorescence mechanism of GFP in National Biotechnology Oct. 14, 1996 (10): 1219–20 and Chalfie M, Yuan Tu, Ghia Euskirchen, William W. Ward, Douglas C Prasher in SCIENCE 263 (1994) 802–805 reported that GFP purified is a protein of 238 aminoacids. It absorbs blue light maximally at 395 nm with a minor peak at 470 nm and emits green light at the peak emission of 509 nm with a shoulder at 540 nm. This fluorescence is very stable and virtually no photo bleaching is observed.

GFP with fluorescence in other wavelengths in the ranges of red and yellow are described from non bioluminescent anthozoans, particularly Discosoma coral. Gurskaya N G, Fradkov A F, Terskikh A, Matz M V, Labas Y A, Martynov V I, Yanushevich Y G, Lukyanov K A, Lukyanov S A in 1: FEBS Lett Oct. 19, 2001; 507 (1): 16–20 n described GFP-like chromoproteins as a source of far-red fluorescent proteins. Wachter R M, Elsliger M A, Kallio K, Hanson G T, Remington S J. In 1: Structure Oct. 15, 1998; 6(10): 1267–77 described "Structural basis of spectral shifts in the yellow-emission variants of green fluorescent protein". Fradkov A F, Chen Y, Ding L, Barsova E V, Matz M V, Lukyanov S A "Novel fluorescent protein from Discosoma coral and its mutants possesses a unique far-red fluorescence. In 1:FEBS Lett Aug. 18, 2000: 479 (3):127–30. They describe a novel gene for advanced red-shifted protein with an emission maximum at 593 nm was cloned from Discosoma coral. The protein, named dsFP593, is highly homologous to the recently described GFP-like protein drFP583 with an emission maximum at 583 nm. They developed various mutants of both these genes. A hybrid mutant variant resulted I a mutant variant with a uniquely re-shifted emission maximum at 616 nm. Matz M V, Fradkov A F, Labas Y A, Savitsky A P, Zaraisky A G, Markirlov M L, Lukyanov S A. 1: Nat Biotechnolo December 1999:17(10): 969–73.

In the south east and south pacific countries sea cucumbers are well known for their use in the health food and drug industry as a food item or ingredient to various drug compositions especially for inflammation of joints, sprains and other therapeutics. Several US and International patents are on record and screened. (Fan Hui-Zeng, Yu Song, Yamanaka E, Numata K, Oka T, Suzuki N, muranaka Y in U.S. Pat. No. 5,519,010 dated May 21, 1996; Weiman, Bernard, U.S. Pat. No. 5,888,514 published on Mar. 30, 1999; Katsukura, Kitazato, Kenji Yamazaki, Yasundo U.S. Pat. No. 5,993,797 dated Nov. 30, 1999; Henderson, R. W; Henderson, T and Hammd, T U.S. Pat. No. 6,255,295 dated Jul. 3, 2001; Shinya U.S. Pat. No. 6,203,827 of Mar. 20, 2001; U.S. Pat. No. 5,770,205 patent by Collin Peter Donald published on Jun. 23, 1998 and WO patent no. 0001399 published on Jan. 13, 2000; Kovalev V G, Sementsov V K, Slutskaja t n, Akulin V N, Timchishina G N in RU 2147239 published on Apr. 10, 2000; Li Zhaoming, Zhu Beiwei CN 1286926 dated Mar. 14, 2001 Qu Jianhong, Song Xiuqin, Zheng Fuqiang CN 1223131 dated Jul. 21, 1999; Wufa Zhuang Wufa, Meizheng Zhuang CN 1142365 dated Feb. 12, 1997; Fang Hua CN1312031 dated Sep. 12, 2001 and Ding Cunyi CN1173290 dated Feb. 18, 1998, Collin Peter Donald WO9937314 published on Jul. 29, 1999). The use of the ingredients originated from seacucumber in Anti HIV drug are disclosed (Hoshino Hiroo EP 410002 dated Jan. 30, 1991 and Hoshino Hiroo EP495116 dated Jul. 22, 1992). In view of their importance the animals are tried to be cultivated under captivity (Annie Mercier, S C Battaglene and Jean-Francois Hamel in Journal of experimental Marine Biology and Ecology Volume 249 issue1:89–110. 2000 "Settlement preferences and early migration of of the tropical sea cucumber *Holothuria scabra*). Gu Zaishi, Wang Shuhai, Zhou Wei disclosed "Ecological reproducing method for Stichopus japonicus" in patent No. CN1179261 dated Apr. 22, 1998.

But as all these patents are not directly of relevance to the topic of the present patent so we have not included them in the references given.

Goswami, Usha and Ganguly, Anutosh has filed a patent on a natural fluorescent dye from a marine invertebrate (CSIR, NF-140, 2001 U.S. patent application Ser. No. 09/820,654 filed on Mar. 30, 2001). This pertains to the crude extract from *Holothuria scabra* which has the fluorescent qualities at three different wavelengths when excited at different UV and visible ranges of the spectra of light. The invention also provides a process of the extraction, purification and characterization of this new dye which is a partially purified natural dye from a seacucumber. The utilities of the dye as a epifluorescent stain and nonradioactive fluorescent dye useful for labeling of molecular probes for in situ hybridization studies is described besides several other qualities of the dye as a drug. In this patent prior art we have dealt in details about the pigments, synthetic dyes and natural dyes from terrestrial plants and microbe. (U.S. Pat. No. 4,452,822 published on Jun. 5, 1984, inventors Shrikhande, Anil J, U.S. Pat. No. 5,321,268 of Jun. 14, 1994 by Crosby David A and Ekstrom Philip A; U.S. Pat. No. 5,405,416 published on Apr. 11, 1995 authors Swinton; Robert J, U.S. Pat. No. 5,858,761 published on Jan. 12, 1999, inventors Tsubokura, et al. U.S. Pat. No. 5,902,749 of May 11, 1999 inventors Lichtwardt et al. U.S. Pat. No. 5,908,650 published on Jun. 1, 1999 inventors Lenoble, et al. U.S. Pat. No. 5,920,429 published on Jul. 6, 1999 Burns et al. U.S. Pat. No. 5,935,808 on Aug. 10, 1999 of Hirschberg et al; U.S. Pat. No. 5,989,135 of Nov. 23, 1999 inventors Welch; David Emanuel; U.S. Pat. No. 6,055,936 of May 2, 2000; Collin; Peter Donald; U.S. Pat. No. 6,056,162 May 2, 2000; Leighley; Kenneth C.; U.S. Pat. No. 6,103,006 Aug. 15, 2000 DiPietro; Thomas C.; U.S. Pat. No. 6,110,566 Aug. 29, 2000; White et al.; U.S. Pat. No. 6,140,041 Oct. 31, 2000 LaClair; James J. U.S. Pat. No. 6,165,384 Dec. 26, 2000 Cooper et al.; U.S. Pat. No. 6,1810,154 Jan. 30, 2001 Wrolstad et al. EP0206718 published on Dec. 30, 1986 inventors Cramer Randall J; IE901379 of Jan. 30, 1991 Lee Linda G; Mize Patrick D; WO9010044 of Jul. 7, 1990. Swinton; Robert J; AU704112 published on Oct. 7, 1997 inventors Burns David M; Pavelka Lee A; DE19755642 of Jun. 24, 1999 of Weimer Thomas DR.; WO9938919 Sep. 28, 1999 Laclair James J; WO0058406 of Oct. 5, 2000 by Rosenblum Barnett B et al.; WO9938916 Aug. 15, 2000 inventors DiPietro; Thomas C ; WO9920688 of Aug. 29, 2000 inventors Pavelka Lee et al.; WO9920688 of Aug. 29, 2000 inventors White et al. The multiple uses of fluorescent dyes in the molecular biology research, in industrial applications and in life saving devices etc. are also described.

Collin, P. D in his U.S. patents of Jun. 23, 1998, Mar. 2, 1999 and Nov. 16, 1999 respective as U.S. Pat. Nos. 5,770,205, 5,876,762 & 5,985,330 have described therapeutic properties of various body parts of sea cucumber. All these references also pertain to the present patent.

In another patent Goswami, Usha and Anutosh Ganguly (Filing number) has described A novel organosilicon Si—O—R type of compound and multiple fluorescent natural dye purified from the body wall extract of a marine invertebrate *Holothuria scabra*. The compound is a polysacchride fluorochrome having a phenolic fluorophore part and is connected to a silicon matrix around it through the sulphate bonds. This silcon part is an integral part of the core molecule and takes part in the metabolism of the animal. The compound is rich in sulphur. The invention also provides a process for the extraction, purification and characterization of the novel compound and the multiple fluorescent dye from a living marine organism, especially sea cucumber. The patent also discloses for the first time chemical structure of a novel fluorescent compound where silicon has become the integral part of the organic molecule and that of its phenolic type of its fluorophore. It further provides the unusual properties of the compound and characteristics of the dye and discloses their advantages. Several derivatives of dyes with high and low molecular weight and desirable properties for fluorescent probes for single and multiple color applications are contemplated. Further the compound can be an easily miscible ingredient in compositions of Dye industry, Cosmetic industry and pharmaceutical industries.

In this patent a large body of literature upon fluorescent dyes reported in the Handbook of Fluorescent probes and Research Chemicals by Richard P. Haughland, 6th edition Printed in the United States of America, 1996 are incorporated. In US and international patents many derivatives of the fluorescent dyes and their synthesis are disclosed (Haughland, R. P and Kang, H. C. U.S. Pat. No. 4,774,339, published on Sep. 27, 1988; Haughland, R. P and Kang, H. C. U.S. Pat. No. 5,248,782 of Sep. 28, 1993; Kang, H. C. and Haughland, R. P, U.S. Pat. No. 5,187,288 published on Feb. 16, 1993; Kang, H. C. and Haughland, R. P in U.S. Pat. No. 5,274,113 of Dec. 28, 1993 and Kang, H. C. and Haughland, R. P, U.S. Pat. No. 5,433,896 Jul. 18, 1995; Kang, H. C. and Haughland, R. P. U.S. Pat. No. 5,451,663 published on Sep. 19, 1995, Rosenblum Barnett B, Spurgeon S, Lee Linda G, Benson Scott C and Graham Ronald J, international patent No. WO0058406, publication date Oct. 5th 2000 reported 4,7-Dichlororhodamine dyes useful as molecular probes. All these references pertain to the present patent also.

The applicants have adopted a different approach from their earlier patents and those reported by other workers. The dyes reported in our earlier patents were though natural but they were toxic. The spectral ranges of emissions at various excitation wavelengths were also different. The dyes were non-protein aqueous and were not effective for in situ studies of live cells. Their applications and uses in the biomedical and engineering sciences were also different.

The dye now reported is though also a natural dye but is nontoxic multiple fluorescent protein extracted directly from the cells of the ovary of a non bioluminescent invertebrate. The marine animal source is a holothurian, sea cucumber called *Holothuria scabra* which is a new source for nontoxic fluorescent protein dyes. Unlike the synthetic dyes there is no need for use steps of strong acids and alkalies in their productions. Unlike the earlier described carotenoid pigments from the sea cucumber ovaries this dye is not a caretinoid pigment. It is a fluorescent protein. The fluorescent protein of the present dye is also different from the Green Fluorescent Protein (GFP) from the Jellyfish *Aequorea aequorea*, which emits single color green light. Though different varieties of GFPs with shift of colors either in red or in yellow ranges are described from other animals. Our approach is different from those GFPs. We have a single fluorescent protein dye which when excited with different UV and visible light spectral wavelengths, emits fluorescence in the light and dark blue, green, yellow, orange and red ranges.

Unlike most synthetic fluorescent dyes, our dye does not need to be mixed with another dye for getting different fluorescence hues at different wavelengths. It emits six different colored fluorescence at three different excitation wavelengths, which can have multiple uses. The cell constituents show a contrasting staining from the background where only dye solution is present. In our dye the fluorophore is attached to the protein and produces fluorescence, which is again different from the GFPs chromatophore which is derived from the primary aminoacid sequence through the cyclization. In our dye the fluorophore both in the single and attached to the protein form, when excited with UV, blue and green wavelengths emits three different wavelength emissions following stoke's law.

The present dye is also cell permeant and permeates through various cell membranes of intra cellular constituents.

Once the dye attaches to the cell membranes it is stable at the room temperature for months and does not get photobleached and contaminated by microbes. Its fluorescence does not get deteriorated at high and low temperatures unlike extracts of some algae and luminescent organisms.

The dye is nontoxic to the *E.coli* bacteria and the sex cells and larvae of estuarine and marine animals. So its effluents will not kill the marine and estuarine animals larval stages. It is a nontoxic and eco-friendly dye.

Another important feature of the dye is that it shows fluorescence in only the live and fixed tissues. The dead ones are not stained. One important aspect of the dye is its making compositions and kits for non-radioactive in situ labeling of molecular probes and counter staining. At different wavelength excitations it gives the effect equivalent to color of DAPI, FITC and PI and other marketed fluorescent probes. The dye is a natural multiple fluorescent dye. Actually, this single dye covers the colors of wavelength spectrum of 123 flurochromes presently known in the market (see Bitplane products (Fluorochrome) on the internet (http://www.bitplane.ch/public/support/standard/Fluorochrome.htm).

Yet another aspect of the invention is that the dye has agglutinating qualities.

Yet another aspect of the invention is that the dye enhances rate of insemination of sperms and fertilization of the egg in oysters.

Yet another aspect is its use as a nontoxic fluorochrome stain in epiflourescence microscopy for the live cells. The dye is a natural dye and not synthetic which is permeant through various membranes and stains them differentially. This application provides a simple and quick method of checking cytogenetical preparations for multiple uses like molecular diagnostics using fluorescent in situ hybridization techniques, rapid diagnosis of biocontamination in tissue cultures, food industry and industrial preparations, flowcytometry etc.

Yet another aspect of the dye is its use as a component of the non-radioactive labeling kits for advanced molecular biology applications where protein dyes are needed for studies of live cell functions.

OBJECTS OF THE INVENTION

The present invention discloses the process of extraction, purification and characterization of a fluorescent pigment from ovarian extract of a marine echinoderm. The pigment is a natural dye and is a negatively charged fluorescent protein to which a non-polar fluorophore is attached. The dye emits fluorescence in multiple fluorescent excitation ranges of UV and visible light spectra. It further discloses the chemical, physical, spectroscopic, epifluorescent microscopic nature of the dye. The nontoxic, cell membrane permeable and agglutinating qualities are tested.

The main object of the present invention is to provide a natural nontoxic ecofriendly multiple colored fluorescent protein dye from the ovarian tissue of sea-cucumber *Holothuria scabra*.

Another object of the invention is to provide a process for extraction, partial purification and characterization of the said fluorescent protein from the marine animal *Holothuria scabra* which is a non bioluminescent marine animal.

Another object of the invention is to provide a dye which is cell membranes permeable, giving demarcation of cell partioning and having a visual effect at single and multiple emission ranges of UV and visible light spectral wavelengths.

Another object of the invention is to develop a longer time photostable dye.

Another object of the invention is to use the dye for checking survival and growth of eukaryotic and prokaryotic cells.

Another object of the invention is to use the dye for enhancement fertility and cell proliferation rates in the aquaculture and ecologically important animals like oysters.

Yet another object of the invention is to provide compositions employing the dye obtained from the tissues of *Holothuria scabra*.

Still another object of the invention is to provide a dye that emits fluorescence in six different wavelength ranges of UV and visible light spectra on particular excitation with three wavelengths.

Another object of invention is to observe the fluorescence and visible spectroscopic analysis and range of emission wavelengths.

Yet another object is to observe the three different fluorescence colored emissions of the dye in UV and visible ranges of epifluorescence microscopy cubes.

Still another object of the invention is to observe the effect of fluorescence staining of the cytogenetical slides to screen chromosomes, cells and tissues by using the dye of the invention.

Yet another object of the invention is to check agglutinating property of the dye.

Yet another object of the invention is to see presence or absence of a glycoprotein in the dye solution.

Yet another object of invention is to see its nontoxic nature by performing experiments with bacteria and eukaryotic gonial cells and larvae.

Yet another object of the invention is its application for checking bacterial contaminations in food industry.

Yet another object of the invention is to observe the fluorescence and visible spectroscopic analysis and range of emission wavelengths.

Yet another object of the invention is that the dye is useful as a non-radioactive label of fluorescent molecular probes.

Still another object of the invention is that the dye does not get quenched fast in the excited light and photobleaching does not occur while screening slides.

Yet another object of the invention is to observe the fluorescence and visible spectroscopic analysis and range of emission wavelengths.

Yet another object of the invention is that the dye is useful as a non-radioactive label of fluorescent molecular probes.

Another object of the invention is that though the dye is proteinaceous in nature but still it is highly stable at the room temperature once it gets attached to the cell membranes.

Still another object of the invention is that its fluorescence quality does not get deteriorated even at extremely high and low temperatures.

Yet another object of the invention is to develop kits for non-radioactive labeling of molecular probes and counter staining.

Yet another object of the invention is industrial use of the compound for synthesizing derivatives of fluorescent dye for flowcytometry, microarrays, immunoassays and several other molecular applications.

Still another object is to develop kits containing the fluorescent dye as in situ hybridization non-radioactive labeling kits for molecular probes.

SUMMARY OF THE INVENTION

Accordingly, the invention provides a novel nontoxic, cell permeant, natural multiple colored fluorescent protein dye obtained from ovarian extract of a non bioluminescent marine organism called sea-cucumber *Holothuria scabra*. The invention also provides a process for extraction, isolation and characterization of the said protein dye. Further, the invention discloses the presence of at least four compounds in the said dye which is in a solution form. The fluorophore in the dye is associated with a negatively charged protein. There is also present at least one glycoprotein in the solution of the dye. This glycoprotein is showing lectin like agglutinating properties. The dye is tested for presence of agglutination, fertility rate enhancement and nontoxic nature upon eukaryotic and prokaryotic live cells. The dye compositions will be useful as fluorescent epifluorescence microscopic stain in visual tracking of in situ intra and intercellular live cell functions.

DETAILED DESCRIPTION OF THE INVENTION

Accordingly, the present invention provides a bioactive semi-purified extract containing non-toxic proteinaceous fluorescent dye obtained from female gonads i.e. ovarian tissues of marine organism *Holothuria scabra*, occurring in intertidal, submerged, shallow and deep waters, usually abundant in shaded areas such as alcoves, crevices, ledges, overhangings, rocky sandy habitats, having dull to bright colored with or without exo- and endo skeleton, sessile, sedentary drifters, nektonic with varied swimming internal power usually nocturnal in habit, liabile to active predation, with and without luminescent, having external fertilization of eggs and fluorescent pigments giving emissions in few to all wavelength ranges of UVB, UVA, visible colored spectrums and infra red spectrum.

After much research, the applicants have now identified a novel nontoxic fluorescent protein dye obtained from tissue of marine animals, specially from invertebrates and more specifically from the sea-cucumber *Holothuria scabra*.

Subkingdom: Metazoa
Phylum: Echinodermata
Sub-Phylum: Eleutherozoa
Class: Holothuroidea
Subclass: Aspidochirotacea
Order: Aspidochirota
Family: Holothuriidae
Genus: Holothuria
Species: *scabra*

The invention further provides a natural cell permeant multiple fluorescent protein dye which is obtained from the ovary of the animal and which is nontoxic to live cells. It also describes the physical and chemical nature of the dye and its stability in direct light, high and low temperature. The said dye has three colored fluorescent emissions at three different excitation wavelengths of UV and visible light spectrum. The invention also relates to screening of cells under fluorescence microscope for a rapid check of contamination's, cell survival and presence or absence of agglutinating activity. The invention is also concerned with the uses of the dye as a non-radioactive label of protein, DNA and RNA molecular probes for advanced molecular diagnostics, epifluorescence microscopy for single and double staining of chromosomes, cells and tissues, fluorescence in situ hybridization applications, and biocontamination check, in aquaculture and biomedical sciences for enhancement of fertility, as a component of kits where studies on live cells are required, novel remote sensing devices, underwater probes, life saving devices, mark the location of crashed aircraft, life rafts and defence equipment for example rockets, various fluorescence applications in sub zero temperature conditions and many more. The dye is environmentally eco-friendly as it does not kill larvae of the estuarine and marine animals. The invention describes fluorescent dye obtained from marine animals, which either absorb sunlight for their physiological functions or are exposed to longer durations of sunlight and appear to have evolved mechanisms of fluorescence at different wavelengths. Like the phytoplankton, picoplankton and photosynthetic bacteria absorb sunlight for their photosynthetic functions, the required wavelengths of light spectra are used in the chemical pathways and extra light is emitted following Stoke's law.

The invertebrate animals who do not have an extra outer armor like a shell and conspicuous defence organs, who have hard and spiny skin, who have a strong endoskeleton formed of ossicles, are sedentary or slow mobility, have long hours of exposures to direct sunlight, live in sand or crevices may show fluorescence. The present invention seeks to overcome the drawbacks inherent in the prior art by providing highly efficient and selective methods for extraction, purification and characterization of a dye from a marine invertebrate and its multiple uses in making kits for molecular diagnostics using non-radioactive labels, molecular markers, epiflourescence microscopy, photochemotherapeutics, component of new instrumentation devices for land and underwater probes, cosmetic industry, food industries and armed forces etc.

The said marine invertebrate is an echinoderm taxonomically called *Holothuria scabra* belonging to the class Holothuroidea. The product of the invention is a novel nontoxic multicolor fluorescent protein dye which is reported for the first time. The animals were collected from the shores of central west coast of India during low tide, brought to the laboratory and maintained in glass tanks containing sea-water of salinity 30–32% per par. The animals were adults and sexually mature. The taxonomic position was identified as above said.

In fact, most of the dyes available are synthetic in nature. There are only 6 types of natural dyes. This includes dyes obtained from all living organisms. The fluorescent dye reported in the present invention is the only one of its speciality of multicolor fluorescence nontoxic and living cell membrane permeant extracted from ovarian tissue of a marine sea cucumber.

As used herein the term dye is used for a pigment, which does not get decolorized by a reducing agent. The said dye imparts color to the fibre, cellulose etc. It is called a natural dye as the source is from a marine animal found commonly in the nature along shores, shallow and deep waters of the world and is not a synthetic pigment. A fluorescent dye is one, which on excitation at a particular wavelength during the transition from a higher to the lower electronic state within a very short duration it emits light.

Multiple colored fluorescence means the emission of different colored light when excited at different ranges of wavelengths. It emits blue, yellowish green and orangish red colored hues of fluorescence at excitations with different spectra of UV and visible light.

Cell membrane permeant means that the dye passes through the pores of the live cell and nuclear membranes of the cell and imparts it multicolored fluorescence in the shades of bluish white, yellow and orange depending upon excitation with the UV, blue and green wavelengths.

The nontoxic to live cells means when tested upon live cells of both eukaryotic and prokaryotic nature the cells do not die.

Photostabilty of dye after attaching to cell membranes means the continuation of fluorescence emission after staining the live and fixed cells with the said dye.

The molecular diagnostics as used herein means the use of the dye as a non-radioactive label of molecular probes for fluorescent in situ hybridization applications in molecular cyto-genetics and as markers in microarrays, and molecular biological studies. The epifluorescent microscopy here pertains to the microscopic studies of cyto-genetical preparations of slides by using the present dye as a stain and recording different colored fluorescence when observed under different cube configurations emits a particular colored emission on excitation with known fluorochromes.

The fluoro-chrome cubes WUB, WB, WG are the designated filter cube configurations of the Olympus BX-FLA reflected light fluorescence attachment for different wavelengths. On the microscope it is written as WU, WB, WG and BF for respective cubes hence the same abbreviation is used throughout the patent.

The names of various dyes already present in the market are mentioned as per their trade names given in Stains File dye index, Bitplane products and Molecular probes. The references of these companies are mentioned in the prior art.

Accordingly, the invention provides a method for extraction, partial purification and characterization of a natural nontoxic cell membrane permeant multiple fluorescent dye. It further provides compositions at which the dye induces agglutination, enhances insemination and fertilization rates of oyster gonial cells and doesnot kill the eukaryotic and prokaryotic cells and it comprises of:

i. collection of the material from field and maintenance in the laboratory conditions,
ii. extraction of the pigment from the skin of the echinoderm sea cucumber *Holothuria scabra*, and
iii. partial purification of the dye.
1v. Testing of biological activities.

The bioactive extract of the invention is obtained from the ovarian tissue of marine sea-cucumber *Holothuria scabra*. This extract is useful as a natural fluorescent dye and has the following characteristics:

i. No decolorization by a reducing agent,
ii. not a synthetic compound,
iii. crude extract of the dye is yellowish orange in color,
iv. partially purified dye filtrate maintains the same color.
v. The dye is in a solution form.
vi. The alcoholic extract is maintained at 4 degree centigrade.
vii under tube light emits variety of colors of the visible light spectrum.
viii. the pigment is directly insoluble in water.
ix. the pure dye pigment is soluble in 70% ethanol.
x. The further dilutions can be made with ultra pure/seawater depending upon its application.
xi. is negatively charged,
xii. has pH between 6.8–7.5.
xiii. absence of a quinonoid ring,
xiv. proteinaceous in nature,
xv. The solution of the dye contains atleast one glycoprotein as seen from HPLC data.
xvi. There are atleast four compounds present in the dye solution.
xvii. The presence of carbohydrates and protein is confirmed by HPLC.
xviii. The fluorophore is associated with the protein.
xix. The fluorescence spectroscopic analysis showed maximum wavelength of excitation at 351 nm, 580 nm, 720 nm.
xx. The fulorescence emission spectrometric analysis showed emission maximas at two peaks at 450 and 550 nm.
xxi. dye in soultion emits six different colored fluorescence at 3 different wavelengths of the UV and visible ranges of the fluorescent cubes of an epifluorescence microscope, depending upon whether it is the dye solution alone or the cells on which it has attached.
xxii. fluorescence blue color emission occur in the 450 nm–470 nm range when excited under ultra violet cube WU—330 nm–385 nm excitation range,
xxiii. fluorescence yellowish green color emission occurs in the 510 nm–570 nm range when excited under WB cube of 450 nm–480 nm excitation range,
xxiv. fluorescence orange color emission occurs in the 610 nm–650 nm range when excited under WG cube of 510 nm–550 nm excitation range,
xxv. the dye emits hues of yellowish grays under the ordinary transmitted light bulb of the epifluorescence microscope when seen under 100× oil immersion objective, xxvi. the dye emitted these fluorescence colors even at a dilution range of 1:20000 times,
xxvii. the fluorescence of the extract persisted even after at least 1 year at the 4 degree entigrade,
xxviii. the fluorescence of the dye is highly photostable and does not get deteriorated by long exposures to direct light once the cells are stained even at the room temperature.
xxix. the fluorescence of the dye does not change even when frozen at minus 20 degree centigrade, a temperature at which the molecules are unable to attain the energy necessary for activation like in extracts from luminescent organisms.
xxx. The dye is nontoxic to the living cells of eukaryotes.
xxxi. The dye is also nontoxic to the prokaryotes (*E.coli*),
xxxii. The dye induces lectin like agglutination in bacteria,
xxxiii. The dye induces lectin like agglutination in sperms of oysters.
xxxiv. The dye facilitates insemination of sperms and fertilization in much shorter a period then the controls,
xxxv. The dye is cell membrane permeant.
xxxvi. The dye is cell membrane impermeabile to dead eukaryotic cells.
xxxvii. The dye is cell membrane impermeabile to dead prokaryotic cells.
xxxviii. The dye is nondegradable once it stains the cell components.

The physical and other characteristics of the dye is assessed by the following steps:

i. Structural analysis of the dye,
ii. nontoxicity test,
iii. agglutination test,
iv. selective staining of cell membranes test,
v. Visible spectroscopy of the dye,
vi. Fluorescence spectroscopy of the dye,
vii. Physical checking of emission under a UV transilluminator 260–280 nm range,
viii. Preparation of slide with live oyster eggs and sperms,
ix. Preparation of slides of live bacteria,
x. Preparation of the fixed cells slides by air dried method,
xi. Staining of slides with the dye,
xii. Keeping controls for each experiment without adding dye.
xiii. Epifluoirescent microscopic screening of the live eukaryotic cells slides under fluorochrome cubes WU, WB, WG and Bright field,
xiv. Epifluorescent microscopic screening of the fixed eukaryotic cells under fluorochrome cubes WU, WB, WG and Bright field,
xv. Epifluorescent microscopic screening of the dead eukaryotic cells under fluorochrome cubes WU, WB, WG and Bright field,
xvi. Epifluorescent microscopic screening of the live bacterial cells under fluorochrome cubes WU, WB, WG and Bright field,
xvii. Epifluorescent microscopic screening of the dead bacterial cells under fluorochrome cubes WU, WB, WG and Bright field,
xviii. Epifluorescent microscopic screening of the live control cells without the dye under fluorochrome cubes WU, WB, WG and Bright field,
xix. Microphotography of emitted fluorescence in the areas of slides without any cells,
xx. Microphotography of emitted fluorescence of the cytogenetic slides under fluorochrome cubes WU, WB, WG and Bright field, and
xxi. Checking of wavelength ranges of the fluorescent hues of emission and wavelength ranges of the excitation ranges of fluorochrome cubes with the dye,
xxii. Checking of wavelength ranges of the fluorescent hues of emission and wavelength ranges of the excitation ranges of fluorochrome cubes with the cells stained with the dye, and
xxiii. checking for cell membrane permeability of plasmamembrane, cytoplasm, nuclear membrane, nucleoplasm and chromosomes.

Thus the invention provides a natural fluorescent dye of marine animal origin which emits six different colored fluorescence in the hues of blue, yellow and orangish red when excited with three different ranges of wavelengths in the UV and visible light spectral cubes of an epifluorescence microscope. The ranges of emissions of the dye solution and that of cells stained with the dye differs. The invention further relates to the epifluorescence microscopy of eukaryotic and prokaryotic live, fixed and dead cell preparations by using this dye as the epifluorescent microscopic stain. This dye could be used in making non-radioactive labeling kits for molecular diagnostics by fluorescent in situ hybridization in various molecular, biomedical and engineering sciences.

In an embodiment the source of the dye is an invertebrate marine animal belonging to SubKingdom: Metazoa, Phylum Echinodermata; subphylum: Eleutherozoa, Class Holothuroidea. Name: *Holothuria scabra*.

In yet another embodiment the *Holothuria scabra* is selected from the group comprising of sea cucumbers and widely distributed in the shores, shallow waters, deep waters all over the world particularly Indo-Pacific. The nearest well-known relatives of sea cucumber are the sea urchins and starfishes etc.

In yet another embodiment *Holothuria scabra* is dissected, its ovaries are separated and weighed. To 1 gm of ovarian tissue by wet weight 3 ml of 70% alcohol is added.

In yet another embodiment the extract is filtered through Whattman No. 1 filter paper.

In yet another embodiment the vial with screw cap carrying the solution of the dye is labeled as "Dye solution" and stored in cold room at 4° Centigrade till further use.

In yet another embodiment the color of the dye solution is noted with naked eyes and tube light.

In yet another embodiment the dye is found to be soluble in 70% ethanol. The further dilutions for experiments can be made in water.

In yet another embodiment the photostability of the dye at the room temperature in the solution and on the stained cells is noted. It shoowed that the dye is nondegradable once it attaches to the cell membranes.

In yet another embodiment test for electric charge of the Dye by electrophoresis is performed. Drift of the yellow spot to the positive terminal was observed. It proved that the dye contained a colored compound (pigment) which is negatively charged.

In yet another embodiment the pigment is a dye as it is giving a color to the filter paper. In yet another embodiment the dye has a pH range of 6.8–7.5

In yet another embodiment 1 ml of the dye solution which is the alcoholic ovarian extract was taken and 0.2 grams of di thio erythritol was incorporated. The solution doesnot get decolorized. It showed that the coloring part of the fluorescent compound is non reducible which means that any reducible ring like quinonoid ring is absent. The inference made form this experiment was that the colored compound is a non reducible dye.

In yet another embodiment 5 ml of the extract was subjected to heating in a water bath at 100 degree Centigrade. Coagulation was observed. Which confirmed the presence of protein in the alcoholic extract of the dye.

In yet another embodiment the colored part gets separated from the protein on coagulation and dissolves only in ether which is a non-polar solvent. The colored solution does not move towards any pole when paper electrophoresis is done. These indicate the non-polar nature of the fluorochrome.

In yet another embodiment the dye was subjected to Anthrone test (Ref) by using 4 ml of sulphuric acid and Anthrone reagent. 1 ml of Water 4 ml of conc.sulphuric acid and Anthrone reagent was kept as a blank. The blank was faintly green after 5 minutes whereas the extract was turned bright green after 5 minutes. The test proved that the carbohydrate is present in the dye solution.

In yet another embodiment the said dye (5 microliter) was subjected to Thin layer chromatography (TLC) by using silica gel-G plate. The solvent used was n-butanol, acetic acid and water in the ratio of 2:2:1. After running the TLC the plates were stained by Iodine vapor in a chamber. Four spots were found. The test proved that the crude extract contains minimum 4 different compounds. The spots and their respective Rf values are shown in Table 1.

In yet another embodiment fluorescence property of the pure compound is seen by Fluorescence spectrophotometry. The compound (Lyophilized after gel filtration), is dissolved in water (concentration 0.001 gm/ml) and subjected to fluorescence spectrophotometry. It is first subjected to an excitation scanning and is seen that the compound is getting excited at 351 nm, 580 nm & 720 nm.

In yet another embodiment the said dye was then subjected to fluorescence emission spectrophotometer analysis. The emission was in between 400 to 600 when excited at 351 nm. The emission maximas were two peaks at 450 nm and at 550 nm. (FIGS. 2 & 3).

In yet another embodiment analytical mode HPLC was performed for presence of proteins and carbohydrates.

In yet another embodiment HPLC of the dye solution was done by isocratic mode of reverse HPLC using solvent is 80% aceto-nitrile, and 20% water. in C18 reverse phase column.

In yet another embodiment UV detector in the wavelength of 280 nm and 205 nm detects the presence of proteins. FIG. 17 and Table 2 show results of the presence of protein by UV detector at 280 nm. It can be seen, the retention time of the 7 proteins varies between 2.1–8.8 minutes. The area covered is in the range of 535–116103. The maximum per cent area is of peak 1 having retention time of 2.1 minutes. This shows that the protein at peak 1 is in the largest quantity in the sample.

In yet another embodiment UV detector in the wavelength of 205 nm detects the presence of peptides. FIG. 18 and Table 3 show presence of 10 peptides by UV detector at 205 nm. The retention time is varying between 2.1–14.8 minutes. The area covered is in the range of 63482–3218965. And the maximum per cent area is of peptide at peak 3 having retention time of 3.9 minutes.

In yet another embodiment, RI detector detects the presence of carbohydrates. The stards used are GLUCOSE, SUCROSE AND FRUCTOSE. The results are shown in FIGS. 19, 22 and Table 4.

In yet another embodiment the association of fluorophore with the protein is proved based on the HPLC data analysis and the electrophoresis. Since the fluorophore is non-polar, it appears that in the alcoholic ovarian extract it may be bound to some component, which is negatively charged. As it is moving towards positive pole during electrophoresis. Also as shown by the HPLC data from Tables 1, 2, 3 & 4, there are only proteins and carbohydrates detected. Which suggested that the colored fluoropore be bound to some protein, which is negatively charged. So to say, the fluorescence activity of the dye solution is due to a component that includes non-polar fluorophore attached to a negatively charged protein, which gets easily separated when the protein is coagulated.

In yet another embodiment agglutionation test is done for confirmation of presence of glycoprotein. Since there was an indication of presence of at least one glycoprotein in the extract the bioassays were performed for presence of agglutination.

In yet another embodiment agglutination bioactivity test of the Dye on gram negative bacteria (*E.coli*) by performing two sets of experiment. In experiment 1, 50 microliter of the said dye was incorporated in 100 ml of the Muller Hilton's culture broth. A blank was kept without the marine extract. 0.1 ml of the fresh *E.coli* inauculum was incorporated in the culture broths. The culture broths were incubated in a orbital shaker air a rotation of 150 rpm. After 8 hours, turbidity was seen in both the cultures. But the culture containing the extract (Dye solution) has shown clump like growth. The cells were forming aggregates. The positive blank without the dye has shown normal growth.

In yet another embodiment in a second experiment, one loop of live *E.coli* bacteria was placed in 25 microliter of water on a microscopic slide and mixed. To this was added 2 microliter (2 µl) of the dye solution. The alcohol was allowed to evaporate by leaving the slide on bench for 30 sec. A coverslip was then placed on the preparation of bacteria and sealed. Similarly a Control preparation of bacteria was made without any dye.

In yet another embodiment both the slides were screened under oil immersion objective of a epifluorescence microscope (100× objective, 10 × eye lens) for checking the agglutination bioactivity and the fluorescence. It was seen that the bacteria in the slide treated with dye were forming clumps whereas the Control was not showing any such effect. This proved that the dye is inducing agglutination bioactivity. It was also noticed that the bacteria were agglutinating in specific shapes of the clumps. The bacteria in the clumps were alive all throughout. They die only if the slide gets dried (FIGS. 4 & 5).

In yet another embodiment the tendency of cells to make aggregations in the presence of the dye solution indicated that it contained a lectin like glycoprotein. This supports further our interpretation of the HPLC data that there is atleast one glycoprotein present in the crude extract of the ovary of *Holothuria*.

In yet another embodiment agglutination test was done with eukaryotic sperms. One mililiter solution of oyster sperms was placed in the cavity of a sedgewick counter used for phytoplankton counts. 5 microliter (5 µl) of alcoholic extract was added. The slide was screened under 40× objective of a microscope with 10× eye lens. It was observed that the sperms were making aggregations, sticking together and forming clumps. There was no special form of aggregations. This behavior was absent in the Control experiments.

In yet another embodiment an increase in insemination and fertility rate of oyster sperms and eggs was found out. The good quality sperms and eggs of an oyster in the fixed ratio of 10:1 were added to the cavity of a sedgewick counter used for phytoplankton counts. 5 microliter (5 µl) of alcoholic extract was added. The slide was then screened under a microscope immediately and observations were made for the sperms adhering to the egg membrane, fertilized & unfertilized eggs. A control was maintained without the extract. FIG. 6 shows polar body extrusion noticed within a few seconds and seen with green excitation filter (WG).

In yet another embodiment a percent differences in rates of insemination and fertilization between the tests and the Controls was made. It was observed that after 30 seconds 80% eggs were fertilized in the treated cells whereas in the control it was 40% cells fertilized. We observed large number of sperms adhering to the egg membrane. In our earlier experiments we have observed that the usual time taken for fertilization activity in these eggs takes about 10–15 minutes. The first polar body formation took place within 1 minute of adding the dye. (FIG. 6). The present dye solution seems to have some factor, which is facilitating insemination of sperms through the egg membrane and ultimately increasing rate of fertilization in much shorter a time interval.

In yet another embodiment nontoxicity test of the dye on eukaryotic cell survival was performed.

The dye was tested for cytotoxicity upon the oyster sperms. The survival of the sperms in the experimental set ups was taken as a parameter for showing nontoxicity. Male gonads of an oyster were removed and sperms were released in 100% seawater.

These were filtered through a muscline cloth to remove any debris. 1 mililiter (ml) of the sperm solution was taken and different concentrations (1 $\mu$l, 2 $\mu$l, 3 $\mu$l, 4 $\mu$l & 5 $\mu$l) of the Dye solution were added. At every half an hour the observations of survival of the sperms were made under a microscope. The experiments were continued for 24 hours. The Controls were maintained without addition of Dye. It was seen that there was no effect upon the survival rates of sperms with addition of the dye. This proved nontoxic nature of the dye.

In yet another embodiment nontoxicity test of the dye was performed upon survival of prokaryotes. The extract was tested for cytotoxicity upon gram negative E.coli bacteria by observing their survival or mortality. A drop of the live E.coli bacteria in water (25 $\mu$l) was placed on a microscopic slide. To this was added 2 $\mu$l of the alcoholic extract. The slide was sealed temporarily so as to save it from evaporation. It was seen under the microscope that the bacteria remained alive for 24 hours till they remained in solution. They died if the solution got dried. The control experiments were performed. This proved that the dye is nontoxic to the prokaryotes also.

The applicants studied the nature of the dye and found that it gave multicolored emissions at different wavelengths of excitations, which are comparable to the fluorochrome microscopic stains already in the market. The blue colored fluorescence of the present dye is comparable to the emission of same color by DAPI fluorochrome at the same wavelength excitation, used as components of the nonradioactive labeling kits of biochemistry, cell biology, immunochemistry, and molecular biology.

The yellow colored fluorescence of the said dye in the visible range is comparable to the same colored emissions of FITC used as components of the nonradioactive labeling and detection kits of biochemistry, cell biology, immunochemistry, and molecular biology.

The orange colored fluorescent emission is comparable to the orange fluorescence color of Propidium Iodide fluorochrome used as components of the nonradioactive labeling and detection kits of biochemistry, cell biology, immunochemistry, and molecular biology. The orange colored fluorescent emission is comparable to the orange fluorescence color of TRITC fluorochrome used as components of the nonradioactive labeling and detection kits of biochemistry, cell biology, immunochemistry, and molecular biology. The dye is stable at the room temperature and has a long shelf life. The molecular and radioactive kits of the said dye can be exported at the room temperatures. The dye has characteristics of atleast one hundred and twenty three different fluorochromes namely DAPI, Hoechest 33258, Hoechest 33342, FITC, acridine orange, auramine, Rhodamine, TRITC, and propidium iodide etc., which are now in the market (Bitplane products). The dye, under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.

In yet another embodiment The epifluorescence microscopic studies are made by using this dye as; a stain in the dilutions of 1:20000 and recording emissions of light when excited by different cubes and compared the color hues with the known fluorochromes (FIGS. 7–10).

In yet another embodiment the screening of slides was done using excitations of UV light and visible light spectra under WU, WB, WG and BF fluorochrome cubes of the Olympus Bx-FLA reflected light fluorescence attachment of olympus microscope BX-60.

In yet another embodiment WU cube's wavelength range is 330 nm–385 nm.

In yet another embodiment WB cube's wavelength range is 450 nm–480 nm.

In yet another embodiment WG cube's wavelength range is 510 nm–550 nm.

In yet another embodiment BF is for the bright field where an ordinary tungsten bulb delivers light.

In yet another embodiment the emission ranges of the dye at different excitation ranges were found out. The background of the eggs in the epifluorescence microscopy photos shows the emission color of the dye.

In yet another embodiment it was seen that excitation with the WU 330 nm–385 nm range emitted fluorescence in the 450 nm–470 nm range.

In yet another embodiment Excitation with the WB filter having spectral range of 450 nm–480 nm emitted fluorescence in the 510 nm–570 nm range.

In yet another embodiment the excitation with the WG filter having spectral range of 510 nm–550 nm emitted fluorescence in the 610-nm–650 nm range.

In yet another embodiment With BF the shades of yellowish grays were seen. In yet another embodiment the emission ranges of the dye after staining to the cell membranes at different excitation ranges were found out.

In yet another embodiment the dye was used as fluorescence microscopic stain on the dead, live and fixed eggs of the oyster. The slides were screened under a epifluorescence microscope. It was noticed that the dead cells do not take up dye and show no fluorescence. (FIGS. 11 & 12)

In yet another embodiment the dye was used as fluorescence microscopic stain on the live eggs of the oyster. The slides were screened under a epifluorescence microscope. It was noticed that the live cells showed fluorescence. The excitation spectral range and the emitted fluorescence strictly followed the Stoke's law. These ranges were different from the emission ranges of the dye, which represents the background of the fluorescing cell. (FIGS. 4–16)

In yet another embodiment the dye was used as fluorescence microscopic stain on the fixed eggs of the oyster in 3:1 ethanol and acetic acid fixative. The slides were screened under a epifluorescence microscope. It was noticed that the fixed cells showed fluorescence. The excitation spectral range and the emitted fluorescence strictly followed the Stoke's law. These ranges were different from the emission ranges of the dye, which represents the background of the fluorescing cell. (FIGS. 4a–16a)

In yet another embodiment excitation with the WU 330 nm–385 nm range emitted fluorescence in the 470 nm–500 nm range in the cells.

In yet another embodiment excitation with the WB filter having spectral range of 450 nm–480 nm emitted fluorescence in the 570 nm–610 nm range.

In yet another embodiment the excitation with the WG filter having spectral range of 510 nm–550 nm emitted fluorescence in the 610 nm–650 nm range.

In yet another embodiment the epifluorescent microscopic screening of the dead eggs under Bright Field emitted light in full white range of the visible spectra and depending upon the density of the cell ingredients gave hues of yellowish grays like a phase contrast effect.

In yet another embodiment the epifluorescent microscopic screening of the live eggs under Bright Field emitted light in full white range of the visible spectra and depending upon the density of the cell ingredients gave hues of yellowish grays like a phase contrast effect.

In yet another embodiment the epifluorescent microscopic screening of the fixed eggs (3:1 ethanol:acetic acid fixative) under Bright Field emitted light in full white range of the visible spectra and depending upon the density of the cell ingredients gave hues of yellowish grays like a phase contrast effect.

In yet another embodiment the dye was used as microscopical stain for the $E. coli$. One loop of live $E. coli$ bacteria was placed in 25 microliter of water on a microscopic slide and mixed. To this was added 2 microliter (2 $\mu$l) of the dye solution. The alcohol in the extract was allowed to evaporate by leaving the slide on bench for 10–15 sec. A coverslip was then placed on the bacterial suspension in water and sealed. Similarly a Control preparation of bacteria without any dye was made.

In yet another embodiment both the slides were screened under oil immersion objective of a epifluorescence microscope (100× objective, 10× eye lens) for checking fluorescence. It was noticed that the dead cells do not take up dye and show no fluorescence. (FIGS. 11–12)

In yet another embodiment the live bacterial cells showed fluorescence (FIGS. 4–5). The excitation spectral range and the emitted fluorescence wavelengths strictly followed the Stoke's law. These were different from the dye solution and was as given below:

In yet another embodiment excitation with the WU 330 nm–385 nm range emitted fluorescence in the 470 nm–500 nm range.

In yet another embodiment Excitation with the WB filter having spectral range of 450 nm–480 nm emitted fluorescence in the 570 nm–610 nm range.

In yet another embodiment the excitation with the WG filter having spectral range of 510 nm–550 nm emitted fluorescence in the 610 nm–650 nm range.

In yet another embodiment the control $E. coli$ without any dye also showed no fluorescence.

In yet another embodiment microphotography of the slides with the dye used as epifluorescence microscopy stain was done.

In yet another embodiment The microphotography of emitted fluorescence in the areas of slides with cells and the surrounding background which represented the emissions of colors only due to dye was done, under WU 330 nm–385 nm range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done, under WB 450 nm–480 nm range, range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done under WB 510 nm–550 nm range, with Kodak film of 400 ASA speed with an exposure time varying from 50 to 60 seconds.

In yet another embodiment the microphotography of emitted fluorescence in the areas of slides with cells and the surrounding background which represented the emissions of colors only due to dye was done, under Bright field with Kodak film of 400 ASA speed with an exposure time varying from 50 to 60 seconds.

In yet another embodiment permeation of dye in the Cell membranes was found out. The unfertilized, fertilized eggs and larvae of oysters were stained with the dye and egg suspension ratio of 1:50 microliter and screened under a fluorescent microscope. (FIGS. 7–10, 7a–10a; 14–16, 14a–16a). It was seen that the fluorescence was noticeable in the plasma membrane, nuclear envelop and chromatin. Though the wavelength ranges of emissions were the same and the colors were the hues of the same shade, there was al noticeable demarcation of boundaries of these parts of the cell (FIGS. 7–10, 7a–10a). This proved that the dye is permeable through the live and fixed cell membranes of egg plasma membrane, cytoplasm, nuclear membrane, nucleoplasm and chromatin.

In yet another embodiment the absence of fluorescence of these parts of the cell in the dead cells showed that dye is impermeant to dead cell membranes. (FIGS. 11–12, 11a–12a).

Different stains are used for different excitation cubes of the fluorescent microscope. For example DAPI (DNA staining, emits blue color), Fluorescein-dUTP; Hoechst 33258, 33342 are seen under excitation with 330 nm–385 nm excitation cubes; FITC, Acridine Orange (for DNA, RNA emits greenish/yellowish hues), Auramine under 450 nm–480 nm excitation cube and Rhodamine, TRITC and Propidium iodide (DNA, emits orange hues) under 510 nm–550 nm excitation cube.

In an embodiment to this epifluorescence microscopic screening of the cytological slides is done by putting a drop of the diluted extract and excitation with the WU filter having spectral range of 330–385 nm wavelengths.

In another embodiment epifluorescence microscopic screening of the cytological slides is done by putting a drop of the extract and excitation with the WB filter having spectral range of 450 nm–480 nm wavelengths.

In another embodiment epifluorescence microscopic screening of the cytological slides is done by putting a drop of the extract and excitation with the WG filter having spectral range of 510 nm–550 nm wavelengths.

In yet another embodiment epifluorescent microscopic screening of the cytological slides under Bright Field objective using this dye by transmitted light.

In yet another embodiment epifluorescence microscopic screening of the cytological slides stained with the dye is done by observing hues of the fluorescence color emitted by the respective excitations.

In another embodiment the excitation with the WU 330 nm–385 nm range emitted fluorescence is in the 470 nm–500 nm range.

In another embodiment the excitation with the WB filter having spectral range of 450 nm–480 nm emitted fluorescence in the 570 nm–610 nm range.

In yet another embodiment the excitation with the WG filter having spectral range of 510 nm–550 nm emitted fluorescence in the 610 nm–650 nm range.

In another embodiment epifluorescent microscopic screening of the cytological slides under Bright Field by using transmitted light emitted light in full white range of the visible spectra depending upon the density of the cell ingredients and giving a phase contrast effect.

In yet another aspect of the invention the 1:400000 times dilutions of the dye and above when prepared in 70% ethyl alcohol and used as a stain the colored fluorescent emissions occurred in the UV and visible ranges of the epifluorescence microscope.

In still another embodiment, the dye is diluted in 70% ethyl alcohol 1:9000 times and further diluted in water to 1:50 time which means total dilution is 1:450000 times this gives fluorescence of three colors at three different wavelengths.

In yet another embodiment the invention provides a bioactive composition containing an extract obtained from the marine sea-cucumber Holothuria scabra in the ratio of 1:400000 to obtain fluorescence of three colors at three different wavelengths and a phase contrast effect under transmitted light.

In an embodiment, the invention provides a composition comprising a bioactive extract obtained from the marine sea-cucumber Holothuria scabra together with conventional additives and useful in the preparation of coating compositions and inks.

In another embodiment, the invention provides composition comprising a bioactive extract obtained from the marine sea-cucumber Holothuria scabra together with conventional additives and useful in detection of leaks.

In yet another embodiment the invention provides a composition comprising a bioactive extract obtained from the marine sea-cucumber Holothuria scabra together with conventional additives and useful in undersea probes.

In yet another embodiment the invention provides a composition comprising a bioactive extract obtained from the marine sea-cucumber Holothuria scabra together with conventional additives and useful as a fluorescent probe in situ hybridization kits for molecular diagnosis.

In yet another embodiment the invention provides a composition comprising a bioactive extract obtained from the marine sea-cucumber Holothuria scabra together with conventional additives and useful as a component of non-radioactive labeling and detection kits of biochemistry, cell biology, immunochemistry and molecular biology.

In yet another embodiment the invention provides a composition comprising a bioactive extract obtained from the marine sea-cucumber Holothuria scabra together with conventional additives and useful in immuno fluorescent detections.

In yet another embodiment the invention provides a composition comprising a bioactive extract obtained from the marine sea-cucumber Holothuria scabra together with conventional additives and useful as a counterstain of DIG-labeled oliogonucleotide probes and anti-DIG Fab-fragments.

In yet another embodiment the invention provides a composition comprising a bioactive extract obtained from the marine sea-cucumber Holothuria scabra together with conventional additives and useful in single and multiple cell quantitative fluorescence in flowcytometry.

In yet another embodiment the invention provides a composition comprising a bioactive extract obtained from the marine sea-cucumber Holothuria scabra together with conventional additives and useful as fluorochrome stains for epifluorescence microscopy.

In yet another embodiment the invention provides a composition comprising a bioactive extract obtained from the marine sea-cucumber Holothuria scabra together with conventional additives and useful for a quick check of biocontamination in the health food industry, cosmetic industry, pharmaceutical and chemical industries.

In yet another embodiment the invention provides a composition comprising a bioactive extract obtained from the marine sea-cucumber Holothuria scabra together with conventional additives and useful for rapid estimations of biocontaminants in laboratory cultures.

In yet another embodiment the invention provides a composition comprising a bioactive extract obtained from the marine sea-cucumber Holothuria scabra together with conventional additives and useful for a rapid check of biopollutants under field conditions.

In yet another embodiment the invention provides a composition comprising a bioactive extract obtained from the marine sea-cucumber Holothuria scabra together with conventional additives and useful in microbial kits.

In yet another embodiment the invention provides a composition comprising a bioactive extract obtained from the marine sea-cucumber Holothuria scabra together with conventional additives and useful as a natural colorant.

DESCRIPTION OF THE TABLES

TABLE-1 Tabulated data of distance migrated and Rf values of the four components of the dye detected by Thin layer chromatography (TLC).

TABLE-2 Analytical mode HPLC data by UV detector at 280 nm showing the presence of proteins in the dye. The retention time, area and area per cent of the proteins as per the chromatogram (FIG. 17) is given in a tabulated form.

TABLE-3 Analytical mode HPLC data by UV detector at 205 nm showing the presence of peptides in the dye. The retention time, area and area per cent of the peptides as per the chromatogram (FIG. 18) is given in a tabulated form.

TABLE-4 Table showing the presence of carbohydrates in the dye by RI detector.

The retention time of the sample carbohydrates and standards is given.

TABLE-5 The Emissions of the different colored fluorescence of the fluorescent dye when excited with different wavelength fluorescent filter cubes of the Olympus epifluorescence microscope with dye solution and when attached to cell membranes of the prokaryotic cells .

TABLE-6 The Emissions of the different colored fluorescence of the fluorescent dye when excited with different wavelength fluorescent filter cubes of the Olympus epifluorescence microscope with dye solution and when attached to cell membranes of the eukaryotic cells.

TABLE 7 Comparative table comparing various characteristic of present invention to applicants previous co-pending U.S. patent application Ser. No. 09/820,654.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Figure 1:
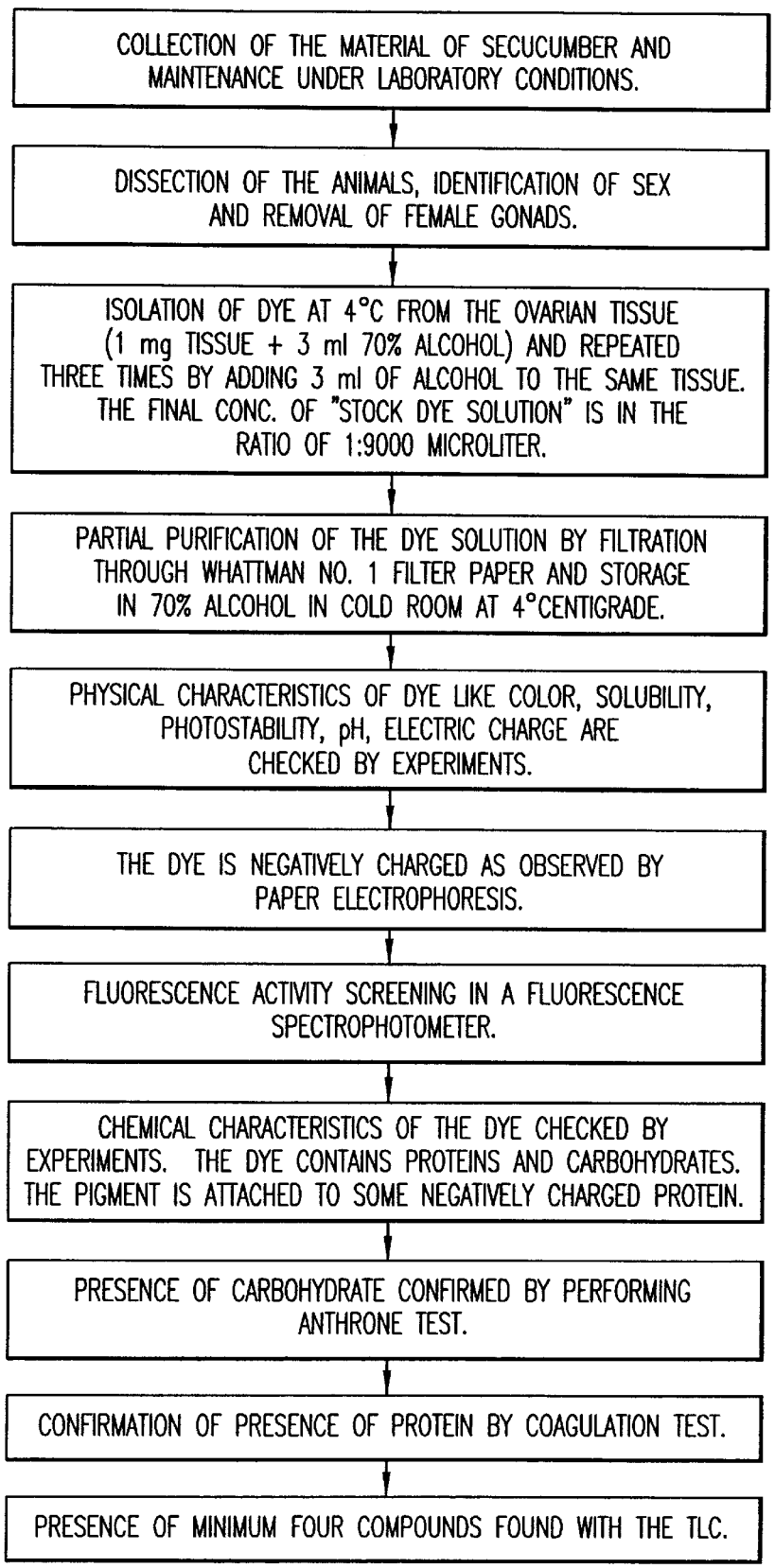
FIG. 1 Flow chart for extraction, purification and characterization of the multiple fluorescent dye.
Figure 1:
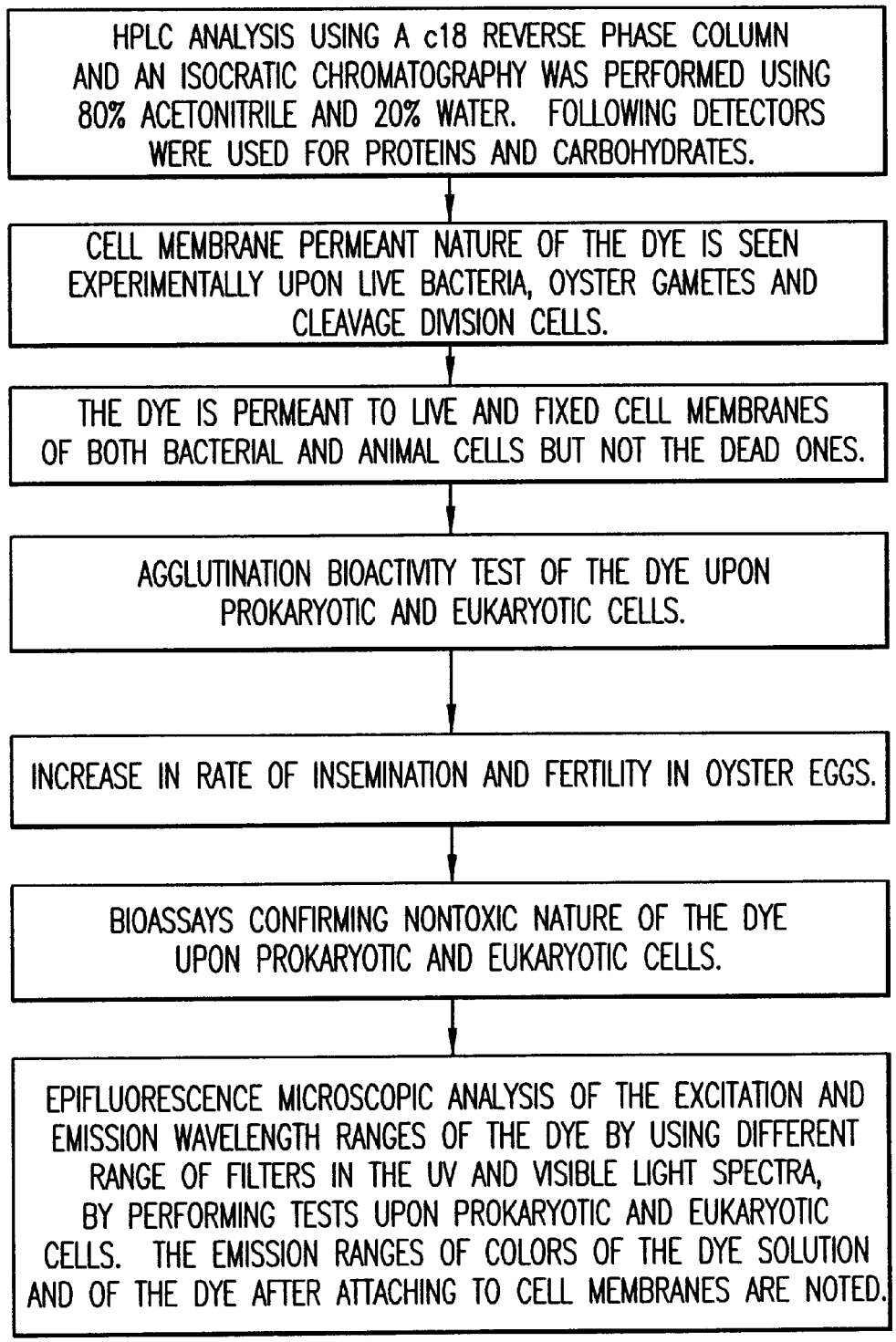

This invention pertains to the process of extraction, partial purification and characterization of a new pigment which is a natural nontoxic fluorescent protein dye from an echinoderm Holothuroidea: *Holothuria scabra*) widely distributed along the central west coast of India and the Indo-pacific regions of the world.

The invention further provides a novel fluorescent protein dye from the ovarian tissue of the animal which can be repeatedly extracted 3–4 times from the same specimen by storing in 70% ethyl alcohol under −4 degree Centigrade, thus saving over exploitation of natural resources.

The present invention also contemplates that the said dye has six colored fluorescent emissions at three different excitation wavelengths of UV and visible light spectra equivalent to emissions by six different fluorochromes (DAPI, FITC and PI) and the pycobiliproteins and rhodamines currently used for multicolor fluorescent detections. The dye actually covers the wavelength emission spectra of about one hundred and twenty three fluorochromes currently sold in the market for fluorescent microscopy probes. The stained cells show different color emissions at the same excitations but strictly follow stroke's law. Thus altogether at same excitations of olympus BX-60 microscope filters the dye emits 6 colors. The dye is nontoxic to living *E.coli* bacteria and eukaryotic cells.

The dye permeates through the various cell constituents membranes and stains them fluroscently. The dye is non-degradable once it is attached to cell membranes by staining them.

The dye is a fluorescent protein which has a fluorophore attached to the protein.

The dye has agglutinating nature this can be used in artificial insemination and fertilization in aquaculture and tissue cultures for screening effect in live organisms.

The agglutinated cells maintain fluorescence thus the dye can be used in live cell function studies.

Thus the dye can be commercialized as natural nontoxic cell permeant multiple fluorescent protein dye of epifluorescence microscopy for single, double and triple staining of chromosomes, cells and tissues following simple protocols.

The present invention also contemplates the use of the dye in non-radioactive labeling of protein, DNA and RNA probes for fluorescent in situ hybridization applications in molecular biology.

Thus in a preferred mode of use the dye can be a component of molecular labeling and detection kits, most of which are imported and sold at high rates.

These labeling kits are widely sought after for molecular diagnostics using rapid molecular cytogenetic and microarrays techniques.

Yet another advantage of the dye is that its fluorescence is visible even in very dilute solutions (1:200000 to 400000) and above.

This property and the nontoxic ecofriendly nature of the dye can be utilized in life saving devices as a component of life jackets and to mark the location of crashed aircraft, life rafts and defence equipment for example rockets, leaking checks in the industries etc.

The invention would be useful for quantitative measure of fluorescence in flowcytometer for single and multiple cells.

The invention would be also advantageous in quick estimations of biocontaminations in natural and controlled environments like tissue cultures, pollution, industrial contaminations in health, food and cosmetic industries.

In another preferred mode of use the dye has a long shelf life at the room temperature once the cells are stained as checked by fluorescent microscopic analysis.

Another utility of the fluorescent dye is as a component of novel remote sensing devices and undersea probes where a light wavelength sensitivity based data is required.

The invention is illustrated by the following examples, which should not be construed as limitations on the inventive scope of the invention in any manner:

EXAMPLES

The methods of extraction, partial purification, characterization of the dye and the details of the experiments performed to check nontoxic, cell permeant, agglutination and multiple fluorescent property of the dye by spectroscopic analysis and epifluorscence microscopy are disclosed:

Example 1

Collection of the Material

Material of the patent is a sea cucumber with following taxonomic details.

Subkingdom: Metazoa
Phylum: Echinodermata
Sub-Phylum: Eleutherozoa
Class: Holothuroidea
Subclass: Aspidochirotacea
Order: Aspidochirota
Genus: *Holothuria*
Species: *scabra*

The material was collected from the shores of central west coast of India during a low tide. The animals were brought to the laboratory and maintained in glass tanks containing seawater of salinity 30–32 per par (30%$_0$) till further use.

Example 2

Isolation of the Dye from the Female Gonads

The animals were first washed with tap water and then with Milliq water (ultrapure water). The body was cut open with the sharp scissors and, the male/female animals were sorted. Female gonads were identified and carefully removed from the other viscera. The color of the ovaries varied from yellow to orange depending upon ripe and semi ripe conditions of the ovarian cells. The ovarian tissue was weighed and placed in a glass beaker. 70% ethyl alcohol was added to it in the ratio of 1:3 (weight by volume ratio). Yellowish orange colored pigment came out. The colored solution was decanted. To the remaining tissue again 70% ethyl alcohol was added and colored solution removed. These steps were repeated three times for extraction of the pigment without homogenizing the tissue of the ovary.

Partial Purification of the Dye

The extract was partially purified by filtering through Whattman No. 1 filter paper. The vial with screw cap carrying the solution of the dye was labeled as "Stock Dye solution" and stored in cold room at 4° Centigrade till further use. The extract carrying both light yellow and orange colored pigment from the ovarian tissue were characterized by the following methods. The properties were found to be the same. 1 mg ovarian tissue: 3 ml of 70% ethyl alcohol (three times) i.e 1 mg in 9 ml of 70% alcohol means 9000 microliter ($\mu$l) of 70% ethyl alcohol.

Example 3

Physical Characteristics of the Dye Color and Solubility

The said Dye solution is yellowish orange in color with the naked eye. In the daylight/tube light it gives varied colors emissions. The dye is insoluble in water but is soluble in alcohol.

Example 4

Photostability

The alcoholic extract of the dye is stable at 4 degree centigrade. Once the cells are labeled with the dye the fluorescence remains for months together at the room temperature.

Example 5

The dye has a pH of 6.8–7.5 depending upon the quantity of ripe and unripe eggs in the ovary. The moire ripe eggs the pH is around 7.5 and less ripe ones the pH is around 6.8.

Example 6

Test for Electric Charge of the Dye by Paper Electrophoresis

The said extract of the dye was subjected to paper electrophoresis. A whattman No.1 filter paper was soaked in phosphate buffer (0.1 M) pH 7 and placed in an electrophoresis chamber. Both the electrodes were immersed in phosphate buffer. A spot was made with 5 microliter ($\mu l$) of the ovarian extract and subjected to paper electrophoresis at 40 volts. A drift of the yellow spot to the positive terminal was observed. It proved that the extract contained a colored compound (pigment) which is negatively charged. The extract is a dye as it is giving a color to the filter paper.

Example 7

Chemical Characteristics of the Dye 1 ml of the dye solution which is the alcoholic ovarian extract was taken and 0.2 grams of di thio erythritol was incorporated. The solution does not get decolorized. It showed the absence of reducible group in coloring part of the fluorescent dye.

Example 8

Test for Presence of Protein 5 ml of the extract was subjected to heating in a water bath at 100 degree Centigrade. Coagulation was observed. Which confirmed the presence of protein in the alcoholic extract of the dye.

Example 9

Test for Presence of Carbohydrate

The extract was subjected to Anthrone test (Ref) by using 4 ml of sulphuric acid and Anthrone reagent. 1 ml of Water 4 ml of conc.sulphuric acid and Anthrone reagent was kept as a blank. The blank was faintly green after 5 minutes whereas the extract was turned bright green after 5 minutes. The test proved that the carbohydrate is present in the extract.

Example 10

Separation of the Components of Extract

The said extract (5 microliter) was subjected to Thin layer chromatography (TLC) by using silica gel-G plate. The solvent used was n-butanol, acetic acid and water in the ratio of 2:2:1. After running the TLC the plates were stained by Iodine vapor in a chamber. Four spots were found. The test proved that the crude extract contains minimum 4 different compounds.

The spots and their respective Rf values are shown in Table 1.

Example 11

Fluorescence Spectroscopic Analysis

The said extract was subjected to fluorescent spectroscopic analysis The wavelength of excitation was found maximum at 351 nm, 580 nm, 720 nm.

Figure 2:
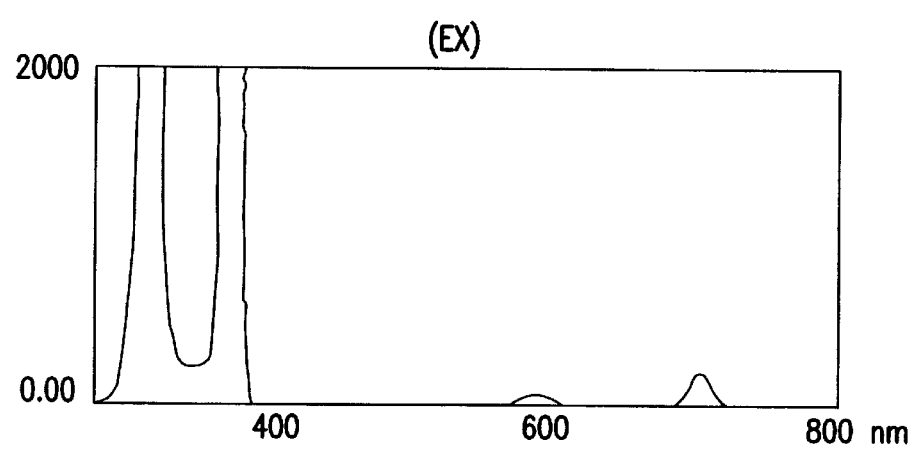
FIG. 2 Fluorescence spectrophotometry showing wavelength of excitation found maximum at 351 nm, 580 nm, 720 nm.
Figure 3:
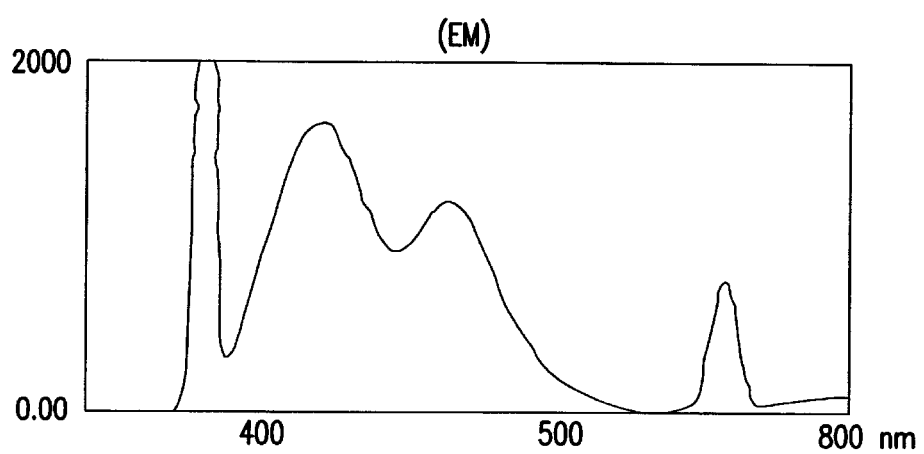
FIG. 3 Fluorescence spectrophotometry showing wavelength of emission found in between 400 to 600.
Figure 4:
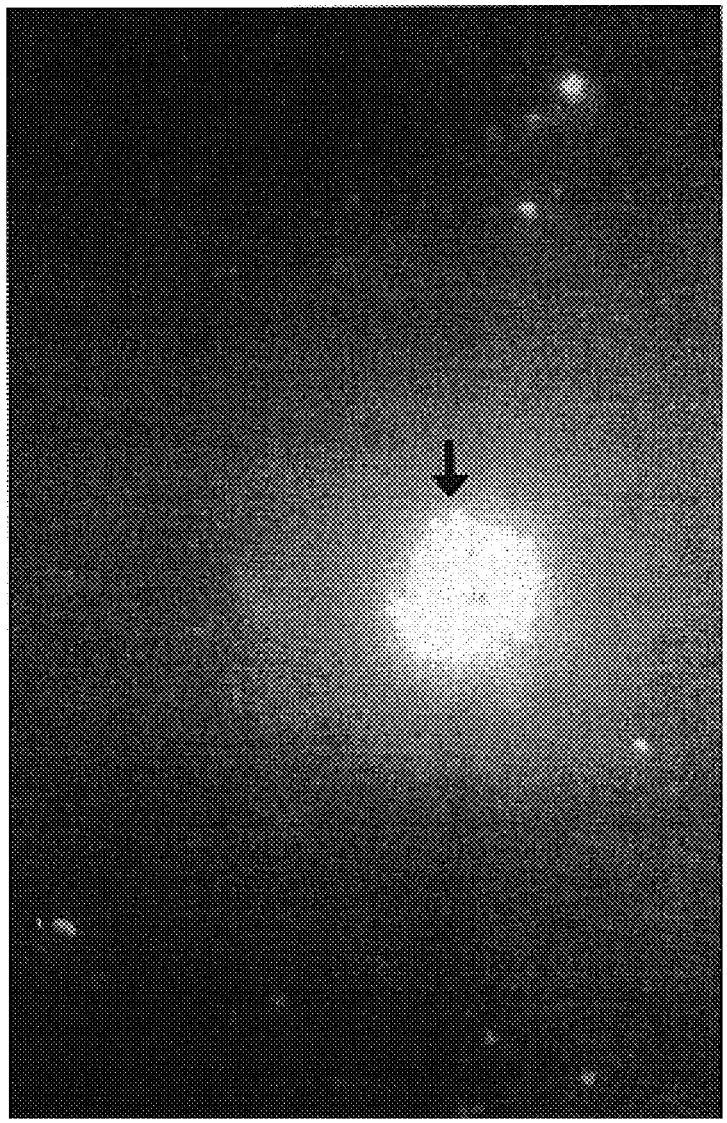
FIG. 4 Black & white figure of epifluorescence microscopy results of green color fluorescent emissions of the dye and yellow colored emissions of the bacterial cells where dye has attached (arrow) when the dye was excited with WB filter cube of olympus BX-60 microscope having excitation range of 450–480 nm. The agglutination property of the dye upon bacteria making their clump is also seen.
Figure 4A:
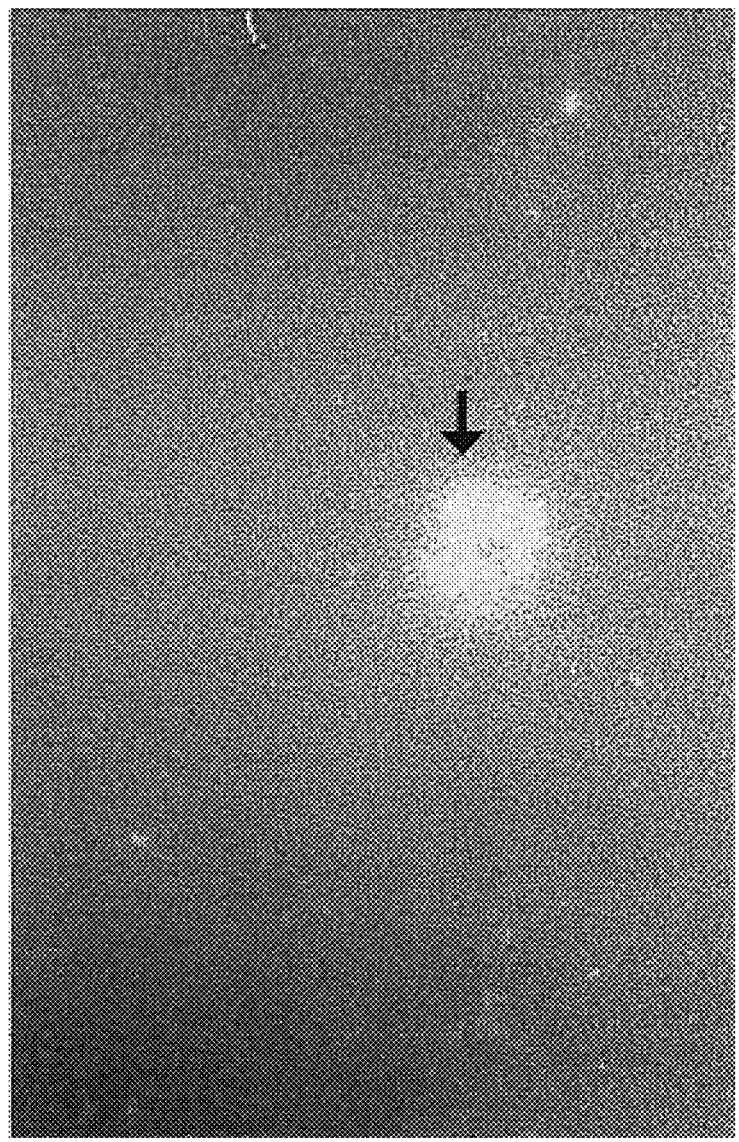
FIG. 4a Colored photograph of FIG. 4.
Figure 5:
FIG. 5 Black & white figure of epifluorescence microscopy results of dark red color fluorescent emissions of the dye and orange colored emissions of the bacterial cells where dye has attached (arrow) when the dye was excited with WG filter cube of olympus BX-60 microscope having excitation range of 510 nm–550 nm nm. The agglutination properties of the dye upon bacteria making their clumps are also seen.
Figure 5A:
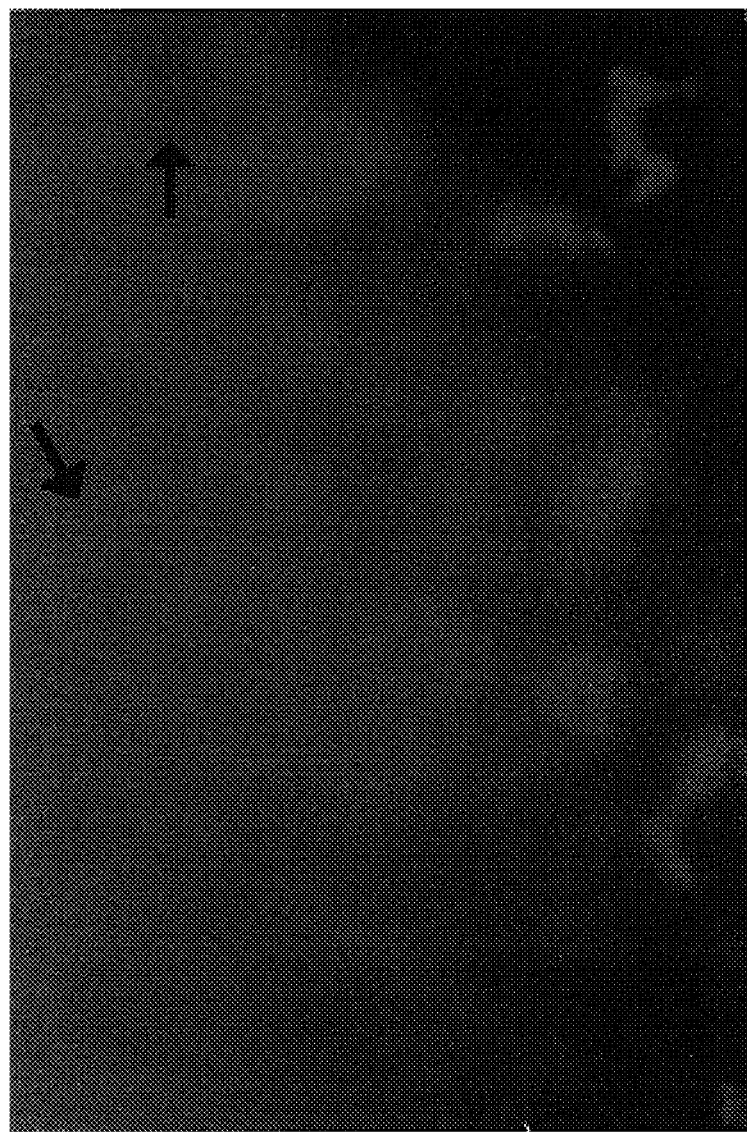
FIG. 5a Colored photograph of FIG. 5.

The said dye solution was then subjected to fluorescence emission spectrophotometric analysis. The emission was in between 400 to 600 when exited at 351 nm. The emission maximas were two peaks at 450 nm and at 550 nm. (FIGS. 2 & 3)

Example 12

Analytical Mode HPLC for Presence of Proteins and Carbohydrates

Figure 17:
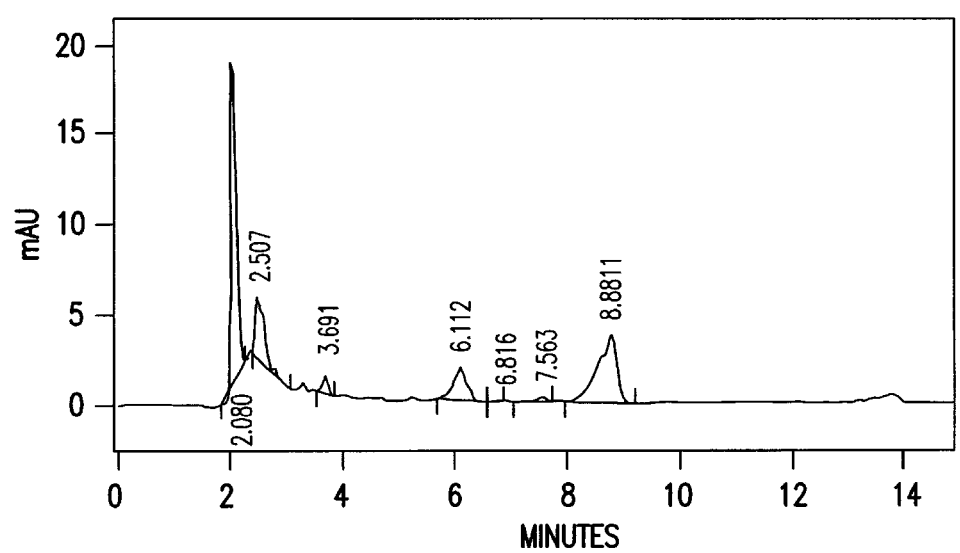
Figure 18:
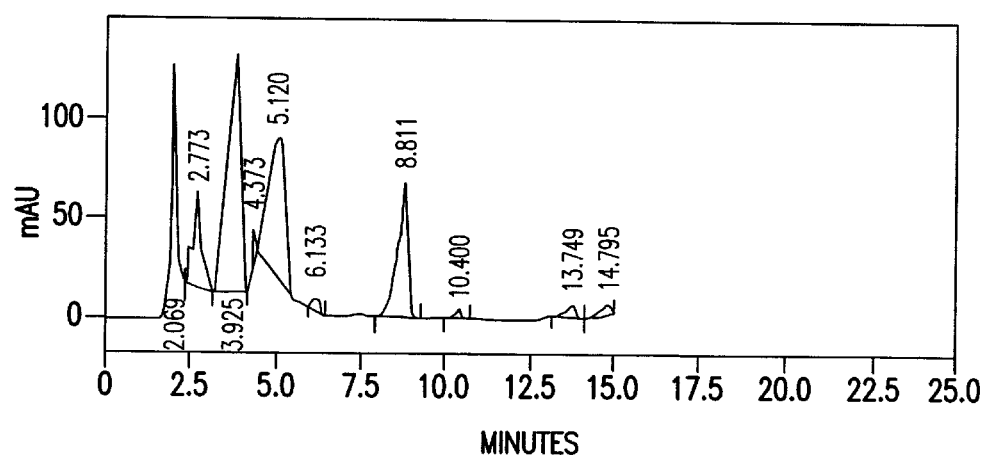
FIG. 18 The chromatogram of the dye taken at 205 nm UV detector.
Figure 19:
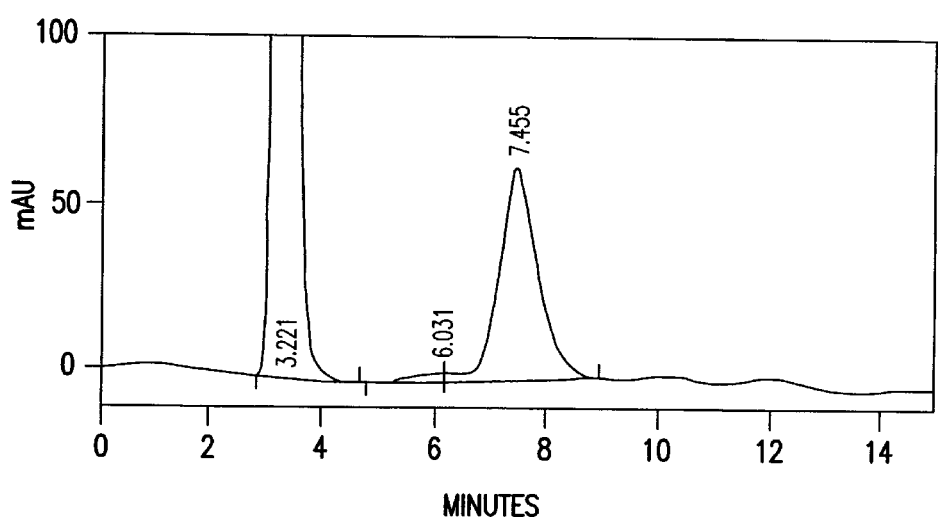
FIG. 19 Standard chromatogram for Sucrose.
Figure 20:
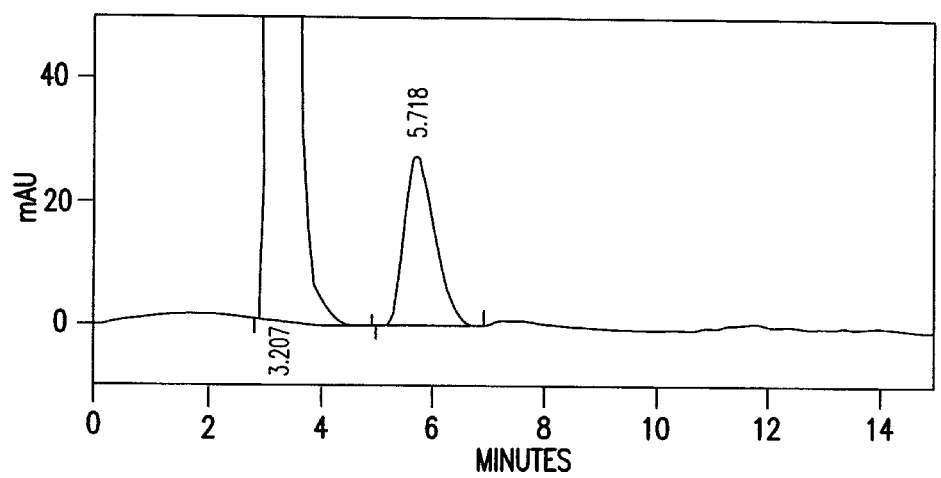
FIG. 20 Standard chromatogram for Glucose.
Figure 21:
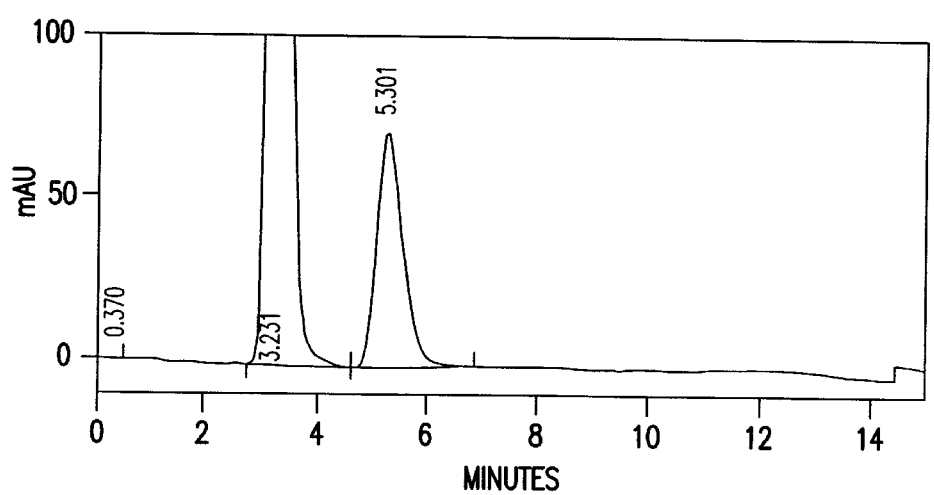
FIG. 21 Standard chromatogram for Fructose.
Figure 22:
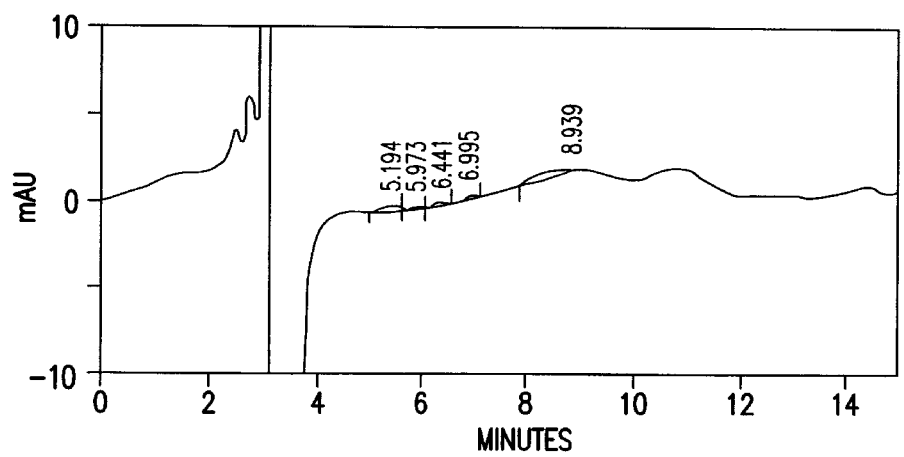
FIG. 22 The chromatogram of the dye showing presence of carbohydrates detected in RI detector.

HPLC of the dye solution was done by isocratic mode of reverse HPLC using solvent is 80% aceto-nitrile, and 20% water in C18 reverse phase column. UV detector in the wavelength of 280 nm and 205 nm detects the presence of proteins. FIG. 17 and Table 2 show results of the presence of protein by UV detector at 280 nm. It can be seen, the retention time of the 7 proteins varies between 2.1–8.8 minutes. The area covered is in the range of 535–116103. The maximum per cent area is of peak 1 having retention time of 2.1 minutes. This shows that the protein at peak 1 is in the largest quantity in the sample. Similarly FIG. 18 and Table 3 show presence of 10 peptides by UV detector at 205 nm. The retention time is varying between 2.1–14.8 minutes. The area covered is in the range of 63482–3218965. And the maximum per cent area is of peptide at peak 3 having retention time of 3.9 minutes. RI detector detects the presence of carbohydrates. The standards used are GLUCOSE, SUCROSE and FRUCTOSE. The results are shown in FIGS. 19–22 and Table 4. The seventh peak of 280 nm and 205 nm and fifth peak of carbohydrates have the retention time 8.8 and 8.939 minutes respectively.

Example 13

Test for Fluorophore and Protein Association

As given in example 8 the protein of the extract gets coagulated on heating. Now to this if solvent ether is added the colored part gets dissolved. The paper electrophoresis of this colored solution when performed in the same way as described in example 6 the colored spot does not move towards any pole, which proves that the pigment has no charge. As it dissolves only in a non-polar solvent. It can be said that the colored part of the dye is non-polar.

However, in example 6 performed with the alcoholic extract of the dye, the colored spot moves towards the positive pole, which means it has a negative charge. It appears that the non-polar pigment may be bound to some component, which is negatively charged. As shown by the HPLC data from Example 12, there are only proteins and carbohydrates detected, which suggested that the colored fluoropore is bound to some protein which is negatively charged. So to say, the fluorescence activity of the dye solution is due to a component that includes non-polar fluorophore attached to a negatively charged protein, which gets separated when the dye is heated and protein gets coagulated.

Example 14

Agglutination Bioactivity Bioassays were Performed on Both Prokaryotic and Eukaryotic Biological Systems Agglutination bioactivity test of the Dye on gram negative bacteria (*E.coli*): Two separate experiments were performed:

1) 50 microliter of the said extract was incorporated in 100 ml of the Muller Hilton's culture broth. A blank was kept without the marine extract. 0.1 ml of the fresh *E.coli* inauculum was incorporated in the culture broths. The culture broths were incubated in a orbital shaker at a rotation of 150 rpm. After 8 hours, turbidity was seen in both the cultures. But the culture containing the extract (Dye solution) has shown clump like growth. The cells were forming aggregates. The positive blank without the marine extract has shown normal growth.

2) One loop of live *E.coli* bacteria was placed in 50 microliter of water on a microscopic slide and mixed. To this was added 2 microliter (2 µl) of the dye solution. The alcohol was allowed to evaporate by leaving the slide on bench for 10–15 sec. A coverslip was then placed on the preparation of bacteria and sealed. Similarly a Control preparation of bacteria was made without any dye.

Both the slides were screened under oil immersion objective of a epifluorescence microscope (100× objective, 10× eye lens) for checking the agglutination bioactivity and the fluorescence under WU, WB, WG and BF. It was seen that the bacteria in the slide treated with dye were forming clumps (FIGS. 4, 6 and 4a, 5a) whereas the Control was not showing any such effect. This proved that the dye is inducing agglutination bioactivity. It was also noticed that the bacteria were agglutinating in specific shapes of the clumps. The bacteria in the clumps were alive all throughout. They die only if the slide gets dried and the dead bacteria do not stain.

The tendency of cells to make aggregations in the presence of the dye solution indicated that it contained a lectin like glycoprotein. The presence of protein and carbohydrates in the dye solution has been confirmed by HPLC.

Example 15

Agglutinization Bioactivity Test with Eukaryotic Sperms

One mililiter solution of oyster sperms was placed in the cavity of a sedgewick counter counter used for phytoplankton counts. 5 microliter (5 µl) of alcoholic extract was added. The slide was screened under 40× objective of a microscope with 10× eye lens. It was observed that the sperms were making aggregations, sticking together and forming clumps. There was no special form of aggregations. This behaviour was found absent in the Control experiments.

Example 16

Increase in Insemination and Fertility Rate of Oyster Eggs

Figure 6:
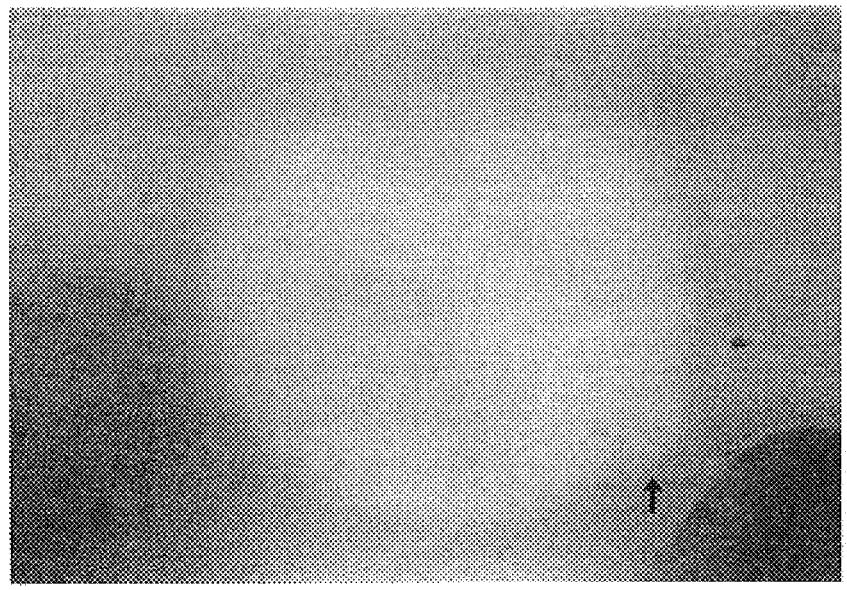
FIG. 6 Black & white figure of epifluorescence microscopy results of dark red color fluorescent emissions of the dye and orange colored emissions of the oyster egg cell where dye has attached when the dye was excited with WG filter cube of olympus BX-60 microscope having excitation range of 510 nm–550 nm nm. The arrow shows the polar body extrusion.
Figure 6A:
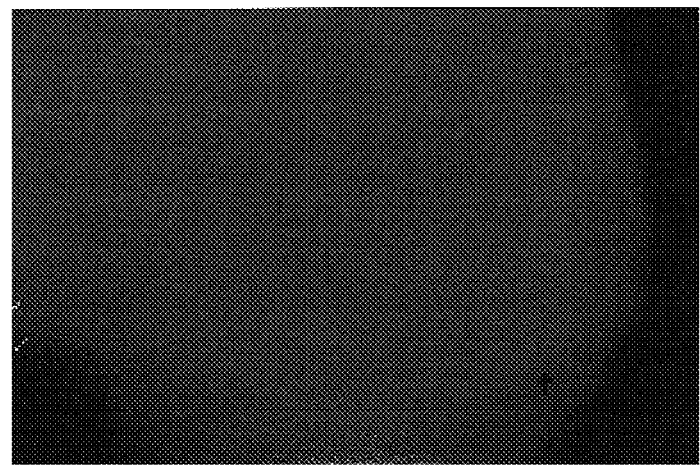
FIG. 6a Colored photograph of FIG. 6.
Figure 7:
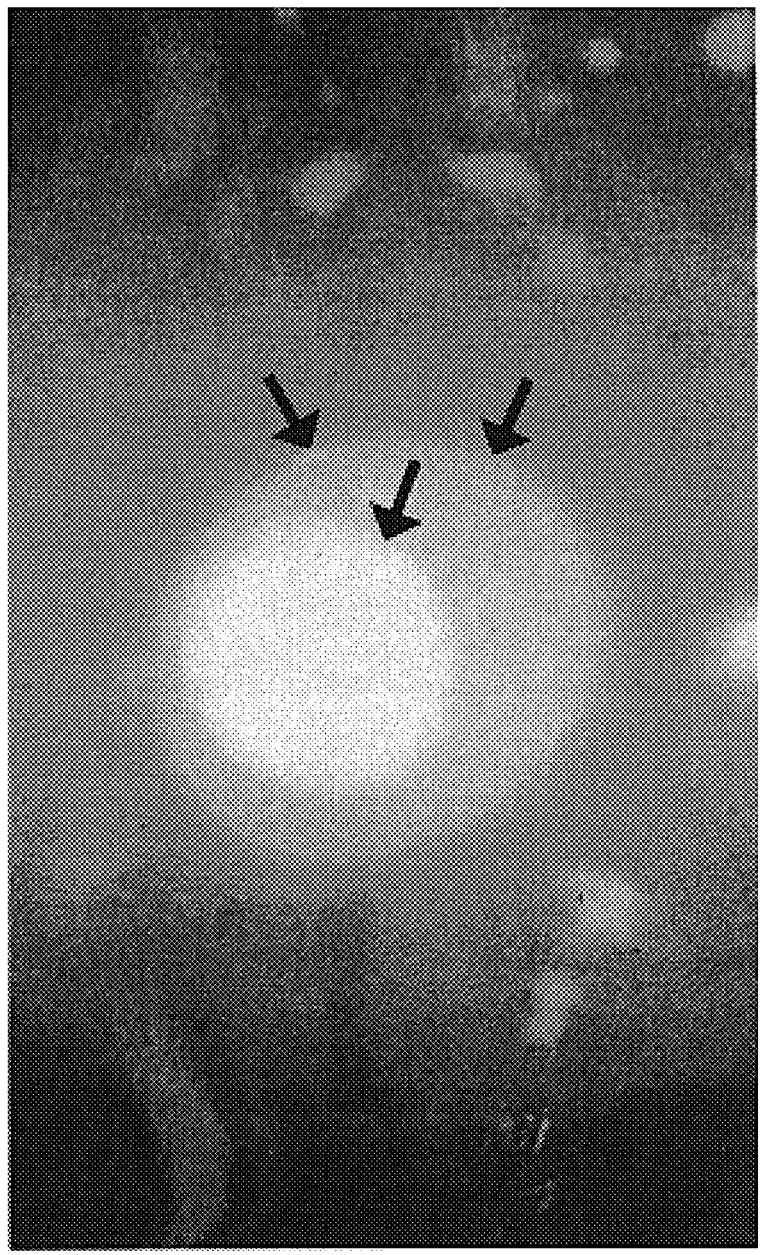
FIG. 7—Black & white figure of epifluorescence microscopy results of green color fluorescent emissions of the dye and yellow colored emissions of the live egg cells where dye has permeated (arrow) when the dye was excited with WB filter cube of olympus BX-60 microscope having excitation range of 450–480 nm. The cell permeant nature of the dye showing egg membrane and nuclear envelope and the cytoplasm and nucleoplasm stained.
Figure 7A:
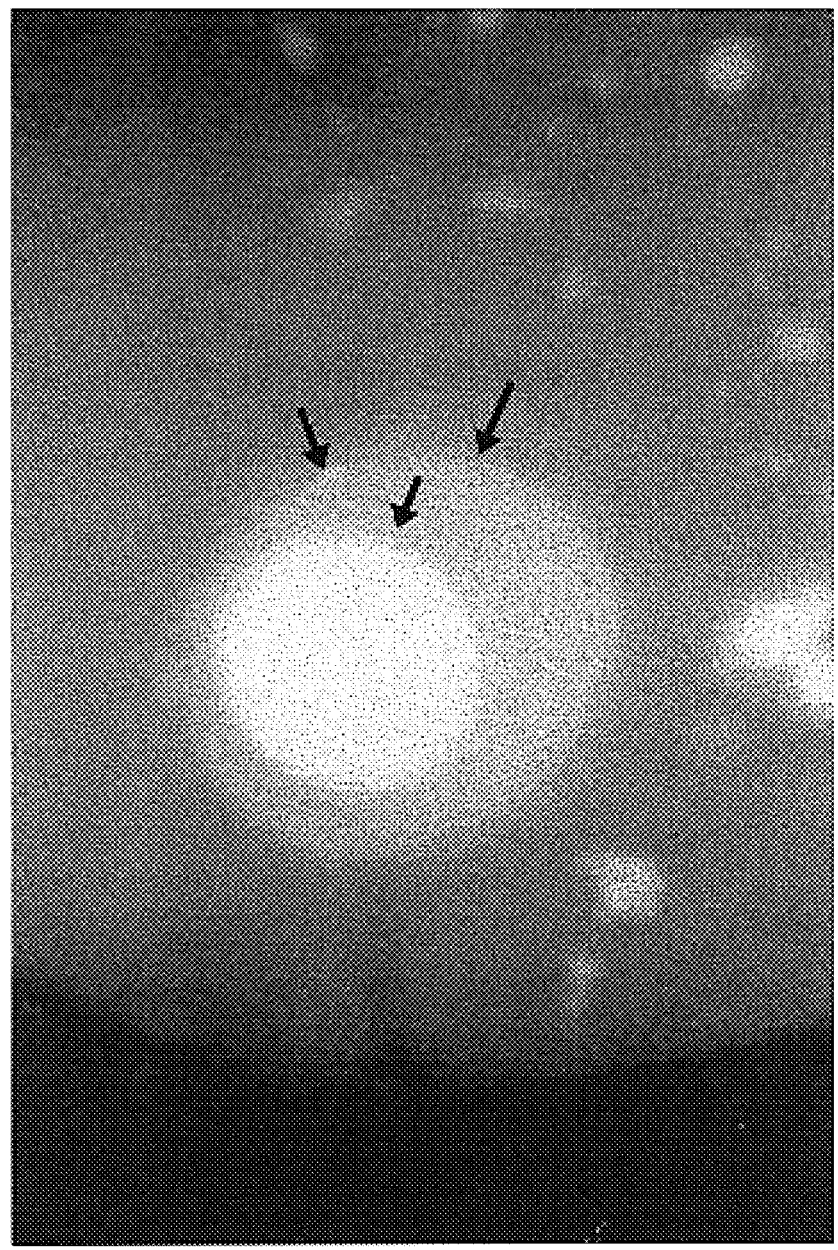
FIG. 7a Colored photograph of FIG. 7. The chromatin of sperm nucleus is also seen.
Figure 8:
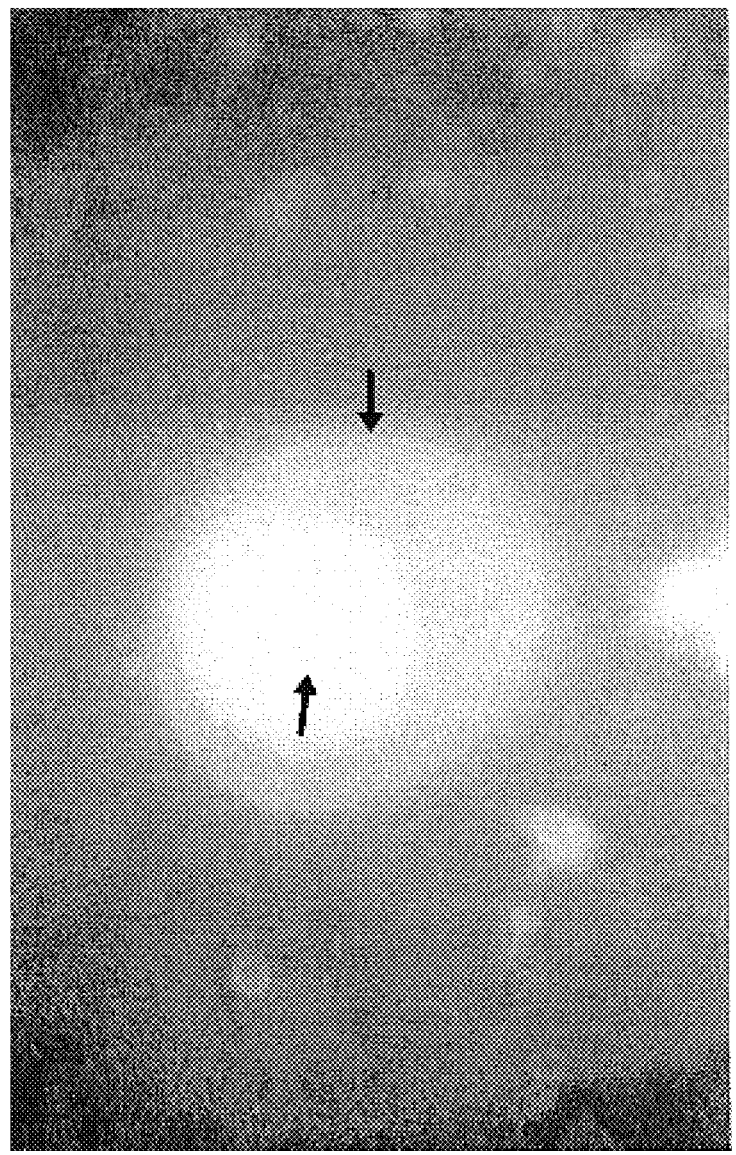
FIG. 8 Black & white figure of epifluorescence microscopy results of dark bluish green color fluorescent emissions of the dye and blue colored emissions of the live egg cells where dye has permeated (arrow) when the dye was excited with WU filter cube of olympus BX-60 microscope having excitation range of 330 nm–385 nm. The cell permeant nature of the dye showing egg membrane and nuclear envelope and the cytoplasm and nucleoplasm stained.
Figure 8A:
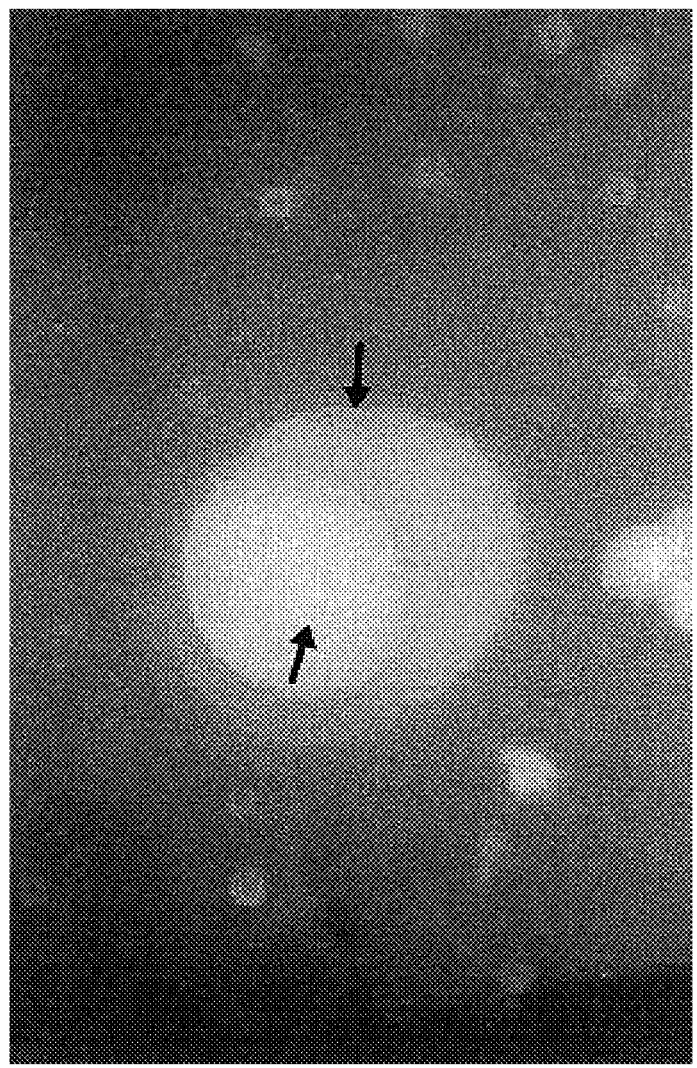
FIG. 8a Colored photograph of FIG. 7. The chromatin inside the nucleus is also seen.
Figure 9:
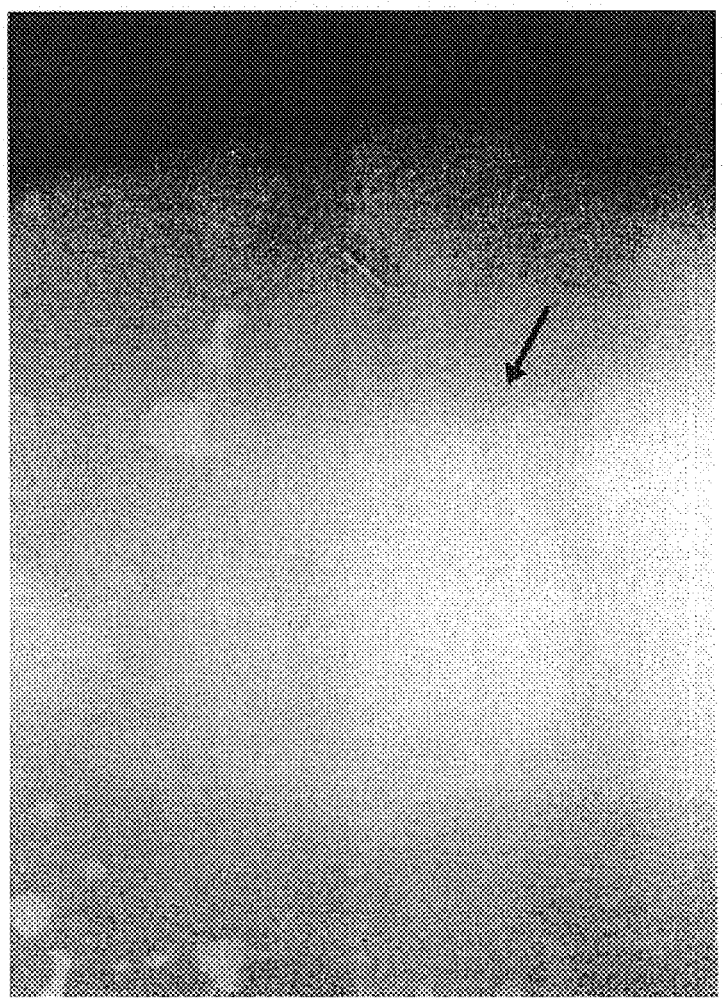
FIG. 9 Black & white figure of epifluorescence microscopy results of dark red color fluorescent emissions of the dye and orange colored emissions of the oyster egg cell where dye has attached when the dye was excited with WG filter cube of olympus BX-60 microscope having excitation range of 510 nm–550 nm nm.
Figure 9A:
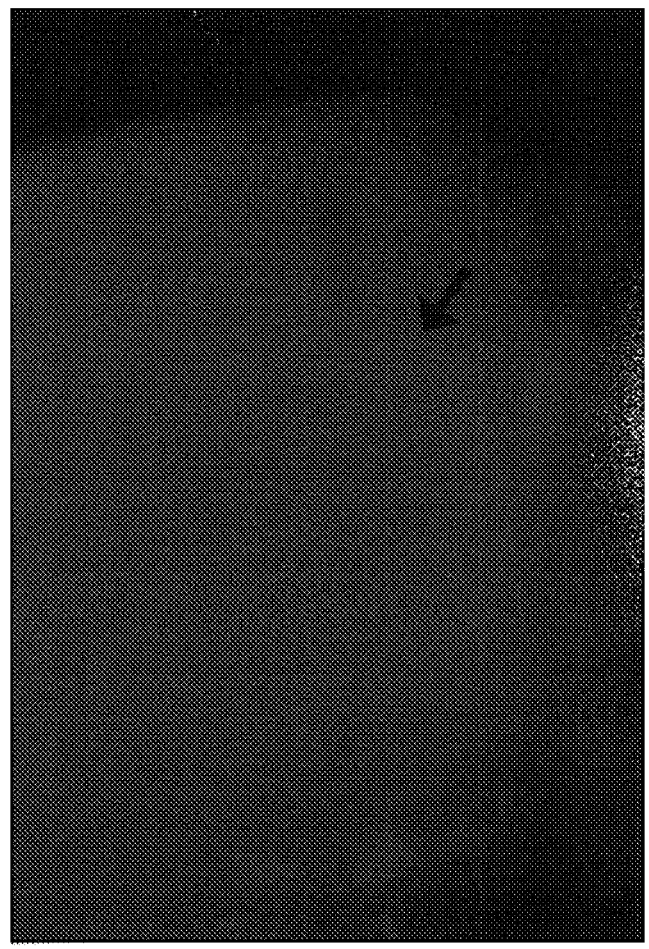
FIG. 9a Colored photograph of FIG. 6.
Figure 10:
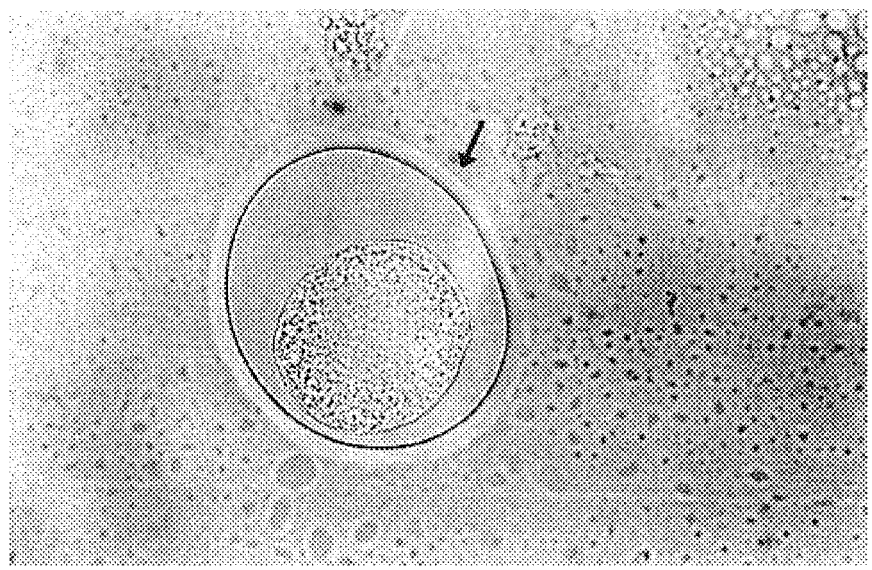
FIG. 10 Black & white figure of epifluorescence microscopy results of fluorescent emissions of the dye under Bright Field.
Figure 10A:
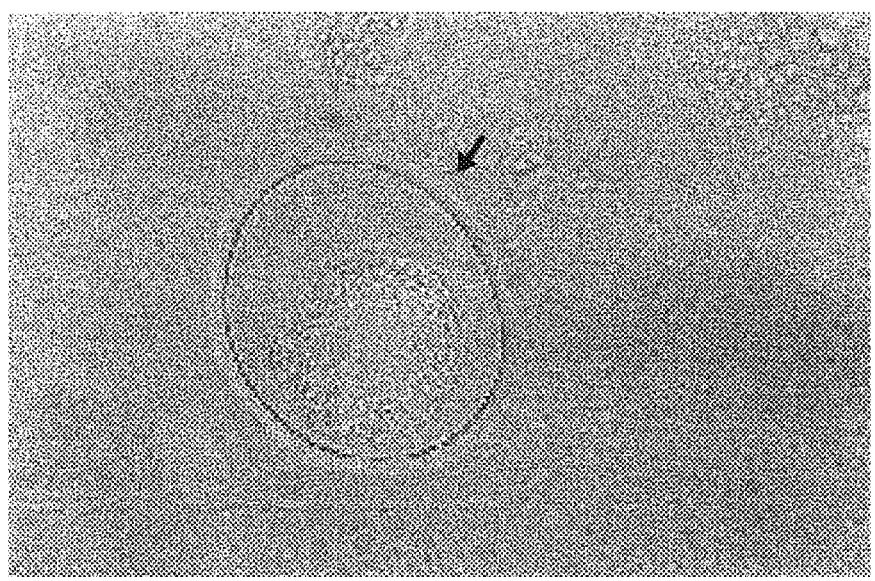
FIG. 10a Colored photograph of FIG. 10.
Figure 11:
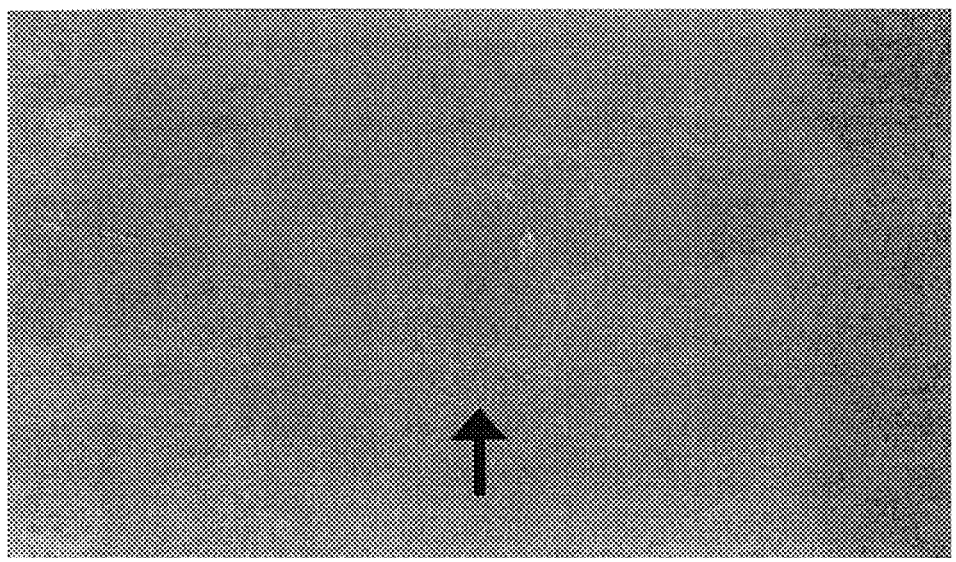
FIG. 11 The dead Oyster egg cell showing absence of fluorescence when excited with WG filter of BX-60 Olympus microscope.
Figure 11A:
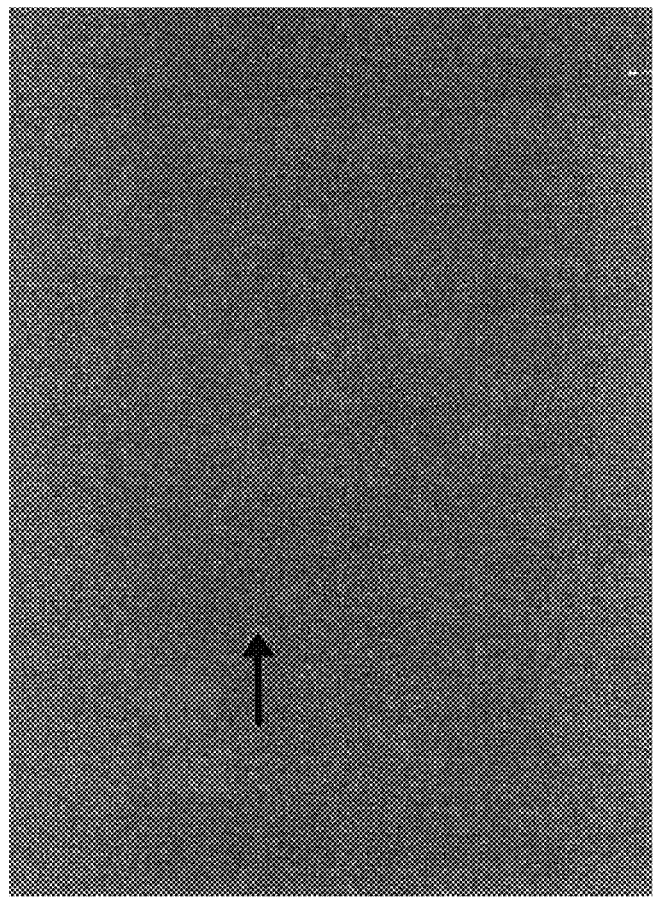
FIG. 11a Color photo of the same.
Figure 12:
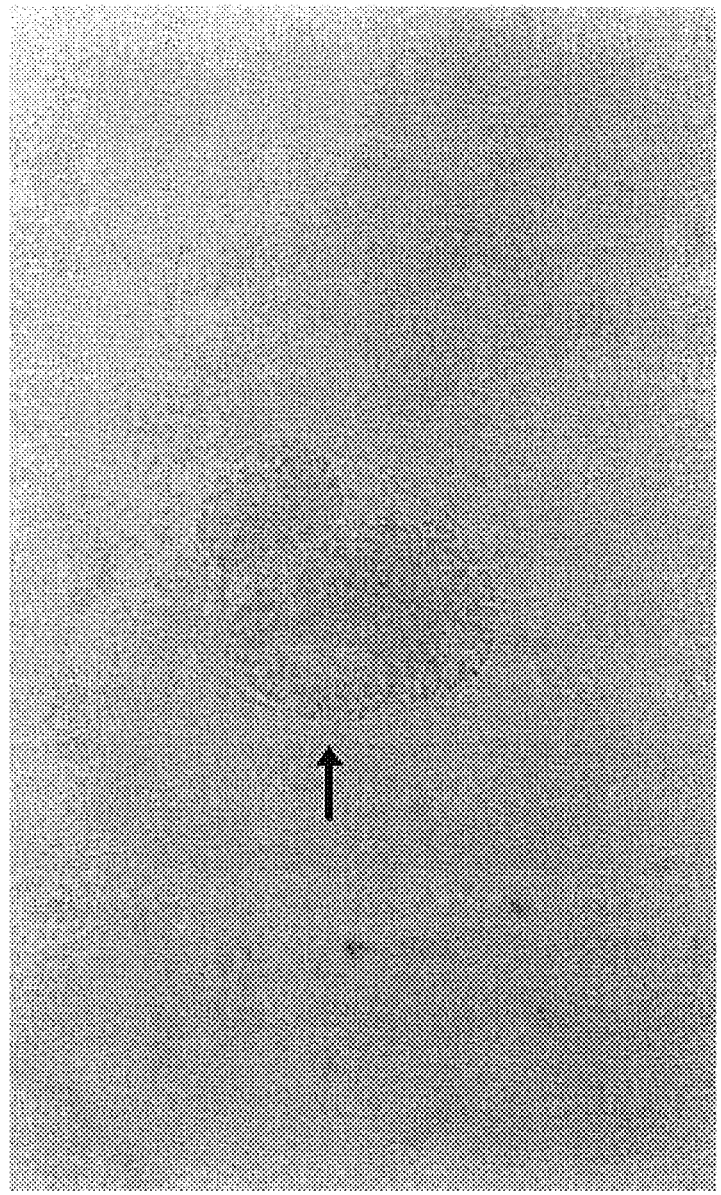
FIG. 12 The dead Oyster egg cell showing absence of fluorescence when excited with Bright Field of BX-60 Olympus microscope.
Figure 12A:
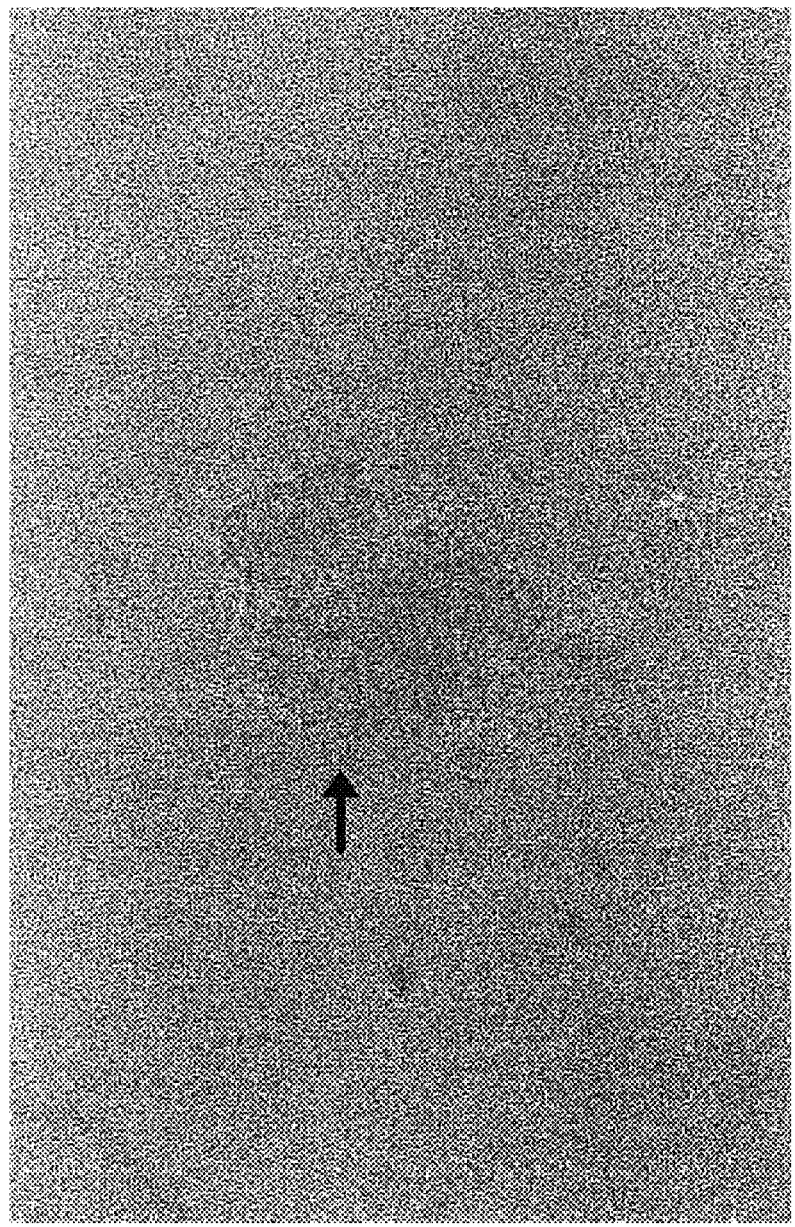
FIG. 12a Color photo of the same.

The good quality sperms and eggs of an oyster in the fixed ratio of 10:1 were added to the cavity of a sedgewick counter used for phytoplankton counts. 5 microliter (5 µl) of alcoholic extract was added. The slide was then screened under a microscope immediately and observations were made for the sperms adhering to the egg membrane, fertilized & unfertilized eggs. A control was maintained without the extract. FIGS. 6 & 6a show polar body extrusion noticed within a minute and seen with Green excitation filter (WG).

It was observed that after 30 seconds 80% eggs were fertilized in the treated cells whereas in the control it was 40% cells fertilized. We observed large number of sperms adhering to the egg membrane. In our earlier experiments we have observed that the usual time taken for fertilization activity in these eggs takes about 10–15 minutes. The first polar body formation took place within 1 minute of adding the dye. (FIGS. 6 & 6a).

The present dye solution has some factor, which is facilitating insemination rates and ultimately increasing rate of fertilization in a much shorter a time interval.

Example 17

Nontoxicity Test of the Dye on Eukaryotic Cells

The extract was tested for cytotoxicity upon the oyster sperms. The survival of the sperms in the experimental set ups was taken as a parameter for showing cytotoxicity Male gonads of an oyster were removed and sperms were released in 100% seawater. These were filtered through a muscline cloth to remove any debris. 1 mililiter (ml) of the sperm solution was taken and different concentrations (1 µl, 2 µl, 3 µl, 4 µl & 5 µl) of the Dye solution were added. At every half an hour the observations of survival of the sperms were made under a microscope. The experiments were continued for 24 hours. The Controls were maintained without addition of Dye. It was seen that the sperms remained alive even with the addition of the dye. This proved nontoxic nature of the dye.

Example 18

Nontoxicity Test of the Dye upon Prokaryotes

The extract was tested for cytotoxicity upon gram negative *E.coli* bacteria by observing their survival or mortality.

A drop of the live *E.coli* bacteria in water (25 µl) was placed on a microscopic slide. To this was added 2 µl of the alcoholic extract. The slide was sealed temporarily so as to save it from evaporation. It was seen under the microscope that the bacteria remained alive for 24 hours till they remained in solution. They died if the solution got dried. The control experiments were performed. This proved that the dye is nontoxic to the prokaryotes also.

Example 19

Epifluorescence Microscopy of the Dye

The epifluorescence microscopic studies are made by using this dye as a stain in the dilutions of 1:100 and recording emissions of light when excited by different cubes and compared the color hues with the known fluorochromes (FIGS. 7 & 7a–10 & 10a). The screening was done using excitations of UV light and visible light spectra by WU, WB, WG and BF cubes of the Olympus reflected light. The details of cubes were as follows:

WU cube's wavelength range was 330 nm–385 nm.

WB cube's wavelength range was 450 nm–480 nm.

WG cube's wavelength range was 510 nm–550 nm.

BF is for the bright field wherein an ordinary tungsten bulb delivers light.

Example 20

The emission ranges of the dye at different excitation ranges were found out. The background of the eggs in the epifluorescence microscopy photos shows the emission color of the dye. It was seen that excitation with the WU 330 nm–385 nm range emitted fluorescence in the 450 nm–470 nm range. Excitation with the WB filter having spectral range of 450 nm–480 nm emitted fluorescence in the 510 nm–570 nm range. The excitation with the WG filter having spectral range of 510 nm–550 nm emitted fluorescence in the 610 nm–650 nm range. With BF the shades of yellowish grays were seen.

Example 21

Fluorescence Emissions in the Oyster Cells

The dye was used as fluorescence microscopic stain on the dead, live and fixed eggs of the oyster. The slides were screened under a epifluorescence microscope. It was noticed that the dead cells do not take up dye and show no fluorescence. (FIGS. 11, 11a & 12, 12a).

The live and fixed cells both showed fluorescence. The excitation spectral range and the emitted fluorescence strictly followed the Stoke's law. These ranges were different from the emission ranges of the dye, which represents the background of the fluorescing cell. Excitation with the WU 330nm–385 nm range emitted fluorescence in the 470 nm–500 nm range in the cells. Excitation with the WB filter having spectral range of 450 nm–480 nm emitted fluorescence in the 570 nm–610 nm range. The excitation with the WG filter having spectral range of 510 nm–550 nm emitted fluorescence in thee 610 nm–650 nm range. The epifluorescent microscopic screening of the dead, live and fixed eggs under Bright Field emitted light in full white range of the visible spectra and depending upon the density of the cell ingredients gave hues of yellowish grays like a phase contrast effect.

Example 22

Fluorescence Emissions in the E.Coli Cells

Figure 13:
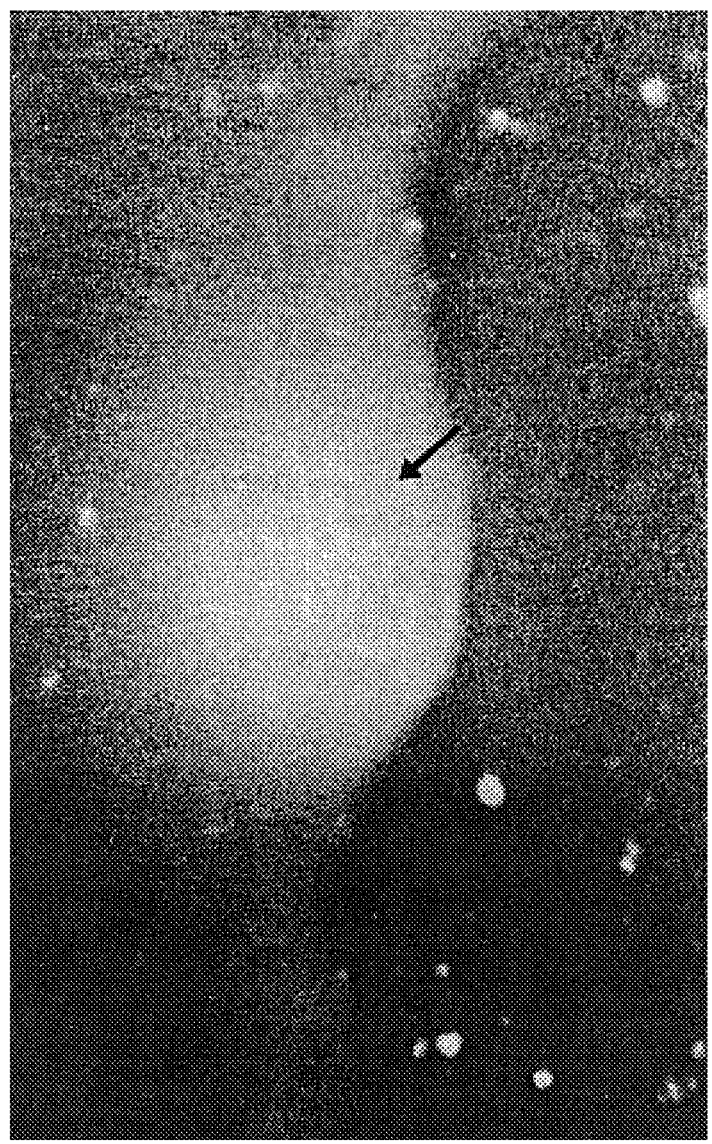
FIG. 13 Black & white figure of epifluorescence microscopy results of dark red color fluorescent emissions of the dye and no fluorescence of the *E.coli* when the dye was excited with WG filter cube of olympus BX-60 microscope having excitation range of 510 nm–550 nm nm.
Figure 13A:
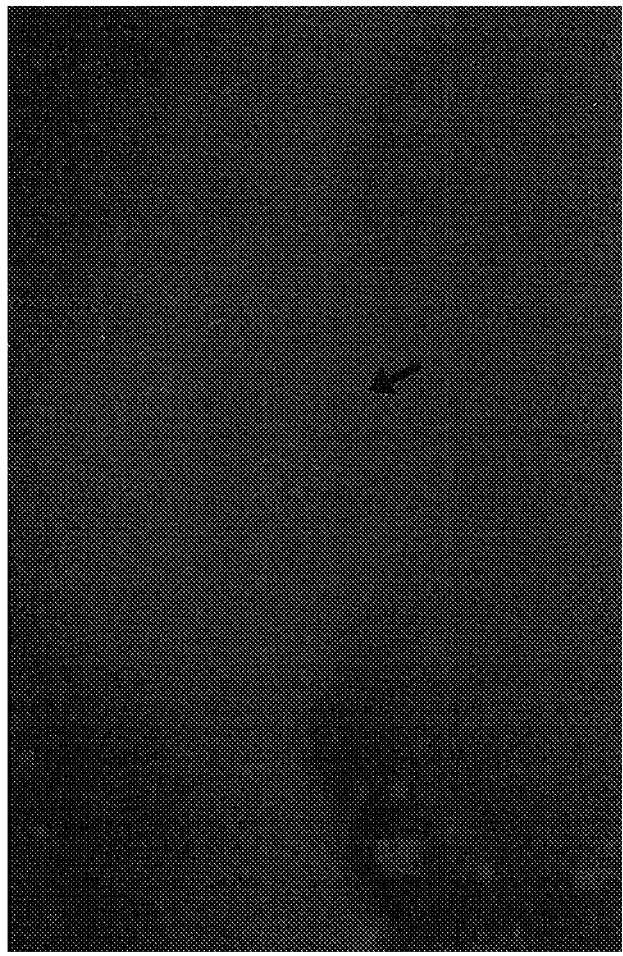
FIG. 13a Colored photograph of FIG. 13.
Figure 14:
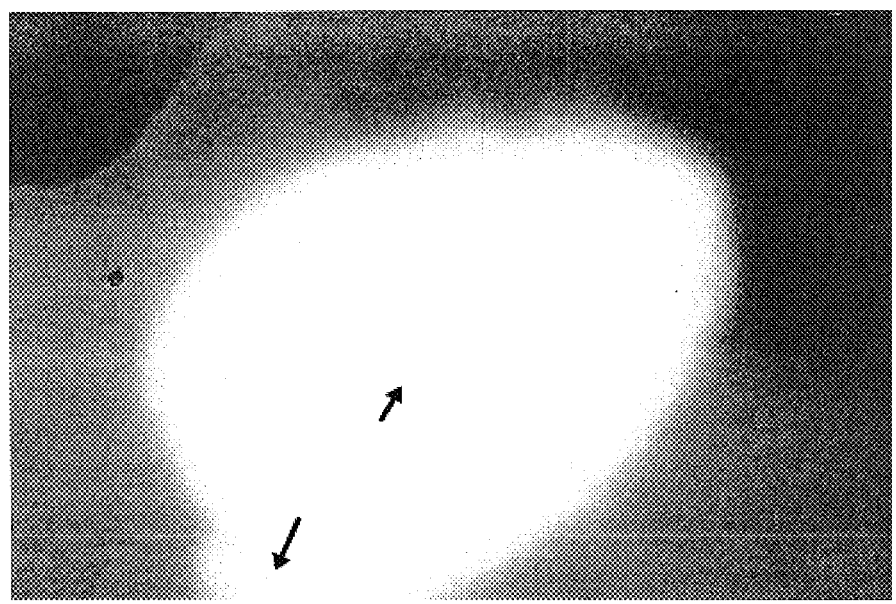
FIG. 14 Black & white figure of epifluorescence microscopy results of dark bluish green color fluorescent emissions of the dye and blue colored emissions of the live oyster embryo cells where dye has permeated (arrow) when the dye was excited with WU filter cube of olympus BX-60 microscope having excitation range of 330 nm–385 nm. The cell permeant nature of the dye showing egg membrane, polar body cell, the cytoplasm and chromatin stained.
Figure 14A:
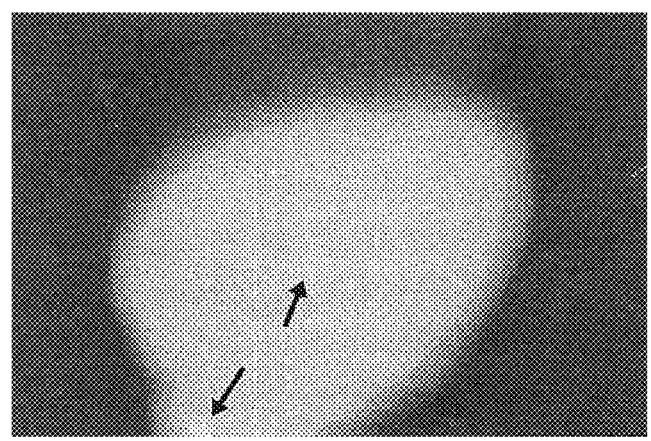
FIG. 14a Colored photograph of FIG. 14. The chromatin inside the nucleus is also seen.
Figure 15:
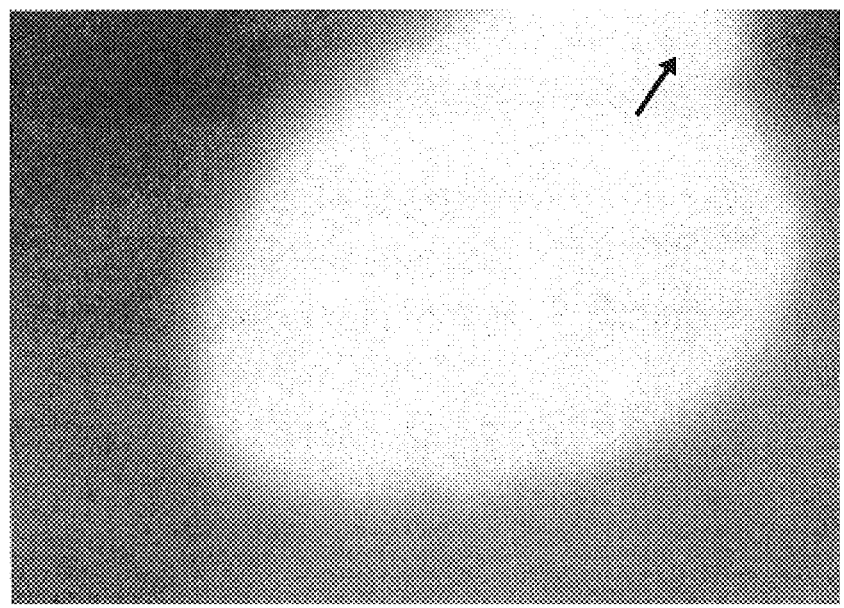
FIG. 15 Black & white figure of epifluorescence microscopy results of dark bluish green color fluorescent emissions of the dye and blue colored emissions of the live oyster embryo cells where dye has permeated (arrow) when the dye was excited with WB filter cube of olympus BX-60 microscope having excitation range of 450–480 nm. The cell permeant nature of the dye showing egg membrane, polar body cell, the cytoplasm and chromatin stained.
Figure 15A:
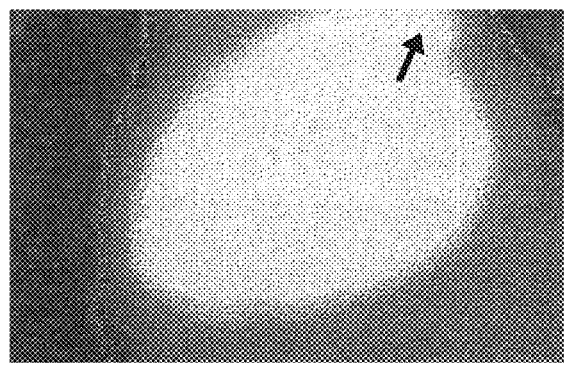
FIG. 15a Colored photograph of FIG. 15. The chromatin inside the polar body is also seen.
Figure 16:
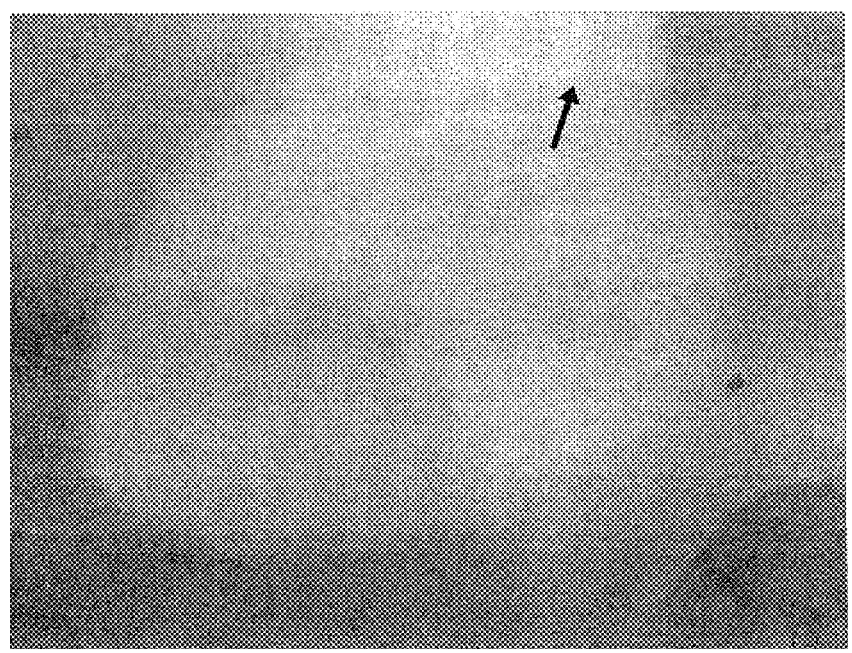
FIG. 16 Black & white figure of epifluorescence microscopy results of dark orange color fluorescent emissions of the dye and bright orange colored emissions of the live oyster embryo cells where dye has permeated (arrow) when the dye was excited with WG filter cube of olympus BX-60 microscope having excitation range of 510 nm–550 nm. The cell permeant nature of the dye showing egg membrane, polar body cell, the cytoplasm and chromatin stained.
Figure 16A:
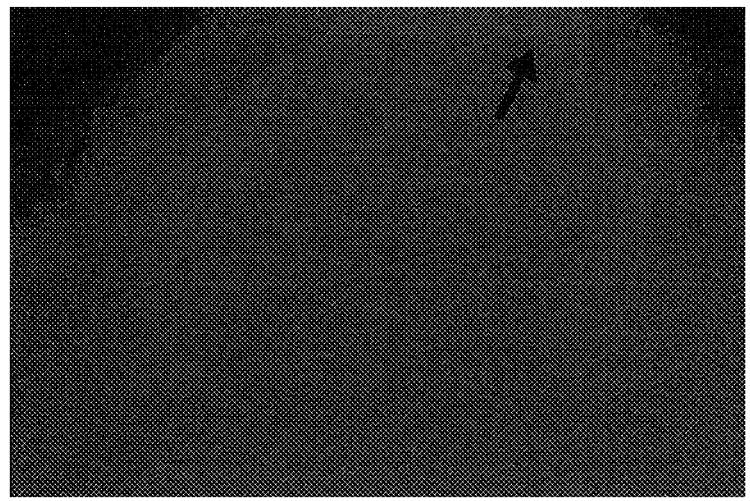
FIG. 16a Colored photograph of FIG. 16. The chromatin inside the polar body is also seen FIG. 17 The chromatogram of the dye taken at 280 nm UV detector.

The dye was used as microscopical stain for the E.coli. One loop of live E.coli bacteria was placed in 25 microliter of water on a microscopic slide and mixed. To this was added 2 microliter (12 $\mu$l) of the dye solution. The alcohol in the extract was allowed to evaporate by leaving the slide on bench for 10–15 sec. A coverslip was then placed on the bacterial suspension in water and sealed. Similarly a Control preparation of bacteria without any dye was made. Both the slides were screened under oil immersion objective of a epifluorescence microscope (100× objective, 10× eye lens) for checking fluorescence. It was noticed that the dead cells do not take up dye and show no fluorescence. (FIGS. 13, 13a). The live and fixed bacterial cells showed fluorescence. The excitation spectral range and the emitted fluorescence wavelengths strictly followed the Stoke's law. These were different from the dye solution and was as given below:

Excitation with the WU 330 nm–385 nm range emitted fluorescence in the 470 nm–500 nm range. Excitation with the WB filter having spectral range of 450 nm–480 nm emitted fluorescence in the 570 nm–610 nm range. The excitation with the WG filter having spectral range of 510 nm–550 nm emitted fluorescence in the 610 nm–650 nm range. The control E.coli without any dye also showed no fluorescence.

Example 23

Microphotography of the Slides with the Dye Used as Epi Fluorescence Microscopy Stain The microphotography of emitted fluorescence in the areas of slides with cells and the surrounding background which represented the emissions of colors only due to dye was done, under WU 330 nm–385 nm range, WB 450 nm–480 nm range, WG 510 nm–550 nm range and Bright field with Kodak film of 400 ASA speed with an exposure time varying from 50 to 60 seconds.

Example 24

Permeation of Dye in the Cell Membranes

The unfertilized, fertilized eggs and larvae of oysters were stained with the dye and egg suspension ratio of 1:50 microliter and screened under a fluorescent microscope. (FIGS. 4, 4a–16, 16a). It was seen that the fluorescence was noticeable in the plasma membrane, nuclear envelop and chromatin. Though the wavelength ranges of emissions were the same and the colors were the hues of the same shade, there was a noticeable demarcation of boundaries of these parts of the cell (FIGS. 7, 7a–10, 10a). This proved that the dye is permeable through the live and fixed cell membranes of egg plasma membrane, cytoplasm, nuclear membrane, nucleoplasm and chromatin. The absence of fluorescence of these parts of the cell in the dead cells showed that dye is permeant to live and fixed cell membranes only. Similarly, the presence of fluorescence emissions only in the live E.coli cells and not dead cells was seen.

Example 25

The bioactive extract of the dye was taken in a microfuge tube and kept at −20 degree centigrade and seen in the frozen state under UV light. In another experiment the Whatman filter paper dipped in the dye solution was held at minus 20 degree centigrade and observed under UV transilluminator. The fluorescence persisted without any deterioration.

Advantages Over the Present Marketed Dyes

1. The dye is nonradiactive as it is a dye from a natural source and not synthetic.
2. The dye is nontoxic to estuarine, marine animals and gram negative E.coli bacteria
3. The dye is cell membrane permeant and attaches itself to nuclear mebrane and chromatin also.
4. The dye is permeant to cytoplasm and nucleoplasm.
5. The dye is a fluorescent protein dye from a non bioluminescent marine animal.
6. This dye in its single form is equivalent to six synthetic fluorochromes which covers the major part of UV and visible light spectrum emission of fluorescent colors.
7. The dye can be used as a quick microscopic stain giving a phase contrast effect without any extra expenses on phase contrast accessory of a microscope and without any lengthy protocols of fixations and preservations of specimens, especially on the spot quality check of live samples.
8. Being non degradable in quality of fluorescence on stained cells for longer duration, it does not require refrigeration while exporting stained slides. The dye solution can be marketed at 4 degree centigrade. The presently marketed fluorescent dyes exported under refrigeration equivalent to −20 degree centigrade.
9. The dye has a pH range of 6.8 to 7.5 which is very close to neutral so in compositions the pH of the products will not change drastically.
10. Unlike the earlier known Green Fluorescent protein (GFP) from a marine jelly fish, our dye is not a reporter gene. The fluorophore is directly attached to the protein and gives fluorescence without any cyclization step of aminoacids.
11. The fluorescent results of the said are direct.
12. GFP absorbs blue light at 395 nm and with a minor peak at 470 nm emits green light. Our dye emits 6 fluorescent colors and at three different fluorescent wavelengths.
13. The dye is soluble in 70% alcohol.
14. The dye is negatively charged
15. The dye solution in its partially purified form consists of minimum 4 compounds.
16. The dye contains carbohydrate and proteins.
17. The fluorophore is non-polar but the dye on the whole is negatively charged. Which shows that the fluorophore is attached to the protein.

18. The dye contains at least one glycoprotein and has lectin like activity.
19. It shows agglutination of bacteria which can be useful in removing harmful bacteria
20. The agglutinated bacterial cells still fluorescese. This quality can be used in finding counts of bacteria in food industry.
21. The dye induced agglutination in the eukaryotic sperm and egg cells, which enhanced rate of insemination and fertilization and increased an overall rate of fertility in a very short duration. The dye can be used in aquaculture industry and tried upon human sex cells.
22. The dye is proteinaceous in nature but non-degradable under natural conditions once it gets attached to the cell membranes. This can be of immense value to study live cell functions, organelle structure, cell sorting and flow-cytometry.
23. The dye solution is nontoxic to live bacteria and oyster eggs and sperms.
24. The nontoxic nature of the dye has the advantage that this can be made a dye component of kits dealing with analysis of live cells.
25. The nontoxic nature of the dye has the advantage that this can be made a dye component of kits dealing in situ operational studies in oceanography.
26. The dye does not stain and do not show fluorescence on dead bacteria. This is useful in tissue culture for checking live and dead cells.
27. The dye being nontoxic to live cells can be useful in following up of cell lines.
28. The dye is cell membrane permeant in the live and fixed cells. This is a natural dye so has the advantage over the synthetic one because it will be more ecofriendly.
29. The dye covers a wider range of emission wavelengths at selective excitations. This makes it a very acceptable component of dual emission dyes kits marketed presently for addition of a third emission color range.
30. The dye does not show photobleaching once it stains the cells on slides. This makes it useful in histochemical studies.
31. The dye emitted these fluorescence colors even at a dilution range of 1:200000 to 1:400000 times.
32. These multicolored emissions of the dye at different wavelengths of excitations are comparable to the fluorochrome microscopic stains already in the market.
33. The blue colored fluorescence of the present dye is comparable to the emission of same color by DAPI fluorochrome at the same wavelength excitation, used as components of the nonradioactive labeling kits of biochemistry, cell biology, immunochemistry, and molecular biology.
34. The blue colored fluorescence of the present dye is also comparable to the emission of color by Hoechest 33258 used as components of the nonradioactive labeling and detection kits of biochemistry, cell biology, immunochemistry, and molecular biology.
35. The blue colored fluorescence of the present dye is also comparable to the emission of color by Hoechest 33342 fluorochrome at the same wavelength excitation used as components of the nonradioactive labeling and detection kits of biochemistry, cell biology, immunochemistry, and molecular biology.
36. The yellow colored fluorescence of the said dye in the visible range is comparable to the same colored emissions of Acridine orange used as components of the non-radioactive labeling and detection kits of biochemistry, cell biology, immunochemistry, and molecular biology.
37. The yellow colored fluorescence of the said dye in the visible range is comparable to the same colored emissions of auramine used as components of the non-radioactive labeling and detection kits of biochemistry, cell biology, immunochemistry, and molecular biology.
38. The yellow colored fluorescence of the said dye in the visible range is comparable to the same colored emissions of FITC used as components of the non-radioactive labeling and detection kits of biochemistry, cell biology, immunochemistry, and molecular biology.
39. The orange colored fluorescent emission is comparable to the orange fluorescence color of Propidium Iodide fluorochrome used as components of the non-radioactive labeling and detection kits of biochemistry, cell biology, immunochemistry, and molecular biology.
40. The orange colored fluorescent emission is comparable to the orange fluorescence color of Rhodamine fluorochrome used as components of the non-radioactive labeling and detection kits of biochemistry, cell biology, immunochemistry, and molecular biology.
41. The orange colored fluorescent emission is comparable to the orange fluorescence color of TRITC fluorochrome used as components of the non-radioactive labeling and detection kits of biochemistry, cell biology, immunochemistry, and molecular biology.
42. Unlike the synthetic commercial dyes used for the same purposes, the present dye is stable at the room temperature and has a long shelf life. Molecular non-radioactive kits of the said dye can be exported at the room temperatures.
43. The said single dye has characteristics of atleast one hundred and twenty three different fluorochromes (DAPI, Hoechest 33258, Hoechest 33342, FITC, acridine range, auramine, Rhodamine, TRITC, and propidium iodide etc.) now in the market.
44. Under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence.
45. The microphotograph with Kodak film rolls shows hues of the adjacent color emission wavelengths. Like when seen blue color fluorescence under the epifluorescence microscope in microphotograph the hues of green also comes.
46. The microphotograph with Kodak film rolls shows hues of the adjacent color emission wavelengths. Like when seen yellow color fluorescence under the epifluorescence microscope in microphotograph the hues of green also comes. The dye when seen orange fluorescence color under the epifluorescence microscope in microphotograph the hues of red also come.
47. The cytogenetic slides seen under all fluorescence gives a counterstain effect of cells with the background where no specimen but only dye is present.
48. The dye can be used in fluorescent colors in variety of paints, inks, textiles.
49. The dye can be used in compositions of fluorescent dye for bleaching and brightening polymer.
50. The dye can be used in leak detection with a full spectrum fluorescent dye.
51. It can also be used in automated chemical metering system. It can also be used to mark the location of crashed aircrafts, life crafts, and equipment for example rockets. Further it can be used in under sea probes.
52. The nontoxic and cell permeant nature of the dye can be used as a component of the nonradioactive labeling and detection kits of biochemistry, cell biology, immunochemistry, and molecular biology for labeling of DNA,RNA, Proteins and enzymes, Immunofluorescent detections, Counterstain of DIG-labeled oliogonucleotide probes and Anti-DIG Fab-fragments, Single and multiple cell quantitative fluorescence in Flowcytometry. Fluorochrome stains for epifluorescence microscopy.

53. The dye can be used for a quick check of biocontamination in the health food industry, cosmetic industry, pharmaceutical and chemical industries, for rapid estimations of biocontaminants in laboratory cultures, for a rapid check of biopollutants under field conditions.
54. The dye can be used in compositions where a nontoxic ecofriendly nature is required.
55. The dye can be used natural colorant. A bioactive composition of the marine dye in the ratio of 1:20000 to 1:40000 to obtain fluorescence of six colors at three different wavelengths and a phase contrast effect under transmitted light.

References Cited (Referenced By)

Bandaranayake, W. M. and Des Rocher, A 1999 (Marine biology 133;163–169)

Bitplane products at (http://www.bitplane.ch/public/support/standard/fluorochrome.htm)

Boehringer Mannheim GmbH, Biochemica, Catalogue, printed in Germany, Chapter II. Non-radioactive In Situ Hybridization Application Manual. 1992)

Chalfie M "Green fluorescent protein" in 1: Photochem Photobiol October 62 (4): 651–656 (1995)

Chalfie et al. SCIENCE 263 (1994) 802–805. Proteins with other wavelengths in the range of red and yellow are produced by induced mutations in some aminoacids.

Debra K. Hobson and David S. Wales. "Green dyes", Journal of the Society of Dyers and Colourists (JSDC), 114, 42–44, (1998).

Fradkov A F, Chen Y, Ding L, Barsova E V, Matz M V,Lukyanov S A "Novel fluorescent protein from Discosoma coral and its mutants possesses a unique far-red fluorescence. In 1:FEBS Lett Aug. 18: 479 (3): 127–30. (2000).

George L. Clark, "Pigments" in Encyclopaedia of chemistry, $2^{nd}$ ed. Pages 833–835, 1966.

Gurskaya N G, Fradkov A F, Terskikh A, Matz M V, Labas Y A, Martynov V I, Yanushevich Y G, Lukyanov K A, Lukyanov S A "GFP-like chromoproteins as a source of far-red fluorescent proteins" in 1: FEBS Lett October 19; 507 (1): 16–20 (2001).

Haughland R. P. Molecular probes. The Handbook of Fluorescent probes and Research Chemicals by Richard P. Haughland, $6^{th}$ edition Printed in the united States of America, 1996.

R. Norman Jones in The encycopaedia of chemistry, $2^{nd}$ edition, 1966, Quote from pages 435–436

Wachter R M, Elsliger M A, Kallio K, Hanson G T, Remington S J. In 1: Structure Oct. 15, 1998 ; 6(10): 1267–77 described "Structural basis of spectral shifts in the yellow-emission variants of green fluorescent protein".

Youvan D C, Michel-Beyerie M E "Structure and fluorescence mechanism of GFP in National Biotechnology Oct. 14, 1996 (10): 1219–20.

George L. Clark, "Fluorescence" in Encyclopaedia of chemistry, $2^{nd}$ ed. Page 435–436, 1966.

Kowalzick L; Ott A; Waldmann T; Suckow M; Ponnighaus J, M. Vogtlandklinikum Plauen (Elsevier Science B. V2000).

Matz M V, Fradkov A F, Labas Y A, Savitsky A P, Zaraisky A G, Markelov M L, Lukyanov S A. "Fluorescent proteins from nonbioluminescent Anthozoa species", 1: Nat Biotechnolo December 1999: 17(10): 969–73.

Sepcic K, Turk T, Macek P "A fluorescent zoanthid pigment, parazoanthoxanthin A." Toxicon, 36 (6): 937–940,1998.

Olympus Optical Co. Ltd, Tokyo Japan. Catalogue. "Instructions BX-FLA Reflected Light Fluorescence attachment" Page 16. 1999.

Shimomura, O, Johnson, F. H. and Saiga, Y "A novel reporter gene" Journal of cellular and comparative physiology, 59, 223–239, 1962.

Stainfile-Dyes A has given a Dye index of 264 dyes. Out of which 258 are synthetic and only six are natural dyes (http://members.ngonline.com/~bryand/dyes/dyes.htm).

Wuerthner A. K:. http://www.uniulm.de/uni/fak/natwis/oc2/ak_wuert/publications.htm (referred from the internet).

Sigma-Aldrich "Biochemicals and reagents for life sciences research, 2000–2001 in their section immunochemicals of the catalogue under labeling reagents and cell linker labeling kits pp. 1454–1456. (web site www.sigma-aldrich.com)

U.S. patent Documents

| | | |
|---|---|---|
| 4,063,878 | Dec. 20, 1977 | Weeks, B. W. |
| 4,452,822 | Jun. 5, 1984 | Shrikhande, Anil J |
| 4,774,339 | Sep. 27, 1988 | Haughland, R. P et al. |
| 4,762,701 | Aug. 9, 1988 | Horan et al. |
| 4,783,401 | Nov. 8, 1988 | Horan et al. |
| 4,859,584 | Aug. 22, 1989 | Horan et al. |
| 5,248,782 | Sep. 28, 1993 | Haughland, R. P at al. |
| 5,187,288 | Feb. 16, 1993 | Kang, H. C. at al. |
| 5,274,113 | Dec. 28, 1993 | Kang, H. C et al |
| 5,321,268 | Jun. 14, 1994 | Crosby David A and Ekstrom Philip A |
| 5,304,493 | Apr. 19, 1994 | Nowak, A. V. |
| 5,405,416 | Apr. 11, 1995 | Swinton; Robert J, |
| 5,433,896 | Jul. 18, 1995 | Kang, H. C. |
| 5,451,663 | Sep. 19, 1995 | Kang, H. C |
| 5,770,205 | Jun. 23, 1998 | Collin, P. D |
| 5,710,197 | Jan. 20, 1998 | Fischer et al. |
| 5,876,762 | Mar. 2, 1999 | Collin, P. D |
| 5,985,330 | Nov. 16, 1999 | Collin, P. D |
| 5,858,761 | Jan. 12, 1999 | Tsubokura, et al. |
| 5,902,749 | May 11, 1999 | Lichtwardt et al. |
| 5,908,650 | Jun. 1, 1999 | Lenoble, et al |
| 5,920,429 | Jul. 6, 1999 | Burns et al. |
| 5,935,808 | Aug. 10, 1999 | Hirschberg, et al |
| 5,989,135 | Nov. 23, 1999 | Welch; David Emanuel |
| 6,055,936 | May 2, 2000 | Collin; Peter Donald |
| 6,056,162 | May 2, 2000 | Leighley; Kenneth C. |
| 6,103,006 | Aug. 15, 2000 | DiPietro; Thomas C. |
| 6,110,566 | Aug. 29, 2000 | White et al. |
| 6,140,041 | Oct. 31, 2000 | LaClair; James J. |
| 6,165,384 | Dec. 26, 2000 | Cooper et al. |
| 6,180,154 | Jan. 30, 2001 | Wrolstad et al. |

International patents:

| | | |
|---|---|---|
| EP0206718 | Dec. 30, 1986 | Cramer Randall J |
| IE901379 D | Jan. 30, 1991 | Lee Linda G; Mize Patrick |
| WO9010044 | Jul. 7, 1990. | Swinton; Robert J |
| DE 4416476 | Nov. 16, 1995 | S. Beckmann et al. |
| WO 30679 | Nov. 16, 1995 | S. Beckmann et al. |
| DE19611351 | Mar. 22, 1996 | K-H. Etzbach et al. |
| AU704112 A | Oct. 7, 1997 | Burns David M; Pavelka Lee |
| WO 35926 | Oct. 2, 1997 | K.-H. Etzbach et al. |
| DE 19648564 A1 | May 28, 1998 | C. Grund et al. |
| DE 19650958 A1 | Jun. 10, 1998 | C. Grund et al. |
| WO 98/23688 | Jun. 4, 1998 | C. Grund et al. |
| DE 19643097 A1 | Apr. 23, 1998 | F. Würthner et al., |
| DE 19711445 A1 | Sep. 24, 1998 | F. Würthner et al., |

-continued

| | | |
|---|---|---|
| WO 41583 | Sep. 24, 1998 | F. Würthner et al., |
| DE19755642 | Jun. 24, 1999 | Weimer Thomas DR. |
| WO9938919 | Sep. 28, 1999 | Laclair James J |
| WO0058406 | Oct. 5, 2000. | Rosenblum Barnett B et al. |
| WO9938916 | Aug. 15, 2000 | DiPietro; Thomas C |
| WO9920688 | Aug. 29, 2000 | Pavelka Lee et al. |
| WO9920688 | Aug. 29, 2000 | White et al. |

TABLE 1

The spots and their respective Rf values

| Solvent front | Distance migrated by the compound | Rf. Value |
|---|---|---|
| 12.1 cm | 11.1 cm | 0.917 |
| | 9.9 cm | 0.818 |
| | 8.0 cm | 0.661 |
| | 5.6 cm | 0.463 |

TABLE 2

Retention time of proteins: At 280 nm

| Peak | Retention time | Area | Area percent |
|---|---|---|---|
| 1 | 2.1 | 116103 | 40.39 |
| 2 | 2.5 | 38205 | 13.29 |
| 3 | 3.7 | 7332 | 2.55 |
| 4 | 6.1 | 31924 | 11.11 |
| 5 | 6.8 | 535 | 0.19 |
| 6 | 7.6 | 3684 | 1.28 |
| 7 | 8.8 | 89653 | 31.19 |

TABLE 3

Retention time of proteins: At 205 nm

| Peak | Retention time | Area | Area percent |
|---|---|---|---|
| 1 | 2.1 | 981758 | 10.44 |
| 2 | 2.8 | 800877 | 8.52 |
| 3 | 3.9 | 3218965 | 34.23 |
| 4 | 4.4 | 117882 | 1.25 |
| 5 | 5.1 | 2404982 | 25.57 |
| 6 | 6.1 | 106728 | 1.13 |
| 7 | 8.8 | 1477895 | 15.71 |
| 8 | 10.4 | 63482 | 0.67 |
| 9 | 13.7 | 119113 | 1.27 |
| 10 | 14.8 | 113586 | 1.21 |

TABLE 4

RI detector for the presence of Carbohydrates:

| Peak | Retention time | Area | Area percent |
|---|---|---|---|
| 1 | 5.494 | 5718 | 19.79 |
| 2 | 5.973 | 1707 | 5.91 |
| 3 | 6.441 | 1637 | 5.66 |
| 4 | 6.995 | 31.92 | 11.05 |
| 5 | 8.939 | 16639 | 57.59 |

TABLE 5

The Emissions of the different colored fluorescence of the fluorescent dye when excited with different wavelength fluorescent filter cubes of the Olympus epifluorescence microscope with dye solution and when attached to cell membranes of the prokaryotic cells.

| Name of the fluorescent cube as given in the catalogue of Olympus Optical Co. Ltd. | Excitation range of the fluorescent cube | Emission range of dye solution | Emission range of dye when attached to Cell membranes | Emitted Color of dye | Emitted Color of the dye when attached to Cell membranes |
|---|---|---|---|---|---|
| M WU | 330–385 nm | 450 nm–470 | 470 nm–500 | Blue | Blue |
| M WB | 450–480 nm | 510 nm–570 nm | 570–610 nm | Green | Yellow |
| MWG | 510–550 nm | 610 nm–650 nm | 610–650 nm | Orangish red | Orangish red |
| Bright field | Transmitted light | White light | White light | Yellowish gray | Shades of yellowish dark gray |

TABLE 6

The Emissions of the different colored fluorescence of the fluorescent dye when excited with different wavelength fluorescent filter cubes of the Olympus epifluorescence microscope with dye solution and when attached to cell membranes of the eukaryotic cells.

| Name of the fluorescent cube as given in the catalogue of Olympus Optical Co. Ltd. | Excitation range of the fluorescent cube | Emission range of dye solution | Emission range of dye when attached to Cell membranes | Emitted Color of dye | Emitted Color of the dye when attached to Cell membranes |
|---|---|---|---|---|---|
| M WU | 330–385 nm | 450 nm–470 | 470 nm–500 | Blue | Blue |
| M WB | 450–480 nm | 510 nm–570 nm | 570–610 nm | Green | Yellow |
| MWG | 510–550 nm | 610 nm–650 nm | 610–650 nm | Orangish red | Orangish red |
| Bright field | Transmitted light | White light | White light | Yellowish gray | Shades of yellowish dark gray |

TABLE 7

Table showing various commercially important features of the three natural fluorescent dyes extracted from the sea cucumber *Holothuria scabra* by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | Fluorescent Dye-(CSIR NF 152/2002 Present U.S. patent application Ser. No._____ |
|---|---|---|
| Name of Animal/species | Sea cucumber *Holothuria scabra* (see example 1) | Sea cucumber *Holothuria scabra* (see example 1) |
| Bioactive extract | Pigment which is a fluorescent dye is extracted from skin of the animal with 50% alcohol (see example 2–5) | Pigment, which is a fluorescent dye, is extracted from Live female gonads (ovarian tissue) of the animal with 70% alcohol and purified by filtration. (see example 2) |
| Chemical nature | Non proteinaceous (see example 7) | Proteinaceous (see example 6, 8, 13) |
| Drug properties | In compositions of drugs of insecticidal, pesticidal, veterinary medicines and cosmetics for sunscreens. (see examples 19–23) | Nontoxic to animal cells and bacteria. During bioassays the oyster sperms and bacteria remained alive in the sets treated with different concentrations. The dye can be useful in drug delivery studies for in situ applications (see examples 17, 18) |
| Cell membrane permeability | Stains and fluoresce live, dead, refrigerated and fixed tissues. Dye is cell membrane permeant It is permeable to the nuclear membrane. It also stains chromatin. (see examples 21) | Stains and fluoresce live, and fixed cells. Do not stain dead animal and bacterial cells. Dye is cell membrane permeant It is permeable to the nuclear membrane. It also stains chromatin. (see examples 24) |
| Agglutination induction | Do not induce agglutination | Induces agglutination in oyster sperms, eggs and bacterial cells but do not kill them. (see examples 14, 15) |
| Effect on rate of fertilization of oyster gametes | No effect on cell lines | Enhances rate of fertilization (see examples 16) |
| Biosurfactant nature | Biosurfactant nature present (see examples 9) | Biosurfactant nature absent |
| Live/Dead bacterial contaminations checks | Stains and fluoresce all kind of cells and cellulose (see examples 12–17) | Stains and fluoresce only live and fixed cells. The dead bacteria do not stain and do not fluoresce. (see examples 22) |
| Live/Dead animal cell sorting in tissue cultures | Stains and fluoresce all kind of cells and cellulose (see examples 12–17) | Stains and fluoresce only live and fixed cells. The dead animal cells do not stain and do not fluoresce. (see examples 24) |
| Non-radioactive dye | Dye is non-radioactive as it is not a synthetic dye but is natural dye. Useful for in situ non-radioactive kit compositions. | Dye is non-radioactive as it is not a synthetic dye but is natural dye. Dye is non-radioactive as it is not a synthetic dye but is natural dye. |
| Photobleaching/ photostability | i. Do not photobleach while screening slides. ii. Photostable at the room temperature over one year. iii. the fluorescence of the dye does not change even when frozen at minus 20° C., a temperature at which the molecules are unable to attain the energy necessary for activation like in extracts from luminescent organisms. (see examples 18) | i. Do not photobleach while screening slides. ii. Photostable at 4 degree centigrade but after staining the cells, it remains non degradable even at the room temperature for several months. iii. The stained slides do not destain and preserve fluorescence. iv. The fluorescence of the dye does not change even when frozen at minus 20° C., a temperature at which the molecules are unable to attain the energy necessary for activation like in extracts from luminescent organisms. (see examples 4, 25) |
| Quantum of fluorescence | Very bright even at dilutions of 1:40000 (see examples 14) | Very bright even at dilutions of 1:400000 and above (see examples 18, 19, 22) |
| Antimicrobial/ insecticidal/ Pesticidal bioactivities | Antimicrobial/insecticidal/ Pesticidal activities present. (see examples 10) | Antimicrobial/insecticidal/ Pesticidal activities absent. (see examples 17, 18) |
| Emission ranges of dyes when excited with cubes of fluorescent olympus BX-60 microscope of Olympus Co. Ltd Japan having different | i. Dye emits three different colored emissions ii. fluorescence blue color emission occur in the 380 nm–400 nm range of UVA when excited under ultra violet cube WU - 330 nm–385 nm excitation range, iii. fluourescence yellow color emission occurs in the 500 nm–570 nm range when excited under WB cube of | i. dye emits six different colored fluorescence at 3 different wavelengths of the UV and visible ranges of the fluorescent cubes of an epifluorescence microscope, ii. dye emits three different colored fluorescence at 3 different wavelengths of the UV and visible ranges of the fluorescent cubes of an epifluorescence microscope when attached to the cell membranes. These three emission ranges are different from that of the dye |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | | Fluorescent Dye-(CSIR NF 140/2001) U.S. patent application Ser. No. 09/820,654 filed Mar. 30, 2001 | | Fluorescent Dye-(CSIR NF 152/2002 Present U.S. patent application Ser. No._____ |
|---|---|---|---|---|
| excitation wavelength ranges: WU range 330–385 nm WB range 450–480 WG range 510–550 nm Bright field | iv. v. | 450 nm–480 nm excitation range. fluorescence orange color emission occurs in the 570 nm–650 nm range when excited under WG cube of 510 nm–550 nm excitation range, Phase contrast effect under bright field (see examples 14–17) | iii. iv. v. vi. vii. viii. ix. x. | alone. Fluorescence blue color Emission occur in the 450 nm–470 nm range when dye in solution is excited under ultra violet cube WU - 330 nm–385 nm excitation range, Fluorescence green color emission occurs in the 510 nm–570 nm range when dye in solution is excited under WB cube of 450 nm–480 nm excitation range, Fluorescence orange color emission occurs in the 610 nm–650 nm range when dye solution is excited under WB cube of 510 nm–550 nm excitation range, the dye emits hues of yellowish grays under the ordinary transmitted light bulb of the epifluorescence microscope when seen under 100X objective, fluorescence blue color emission occur in the 470 nm–500 nm range when dye attached to the cell membranes is excited under ultra violet cube WU - 330 nm–385 nm excitation range, fluorescence green color emission occurs in the 570 nm–610 nm range when dye attached to the cell membranes is excited under WB cube of 450 nm–480 nm excitation range, fluorescence orange color emission occurs in the 610 nm–650 nm range when dye attached to the cell membranes is excited under WG cube of 510 nm–550 nm excitation range, the dye on cell membranes attached emits hues of yellowish grays under the ordinary transmitted light bulb of the epifluorescence microscope when seen under 100X objective (see examples 19–23) |
| Other chemical and physical Characteristics of the dye | i.. ii. iii. iv. v. vi. vii. viii. ix. x. xi. xii. xiii xiv. xv. xvi. xvii. xviii. | de colorization by a reducing agent, not a synthetic compound, crude extract of the dye is yellowish green in color, purified dye being reddish brown colored powder when seen with the naked eye in the daylight, under tube light some hues of green are emitted. amorphous in nature, soluble in water, insoluble in the organic solvents like ethanol, methanol and acetone, is negatively charged, has a pH of 6.5, Presence of a phenolic group absence of a quinoid ring, absence of a aromatic amine group reducing sugar is absent, pigment cum dye is a fluorescent dye nd emits fluorescence when excited with different wavelengths of UV and visible spectral ranges on a spectrophotometer, UV, visible spectroscopy from 00 nm–700 nm and the peaks are marked at 379 nm and 439 nm wavelengths, UV, visible spectroscopy from 250 nm–350 nm and the peaks are at 272 nm and 299 nm wavelengths, fluorescent spectroscopy in the UV and visible spectra, when excited with UV 270 nm wavelength the fluorescence is emitted in the 324 nm–380 nm range which comes under the | i. ii. iii. iv. v. vi. vii. viii. ix. x. xi. xii. xiii. xiv. xv. xvi. xvii. xviii. xix. xx. xxi. xxii. | is a non-reducible dye not a synthetic compound, crude extract of the dye is yellowish orange in color, partially purified dye being light yellowish orange in color when seen with the naked eye in the daylight, under tube light hues of multicolor are emitted. cannot be made into powder is in a solution form soluble in 70% ethyl alcohol, dilutions can be made in water/seawater. is negatively charged, has a pH of 6.8–7.5, absence of a quinoid ring, proteinaceous in nature, The solvent front of TLC is 12.1 cm, four spots present. Compound 1 spot has migrated distance of 11.1 cm. Its Rf value is 0.917. Compound 2 spot has distance migrated of 9.9 cm. Its Rf value is 0.818. Compound 3 spot has distance migrated of 8.0 cm. Its Rf value is 0.661. Compound 4 spot has distance migrated of 5.6 cm. Its Rf value is 0.463 It has carbohydrate It has protein At least one of the proteins is a glycoprotein UV, visible spectroscopy the wavelength of excitation was maximum at 351 nm, 580 nm, 720 nm. the fluorescence emission spectrometric |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | | Fluorescent Dye-(CSIR NF 140/2001) U.S. patent application Ser. No. 09/820,654 filed Mar. 30, 2001 | | Fluorescent Dye-(CSIR NF 152/2002 Present U.S. patent application Ser. No._____ |
|---|---|---|---|---|
| | | UVA wavelength range of ultraviolet rays of the sunlight, | | analysis was inbetween 400 to 600 nm when excited at 351 nm. |
| | xix. | with excitation wavelength 450 nm in Fluorescent spectroscopy the fluorescence emission occurred at 500 nm–580 nm with maximum intensity, | xxiii. | The emission maximas were two peaks at 450 nm and 550 nm. (see examples 1–25) |
| | xx. | with excitation wavelength 540 nm in Fluorescent spectroscopy, the fluorescence emission occurred at 500 nm–620 nm with maximum intensity, | | |
| | xxi. | with excitation wavelength 555 nm in Fluorescent spectroscopy, the fluorescence emission occurred at 575 nm–620 nm with maximum intensity, | | |
| | xxii. | iii.physical checking of Whatman Filter no. 1 dipped with dye concentration 1:40000 dilution under UV transilluminator and Gel Documentation system with UV bulbs of 260 nm–280 nm range emit bluish green hue color of fluorescence. (see examples 1–23) | | |
| Advantages over presently marketed dyes and common to all the three dyes | 1. | dye is natural and not synthetic so steps of harsh treatments with acids and alkalies which are harmful to the environment are not required. (see example 1, 2) | 1. | dye is natural and not synthetic so steps of harsh treatments with acids and alkalies which are harmful to the environment are not required. (see example 1, 2) |
| | 2. | The dye fits in the criterion of a good dye according to which differentiation of various part of the cell can be done under the same excitation range. (see example 21) | 2. | The dye fits in the criterion of a good dye according to which differentiation of various part of the cell can be done under the same excitation range. (see example 24) |
| | 3. | The dye is non-radioactive as it is a dye from a natural source and not synthetic. (see example 1, 2) | 3. | The dye is non-radioactive as it is a dye from a natural source and not synthetic. (see example 1, 2) |
| | 4. | the dye has antibacterial quality (see example 10). | 4. | the dye is useful in drug industry for making kits for checking bacterial contaminations. (see example 17, 18) |
| | 5. | it has insecticidal qualities (see example 19) | 5. | the dye is useful in medical applications where fluorescence based in situ follow up of drugs or molecules need to be seen since the dye is cell membrane permeant and nontoxic to cells. (see example 24) |
| | 6. | the dye has pesticidal qualities. it kills dog fleas and ticks (see example 23) | 6. | This dye in its single form is equivalent to six different synthetic fluorochromes giving same colored emission of fluorescent colors. While earlier fluorochromes needs to be used in mixed combinations this dye is a single dye showing those effects. (see examples 19–23) |
| | 7. | the dye is useful in drug industry for making veterinary and insecticidal compositions. | | |
| | 8. | The dye is useful in medical applications where X-ray defraction based studies are needed. It can be a visual reality without even exposing them on the X-ray films. | | |
| | 9. | This dye in its single form is equivalent to three different synthetic fluorochromes giving same colored emission of fluorescent colors. (see example 14–17) | 7. | The dye can be used as a quick microscopic stain giving a phase contrast effect without any extra expenses on phase contrast accessory of a microscope and without any lengthy protocols of fixations and preservations of specimens. Especially on the spot quality check of live samples. (see example 19–23) |
| | 10. | The dye can be used as a quick microscopic stain giving a phase contrast effect without any extra expenses on phase contrast accessory of a microscope and without any lengthy protocols of fixations and preservations of specimens Especially on the spot quality check of live samples. (see example 21) | 8. | Being non degradable in quality of fluorescence for longer durations, it does not require refrigeration while exporting. The presently marketed fluorescent dyes exported under refrigeration equivalent to –20 degree centigrade. (see example 4, 25) |
| | 11. | Being non degradable in quality of fluorescence for longer durations, it does not require refrigeration while | 9. | Unlike the earlier known Green Fluorescent protein (GFP) from a marine jelly fish, our dye is though also is a |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | Fluorescent Dye-(CSIR NF 152/2002 Present U.S. patent application Ser. No._____ |
|---|---|---|
| | exporting. The presently marketed fluorescent dyes exported under refrigeration equivalent to −20 degree centigrade. (see example 18) | protein but is not a reporter gene. The results are direct and 6 colored emissions occurs at three excitation wavelengths . . . (see example 6, 8, 13) |
| | 12. Unlike the earlier known Green Fluorescent protein (GFP) from a marine jelly fish, our dye is not a protein and a reporter gene. The results are direct. GFP absorbs blue light at 395 nm and with a minor peak at 470 nm emits green light. Our dye emits 3 fluorescent colors and at three different fluorescent wavelengths. (see example 7) | 10. The dye is soluble in 70% alcohol (see example 2) |
| | | 11. The dye is negatively charged protein dye (see example 6, 8, 13) |
| | | 12. The dye has a pH of 6.8–7.5 which is almost neutral and hence will not effect final properties of pH drastically in compositions. (see example 6) |
| | 13. The dye is soluble in water-so can be used in components where water soluble dyes are needed. The dye is insoluble in the organic solvents like ethanol, methanol and acetone. (see example 2) | 13. The dye is proteinaceous in nature and stable at 4 degree centigrade but once it stains the cell membranes the fluorescence of cells is nondegradable for several months. (see example 4, 25) |
| | 14. The dye is negatively charged (see example 8) | 14. The dye emitted these fluorescence colors even at a dilution range of 1:400000 times and above The fluorescence of the extract persisted even after several months at the room temperature. These multicolored emissions of the dye at different wavelengths of excitations are comparable to the fluorochrome microscopic stains already in the market. (see example 18, 19, 22) |
| | 15. The, dye has a pH of 6.5 which is almost neutral and hence will not effect final properties of pH drastically in compositions. (see example 24) | |
| | 16. The dye is non-proteinaceous in nature so non degradable under natural conditions. (see example 18) | 15. The blue colored fluorescence of the present dye is comparable to the emission of same color by DAPI fluorochrome at the same wavelength excitation, used as components of the non-radioactive labeling kits of biochemistry, cell biology, immunochemistry, and molecular biology. (see example 19–23) |
| | 17. The dye has nature of a biosurfactant so can be used in soaps and toiletry compositions. (see example 9) | |
| | 18. The dye has antimicrobial qualities (see example 10) | |
| | 19. The dye emitted these fluorescence colors even at a dilution range of 1:40000 times (i.e. 1 gm powder of dye dissolved in 40 liters of ultrapure water). The fluorescence of the extract persisted even after at least 1 year at the room temperature. These multicolored emissions of the dye at different wavelengths of excitations are comparable to the fluorochrome microscopic stains already in the market (see example 14). | 16. The blue colored fluorescence of the present dye is also comparable to the emission of color by Hoechest 33258 used as components of the non-radioactive labeling and detection kits of biochemistry, cell biology, immunochemistry, and molecular biology. (see example 19–23) |
| | | 17 The blue colored fluorescence of the present dye is also comparable to the emission of color by Hoechest 33342 fluorochrome at the same wavelength excitation used as components of the non-radioactive labeling and detection kits of biochemistry, cell biology, immunochemistry, and molecular biology. (see example 19–23) |
| | 20. The blue colored fluorescence of the present dye is comparable to the emission of same color by DAPI fluorochrome at the same wavelength excitation, used as components of the non-radioactive labeling kits of biochemistry, cell biology, immunochemistry, and molecular biology. (see example 14–17) | 18. The yellow colored fluorescence of the said dye in the visible range is comparable to the same colored emissions of Acridine orange used as components of the non-radioactive labeling and detection kits of biochemistry, cell biology, immunochemistry, and molecular biology. (see example 19–23) |
| | 21. The blue colored fluorescence of the present dye is also comparable to the emission of color by Hoechest 33258 used as components of the non-radioactive labeling and detection kits of biochemistry, cell biology, immunochemistry, and molecular biology . . . (see example 14–17) | 19. The yellow colored fluorescence of the said dye in the visible range is comparable to the same colored emissions of auramine used as components of the non-radioactive labeling and detection kits of biochemistry, cell biology, immunochemistry, and molecular biology. (see example 19–23) |
| | 22. The blue colored fluorescence of the present dye is also comparable to the emission of color by Hoechest 33342 fluorochrome at the same wavelength excitation used as components of the non-radioactive labeling and | 20. The yellow colored fluorescence of the said dye in the visible range is comparable to the same colored emissions of FITC used as components of the non-radioactive labeling and detection kits of biochemistry, |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | Fluorescent Dye-(CSIR NF 152/2002 Present U.S. patent application Ser. No.____ |
|---|---|---|
| | detection kits of biochemistry, cell biology, immunochemistry, and molecular biology . . . (see example 14–17) | cell biology, immunochemistry, and molecular biology. (see example 19–23) |
| | 23. The yellow colored fluorescence of the said dye in the visible range is comparable to the same colored emissions of Acridine orange used as components of the non-radioactive labeling and detection kits of biochemistry, cell biology, immunochemistry, and molecular biology . . . (see example 14–17) | 21. The orange colored fluorescent emission is comparable to the orange fluorescence color of Propidium Iodide fluorochrome used as components of the non-radioactive labeling and detection kits of biochemistry, cell biology, immunochemistry, and molecular biology. (see example 19–23) |
| | 24. The yellow colored fluorescence of the said dye in the visible range is comparable to the same colored emissions of auramine used as components of the non-radioactive labeling and detection kits of biochemistry, cell biology, immunochemistry, and molecular biology . . . (see example 14–17) | 22. The orange colored fluorescent emission is comparable to the orange fluorescence color of Rhodamine fluorochrome used as components of the non-radioactive labeling and detection kits of biochemistry, cell biology, immunochemistry, and molecular biology. (see example 19–23) |
| | 25. The yellow colored fluorescence of the said dye in the visible range is comparable to the same colored emissions of FITC used as components of the non-radioactive labeling and detection kits of biochemistry, cell biology, immunochemistry, and molecular biology . . . (see example 14–17) | 23. The orange colored fluorescent emission is comparable to the orange fluorescence color of TRITC fluorochrome used as components of the non-radioactive labeling and detection kits of biochemistry, cell biology, immunochemistry, and molecular biology. (see example 19–23) |
| | 26. The orange colored fluorescent emission is comparable to the orange fluorescence color of Propidium Iodide fluorochrome used as components of the non-radioactive labeling and detection kits of biochemistry, cell biology, immunochemistry, and molecular biology . . . (see example 14–17) | 24. Unlike the synthetic commercial dyes used for the same purposes, the present dye is stable at the room temperature and has a long shelf life. Molecular non-radioactive kits of the said dye can be exported at the room temperatures. (see example 19–23) |
| | 27. The orange colored fluorescent emission is comparable to the orange fluorescence color of Rhodamine fluorochrome used as components of the non-radioactive labeling and detection kits of biochemistry, cell biology, immunochemistry, and molecular biology . . . (see example 14–17) | 25. The said single dye has characteristics of at least one hundred and twenty three different fluorochromes (DAPI, Hoechest 33258, Hoechest 33342, FITC, acridine orange, auramine, Rhodamine, TRITC, and propidium iodide etc.) now in the market. (see example 19–23) |
| | 28. The orange colored fluorescent emission is comparable to the orange fluorescence color of TRITC fluorochrome used as components of the non-radioactive labeling and detection kits of biochemistry, cell biology, immunochemistry, and molecular biology . . . (see example 14–17) | 26. under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence. (see example 19–23) |
| | 29. Unlike the synthetic commercial dyes used for the same purposes, the present dye is stable at the room temperature and has a long shelf life. Molecular non-radioactive kits of the said dye can be exported at the room temperatures . . . (see example 18) | 27. The microphotographs with Kodak film rolls shows hues of the adjacent color emission wavelengths. Like when seen blue color fluorescence under the epifluorescence microscope in microphotograph the hues of green also comes. (see example 19–23) |
| | 30. The said single dye has characteristics of at least one hundred and twenty three different fluorochromes (DAPI, Hoechest 33258, Hoechest 33342, FITC, acridine orange, auramine, | 28. The microphotographs with Kodak film rolls shows hues of the adjacent color emission wavelengths. Like when seen yellow color fluorescence under the epifluorescence microscope in microphotograph the hues of green also comes. The dye when seen orange fluorescence color under the epifluorescence microscope in microphotograph the hues of red also comes. (see example 19–23) |
| | | 29. The cytogenetic slides seen under all fluorescence gives a counterstain effect of cells with the background where no specimen but only dye is present. (see example 19–23) |
| | | 30. The dye can be used for the preparation of polyvinyl chloride film that exhibits |

TABLE 7-continued

Table showing various commercially important features of the three natural fluorescent dyes extracted from the sea cucumber Holothuria scabra by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | | Fluorescent Dye-(CSIR NF 152/2002 Present U.S. patent application Ser. No._____ | |
|---|---|---|---|---|
| | | Rhodamine, TRITC, and propidium iodide etc.) now in the market. | | fluorescent colors. It also can be used in fluorescent colors in variety of paints, inks, textiles. |
| | 31. | under ordinary light of microscope the hues of grays produce a phase contrast effect which is useful in rapid screening of cytogentical, cytological, and histochemical slides and save expenses on the extra phase contrast accessory component of microscope. The fluorescence color emissions follow Stoke's law of fluorescence. | 31. | The dye can be used in compositions of fluorescent dye for bleaching and brightening polymer. The dye can be used in leak detection with a full spectrum fluorescent dye. It can also be used in automated chemical metering system. It can also be used to mark the location of crashed aircrafts, life crafts, and equipment for example rockets. Further it can be used in under sea probes. The dye can be used in photo chemotherapy of skin cancers. |
| | 32. | The microphotographs with Kodak film rolls shows hues of the adjacent color emission wavelengths. Like when seen blue color fluorescence under the epifluorescence microscope in microphotograph the hues of green also comes. | 32. | It can be used as fluorescent in situ hybridization application kit component for molecular diagnostics. It can also be used as a component of the non-radioactive labeling and detection kits of biochemistry, cell biology, immunochemistry, and molecular biology for labeling of DNA, RNA, Proteins and enzymes., Immunofluorescent detections, Counterstain of DIG-labeled oliogonucleotide probes and Anti-DIG Fab-fragments, Single and multiple cell quantitative fluorescence in Flowcytometry., Fluorochrome stains for epifluorescence microscopy |
| | 33. | The microphotographs with Kodak film rolls shows hues of the adjacent color emission wavelengths. Like when seen yellow color fluorescence under the epifluorescence microscope in microphotograph the hues of green also comes. The dye when seen orange fluorescence color under the epifluorescence microscope in microphotograph the hues of red also comes. | 33. | The dye can be used for a quick check of biocontamination in the health food industry, cosmetic industry, pharmaceutical and chemical industries, for rapid estimations of biocontaminants in laboratory cultures, for a rapid check of biopollutants under field conditions (see example 24) |
| | 34. | The cytogenetic slides seen under all fluorescence gives a counterstain effect of cells with the background where no specimen but only dye is present. | 34. | The dye can be used natural colorant |
| | 35. | The dye can be used for the preparation of polyvinyl chloride film that exhibits fluorescent colors. It also can be used in fluorescent colors in variety of paints, inks, textiles. | 35. | Dye can be used in fertilization rate enhancements in medical, biomedical, agricultural and aquaculture sciences (see example 14, 15) |
| | 36. | The dye can be used in compositions of fluorescent dye for bleaching and brightening polymer. The dye can be used in leak detection with a full spectrum fluorescent dye. It can also be used in automated chemical metering system. It can also be used to mark the location of crashed aircrafts, life crafts, and equipment for example rockets. Further it can be used in under sea probes. The dye can be used in photo chemotherapy of skin cancers. | | |
| | 37. | The dye can be used as chromatophore sunscreen component of cosmetics creams and lotions. | | |
| | 38. | The water miscible quality of the dye can make it easily miscible in moisturizers. It can be used as fluorescent in situ hybridization application kit component for molecular diagnostics. It can also be used as a component of the non-radioactive labeling and detection kits of biochemistry, cell biology, immunochemistry, and molecular biology for labeling of DNA, RNA, Proteins and enzymes., Immunofluorescent detections, Counterstain of DIG-labeled oliogonucleotide probes and Anti- | | |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | | Fluorescent Dye-(CSIR NF 152/2002 Present U.S. patent application Ser. No.___ | |
|---|---|---|---|---|
| | | DIG Fab-fragments, Single and multiple cell quantitative fluorescence in Flowcytometry., Fluorochrome stains for epifluorescence microscopy. | | |
| | 39. | The dye can be used for a quick check of biocontamination in the health food industry, cosmetic industry, pharmaceutical and chemical industries, for rapid estimations of biocontaminants in laboratory cultures, for a rapid check of biopollutants under field conditions. It can also be a competitive inhibitor of cholinesterases | | |
| | 40. | The dye can be used in antimicrobial compositions. | | |
| | 41. | The dye can be used as a biosurfactant in toiletry compositions | | |
| Specific uses of the 3 natural fluorescent dyes described here. | 42. | The dye can be used natural colorant | | |
| | a. | .preparation of flexible polyvinyl chloride film that exhibits fluorescent colors; | a. | use of fluorescent colors in variety of paints, inks, textiles; |
| | b. | use of fluorescent colors in variety of paints, inks, textiles; | b. | a composition of fluorescent dye for bleaching and brightening polymer; |
| | c. | a composition of fluorescent dye for bleaching and brightening polymer; | c. | leak detection with a full spectrum fluorescent dye; |
| | d. | leak detection with a full spectrum fluorescent dye; | d. | use in automated chemical metering system; |
| | e. | use in automated chemical metering system; | e. | to mark location of crashed air-crafts, life crafts, and equipment for example rockets; |
| | f. | to mark location of crashed air-crafts, life crafts, and equipment for example rockets; | f. | under sea probes; |
| | g. | under sea probes; | g. | fluorescent in situ hybridization application kit component for molecular diagnostics; |
| | h. | UVA is used in photo chemotherapy of skin cancers;. (see example 11) | h. | component of the non-radioactive labeling and detection kits of biochemistry, cell biology, immunochemistry, and molecular biology for labeling of DNA, RNA, Proteins and enzymes; |
| | i. | chromatophore sunscreen component of cosmetics creams and lotions; | i. | immunofluorescent detections; |
| | j. | the water miscible quality of the dye can make it easily miscible in moisturizers; | j. | counterstain of DIG-labeled oligonucleotide probes and Anti-DIG Fab fragments; |
| | k. | fluorescent in situ hybridization application kit component for molecular diagnostics; | k. | single and multiple flow cytometry applications; |
| | l. | component of the non-radioactive labeling and detection kits of biochemistry, cell biology, immunochemistry, and molecular biology for labeling of DNA, RNA, Proteins and enzymes; | l. | fluorochrome stains for epifluorescence microscopy;. (see example 19–23). |
| | m. | immunofluorescent detections; | m. | for a quick check of biocontamination in the health food industry, cosmetic industry, pharmaceutical and chemical industries;. (see example 22). |
| | n. | counterstain of DIG-labeled oligonucleotide probes and Anti-DIG Fab-fragments; | n. | for rapid estimations of biocontaminants in laboratory cultures;. (see example 22) |
| | o. | single and multiple flow cytometry applications; | o. | for a rapid check of biopollutants under field conditions;. (see example 22). |
| | p. | fluorochrome stains for epifluorescence microscopy; | p. | agglutination compositions;. (see example 14, 15) |
| | q. | for a quick check of biocontamination in the health food industry, cosmetic industry, pharmaceutical and chemical industries; | q. | a natural colorant; |
| | | | r. | a bioactive composition of the marine dye in the ratio of 1:400000 in ultrapure water to obtain fluorescences of six colors at six different wavelengths and a phase contrast effect under transmitted light;. (see example 18, 19, 22) |
| | r. | for rapid estimations of biocontaminants in laboratory cultures; | s. | a dye for various fluorescent applications to be performed in areas of sub zero temperatures. |
| | s. | for a rapid check of biopollutants under field conditions; | t. | for fertilizaton rate increase in aquaculture industry. (see example 14, 15) |
| | t. | a competitive inhibitor of | u. | for cell permeant membrane dye compositions.. (see example 24) |

TABLE 7-continued

Table showing various commercially important features of the three natural fluorescent dyes extracted from the sea cucumber *Holothuria scabra* by the present inventors. (The features are kept under different headings as shown in column no.1)

| Heading/title | Fluorescent Dye-(CSIR NF 140/2001) U.S. patent application Ser. No. 09/820,654 filed Mar. 30, 2001 | Fluorescent Dye-(CSIR NF 152/2002) Present U.S. patent application Ser. No._____ |
|---|---|---|
| | cholinesterases; | v. for identification of dead and live cells in tissue cultures.. (see example 24) |
| | u. in antimicrobial compositions;. (see example 10) | w. for identification of dead and live cells/bacteria in food industries. (see example 24) |
| | v. as a biosurfactant in toiletry compositions;. (see example 9) | |
| | w. a natural colorant; | x. for dye compositions in biosensors. |
| | x. a bioactive composition of the marine dye in the ratio of 1:40000 in ultrapure water to obtain fluorescences of three colors at three different wavelengths and a phase contrast effect under transmitted light;. (see example 14) | y. as dye composition in molecular and microbiological kits.. (see example 24) |
| | y. a dye for various fluorescent applications to be performed in areas of sub zero temperatures.. (see example 18) | |

What is claimed is:

1. A non-toxic proteinaceous fluorescent dye obtained from ovarian tissues of marine organism *Holothuria scabra*, and comprising fluorescent pigments giving emissions in few to all wavelength ranges of UVB, UVA, visible colore spectrums and infra red spectrum.

2. A dye as claimed in claim 1 which is useful a natural fluorescent and having the following characteristics:

a) is non-reduceable,
b) is not synthetic,
c) crude extract of the dye is yellowish orange in color,
d) partially purified dye is light orangish in color when seen with the naked eye in daylight,
e) emits hues of multicolors under light,
f) exists in liquid form,
g) soluble in 70% ethyl alcohol,
h) a 70% alcohol solution can be further diluted with water for use experiments,
i) is negatively charged,
j) pH of the alcoholic solution is in the range of 6.8–7.5,
k) reducable fluorophore is absent,
l) dye is proteinaceous in nature,
m) dye is nontoxic to bacteria *E. coli*,
n) dye is nontoxic to eukaryotic cells like oyster eggs and sperms,
o) dye is cell membrane permeant,
p) dye is permeable to the nuclear membrane,
q) dye stains chromatin,
r) thin layer chromatography of dye solution shows four compound having Rf values 0.917, 0.818, 0.661 and 0.4634,
s) retention time of proteins in high pressure liquid chromatograph (HPLC) with ultra-violet (UV) detector at 280 nm shows 7 peaks,
t) retention time of peak 1 is 2.1 minutes and its area is 116103,
u) retention time of peak 2 is 2.5 minutes and its area is 38205,
v) retention time of peak 3 is 3.7 minutes and its area is 7332,
w) retention time of peak 4 is 6.1 minutes and its area is 31924,
x) retention time of peak 5 is 6.8 minutes and its area is 535,
y) retention time of peak 6 is 7.6 minutes and its area is 3684,
z) retention time of peak 7 is 8.8 minutes and its area is 89653,
aa) retention time of peptides by HPLC by UV detector at 205 nm has 10 peaks,
ab) it has carbohydrate,
ac) it has glycoprotein,
ad) it is inducing agglutinating lectin qualities,
ae) it agglutinates bacteria *E. coli*,
af) the agglutinated *E. coli* do not die and do show fluorescence,
ag) the dye agglutinates sperms to the egg membrane of oysters,
ah) the dye facilitates sperm insemination and enhances rate of fertilization of oyster eggs,
ai) the dye solution can be stored at 4 degree centigrade,
aj) after the dye attaches to a cell membrane, it stays fluorescent for several days,
ak) the dye does not get photobleached once stained on cells,
al) dye does not stain dead cells of prokaryotes,
am) dye does not stain dead cells of oysters,
an) the fluorescence of the dye does not change when frozen at −20° C., a temperature at which the molecules are unable to attain the energy necessary or activation,
ao) dye is a fluorescent dye, which emits fluorescence when excited with different wavelengths of UV and visible spectral ranges on a spectrophotometer,
ap) the wavelength of excitation was maximum at 351 nm, 580 nm, 720 nm and the fluorescence emission spectrometric analysis was in between 400 to 600 nm when excited at 351 nm, aq) the emission maximas have two peaks at 450 nm and 550 nm, ar) Whatman Filter no. 1 dipped with dye concentration 1:20000 dilution under UV transilluminator and Gel Documentation system with UV bulbs of 260 nm–280 nm range emit bluish green hue color of fluorescence, as) dye emits three different colored fluorescence at 3 different wavelengths of the UV and visible ranges of the fluorescent cubes of an epifluorescence microscope, at) dye when attached to a cell membrane emits three different colored fluorescence at 3 different wavelengths of the UV and visible ranges of the fluorescent cubes of an epifluorescence microscope which are different from that of the dye alone, au) on excitation of dye solution under UV cube in the range of 330 nm–385 nm, fluorescence of blue color emission occurs between 450 nm and 470 nm, av) on excitation of dye solution under WB cube in the range of 450 nm–480 nm, fluorescence of green color emission occurs between 510 nm and 570 nm, aw) on excitation of dye solution under WG cube in the range of 510 nm–550 nm, fluorescence of orange color emission occurs between 610 nm an 650 nm, ax) the dye emits hues of yellowish grays under the ordinary transmitted light bulb of the epifluorescence microscope when seen under 100× objective, ay) on excitation of dye attached to a cell membrane under UV cube in the range of 330–385 nm, fluorescence of blue color emission occur between 470 nm–500 nm, az) on excitation of dye attached to a cell membrane under WB cube of 450 nm–480 nm excitation range, fluorescence of green color emission occurs between 570 nm–610 nm, ba) on excitation of dye attached to a cell membrane under WG cube of 510 nm–550 nm excitation range, fluorescence of orange color emission occurs between 610 nm–650 nm, bb) the dye attached to a cell membranes emits hues of yellowish grays under the ordinary transmitted light bulb of the epifluorescence microscope when seen under 100× objective, bc) the dye emits fluorescence colors even at a dilution range of 1:400000 times, and bd) the fluorescence of the dye is highly stable after staining the cell membranes and does not get deteriorated by long exposures to direct light, and the fluorescence of the dye does not change when frozen at minus 20° C.

3. The dye as claimed in claim 1, wherein multicolored emissions of the dye at different wavelengths of excitations are comparable to the fluorochrome microscopic stains already in the market.

4. The dye as claimed in claim 1, wherein blue colored fluorescence of the present dye is comparable to the emission of same color by DAPI fluorochrome at the same wavelength excitation, used as components of the non-radioactive labeling kits of biochemistry, cell biology, immunochemistry, and molecular biology.

5. The dye as claimed in claim 1, wherein yellow colored fluorescence of the said dye in the visible range is comparable to the same colored emissions of Auramin used as components of the non-radioactive labeling and detection kits of biochemistry, cell biology, immunochemistry, and molecular biology.

6. A dye as claimed in claim 1, wherein yellow colored fluorescence of the said dye in the visible range is comparable to the same colored emissions of FITC used as components of the non-radioactive labeling and detection kits of biochemistry, cell biology, immunochemistry, and molecular biology.

7. The dye as claimed in claim 1, wherein orange colored fluorescent emission is comparable to the orange fluorescence color of Propidium Iodide fluorochrome used as components of the non-radioactive labeling and detection kits of biochemistry, cell biology, immunochemistry, and molecular biology.

8. The dye as claimed in claim 1, wherein orange colored fluorescent emission is comparable to the orange fluorescence color of Rhodamine fluorochrome used as components of the non-radioactive labeling and detection kits of biochemistry, cell biology, immunochemistry, and molecular biology.

9. The dye as claimed in claim 1, wherein orange colored fluorescent emission is comparable to the orange fluorescence color of TRITC fluorochrome used as components of the non-radioactive labeling and detection kits of biochemistry, cell biology, immunochemistry, and molecular biology.

10. The dye as claimed in claim 1, wherein the dye is stable at the room temperature and has a long shelf life.

11. The dye as claimed in claim 1, wherein molecular and radioactive kits of the said dye can be exported at the room temperatures.

12. The dye as claimed in claim 1, wherein the dye has characteristics of at least one hundred different fluorochromes namely DAPI, Hoechest 33258, Hoechest 33342, FITC, acridine orange, auramine, Rhodamine, TRITC, and propidium iodide, etc, which are now in the market.

13. The dye as claimed in claim 1, wherein the dye does not undergo loss in fluorescence upon freezing.

14. The dye as claimed in claim 1, wherein a hue of bluish gray produces a phase contrast effect in screening of cytogentical, cytological, and histochemical slides.

15. The dye as claimed in claim 1, wherein under 100× oil immersion objective of an ordinary transmitted light microscope proteins of yolk, nucleoplasm and chromatin of actively dividing cleavage cells show different colors of staining in the hues of brownish yellow for former, yellow for the latter and dark blue for the last cell component.

16. The dye as claimed in claim 1, wherein the emissions follow Stoke's law of fluorescence.

17. The dye as claimed in claim 1, wherein microphotographs with film show hues of the adjacent color emission wavelengths such as blue color fluorescence under the epifluorescence.

18. The dye as claimed in claim 1, wherein the microphotographs with film shows hues of the adjacent green color emission wavelengths.

19. The dye as claimed in claim 1, wherein the orange fluorescence color seen under the epifluorescence microscope in microphotograph, also shows hues of the adjacent red color emission wavelengths.

20. The dye as claimed in claim 1 wherein the cytogenetic slides seen under all fluorescences gives a counterstain effect of cells and cell components.

21. The dye as claimed in claim 1, wherein the dye when diluted with water in the ratio above 1:400,000 times gives fluorescence of six colors at different wavelengths.

22. The dye as claimed in claim 1, wherein the dye when diluted in the ratio of 1:400,000 and above gives fluorescence of six colors at three different wavelengths.

23. A fluorescent composition comprising the non-toxic proteinaceous fluorescent dye as claimed in claim 1, and further comprising suitable additives for coating compositions and inks.

24. A fluorescent composition comprising the non-toxic proteinaceous fluorescent dye as claimed in claim 1, and further comprising suitable additives for detection of leaks.

25. A fluorescent composition comprising the non-toxic proteinaceous fluorescent dye as claimed in claim 1, and further comprising suitable additives for undersea probes.

26. A fluorescent composition comprising the non-toxic proteinaceous fluorescent dye as claimed in claim 1, and further comprising suitable additives for a fluorescent molecular probe of in situ hybridization kits for molecular diagnostics.

27. A fluorescent composition comprising the non-toxic proteinaceous fluorescent dye as claimed in claim 1, and further comprising suitable additives for as a component of non-radioactive labeling and detection kits of biochemistry, cell biology, immunochemistry or molecular biology.

28. A fluorescent composition comprising the non-toxic proteinaceous fluorescent dye as claimed in claim 1, and further comprising suitable additives for in immunofluorescent detection.

29. A fluorescent composition comprising the non-toxic proteinaceous fluorescent dye as claimed in claim 1, and further comprising suitable additives for a counterstain of DIG-labeled oliogonucleotide probes and anti-DI Fab-fragments.

30. A fluorescent composition comprising the non-toxic proteinaceous fluorescent dye as claimed in claim 1, and further comprising suitable additives for single and multiple cell quantitative fluorescence in single and multicolor flow cytometry.

31. A fluorescent composition comprising the non-toxic proteinaceous fluorescent dye as claimed in claim 1, and further comprising suitable additives for conducting experiments at field stations situated at a freezing temperature location.

32. A fluorescent composition comprising the hi active extract as claimed in claim 1, and further comprising suitable additives for fluorochrome staining in epifluorescence microscopy.

33. A fluorescent composition comprising the non-toxic proteinaceous fluorescent dye as claimed in claim 1, and further comprising suitable additives for detecting biocontamination in the health food industry, cosmetic industry, pharmaceutical industry or the chemical industry.

34. A fluorescent composition comprising the non-toxic proteinaceous fluorescent dye as claimed in claim 1, and further comprising suitable additives for detecting biocontaminants in laboratory cultures.

35. A fluorescent composition comprising the non-toxic proteinaceous fluorescent dye as claimed in claim 1, and further comprising suitable additives for detecting biopollutants under field conditions.

36. A fluorescent composition comprising the non-toxic proteinaceous fluorescent dye as claimed in claim 1, and further comprising suitable additives as a competitive inhibitor of cholinesterases.

37. A fluorescent composition comprising the non-toxic proteinaceous fluorescent dye as claimed in claim 1, and further comprising suitable additives for cell permeant dye compositions.

38. A fluorescent composition comprising the non-toxic proteinaceous fluorescent dye as claimed in claim 1, and further comprising suitable additives for a fertility enhancer.

39. A fluorescent composition comprising the non-toxic proteinaceous fluorescent dye as claimed in claim 1, and further comprising suitable additives in the ratio of 1:20000 for fluorescence of three colors at three different wavelengths.

40. A fluorescent composition comprising the non-toxic proteinaceous fluorescent dye as claimed in claim 1, and further comprising suitable additives to obtain a phase contrast and histochemical counterstain effect for different biochemical constituents of cells under transmitted light.

41. A process for extraction of a non-toxic proteinaceous fluorescent dye from *Holothuria scabra* sea cucumber, which comprises the steps of:
  (a) collecting *Holothuria scabra* specimens,
  (b) placing said *Holothuria scabra* specimens in a seawater bath,
  (c) removing the female gonads from said *Holothuria scabra* specimens,
  (d) extracting the gonads with 70% ethyl alcohol at least thrice without homogenization to form an extract solution containing said dye,
  (e) obtaining said dye from the extract solution.

42. A process for extraction of a non-toxic proteinaceous fluorescent dye from *Holothuria scabra* sea cucumber, which comprises the steps of:
  (a) collecting *Holothuria scabra* specimens,
  (b) removing the female gonads from said *Holothuria scabra* specimens,
  (c) extracting the gonads with 70% ethyl alcohol at least thrice without homogenization to form an extracted solution containing said dye,
  (d) obtaining said dye from the extract solution, whereby said dye is negatively charged.

43. The process as claimed in claim 41, further comprising conducting eukaryotic and prokaryotic survival bioassays to assess the non-toxic nature of said dye by using dilutions in the range of 1:40,000, 1:20,000, 1:10,000, 1:5,000, and 1:2,500 of said dye.

* * * * *